United States Patent [19]

Ohno et al.

[11] Patent Number: 4,881,799

[45] Date of Patent: Nov. 21, 1989

[54] VARIFOCAL LENS DEVICE

[75] Inventors: Yoshimi Ohno, Kawasaki; Takayuki Hatase, Yokohama; Daisuke Hata, Funabashi, all of Japan

[73] Assignee: Ricoh Company, Ltd., Tokyo, Japan

[21] Appl. No.: 184,023

[22] Filed: Apr. 20, 1988

[30] Foreign Application Priority Data

| Apr. 20, 1987 | [JP] | Japan | 62-95047 |
| May 23, 1987 | [JP] | Japan | 62-125021 |
| May 30, 1987 | [JP] | Japan | 62-133402 |
| May 30, 1987 | [JP] | Japan | 62-133404 |
| May 30, 1987 | [JP] | Japan | 62-135696 |

[51] Int. Cl.$^4$ .......................................... G02B 15/00
[52] U.S. Cl. ...................................... 350/429; 354/408
[58] Field of Search ............... 350/429, 430; 354/402, 354/403, 408

[56] References Cited

U.S. PATENT DOCUMENTS

| 3,972,056 | 7/1976 | Tsujimoto et al. | 350/430 |
| 4,161,756 | 7/1979 | Thomas | 350/429 |
| 4,705,380 | 11/1987 | Yamamoto et al. | 354/402 |

Primary Examiner—Bruce Y. Arnold
Assistant Examiner—Loha Ben
Attorney, Agent, or Firm—Oblon, Spivak, McClelland, Maier & Neustadt

[57] ABSTRACT

Compensation of a deviation produced in the image forming position of a varifocal lens in consequence of magnification is attained by transforming a compensation amount into a relative amount of movement through arithmetic operation and driving the focusing lens group of the varifocal lens until the actual amount of movement conforms to the value obtained by the transformation.

14 Claims, 27 Drawing Sheets

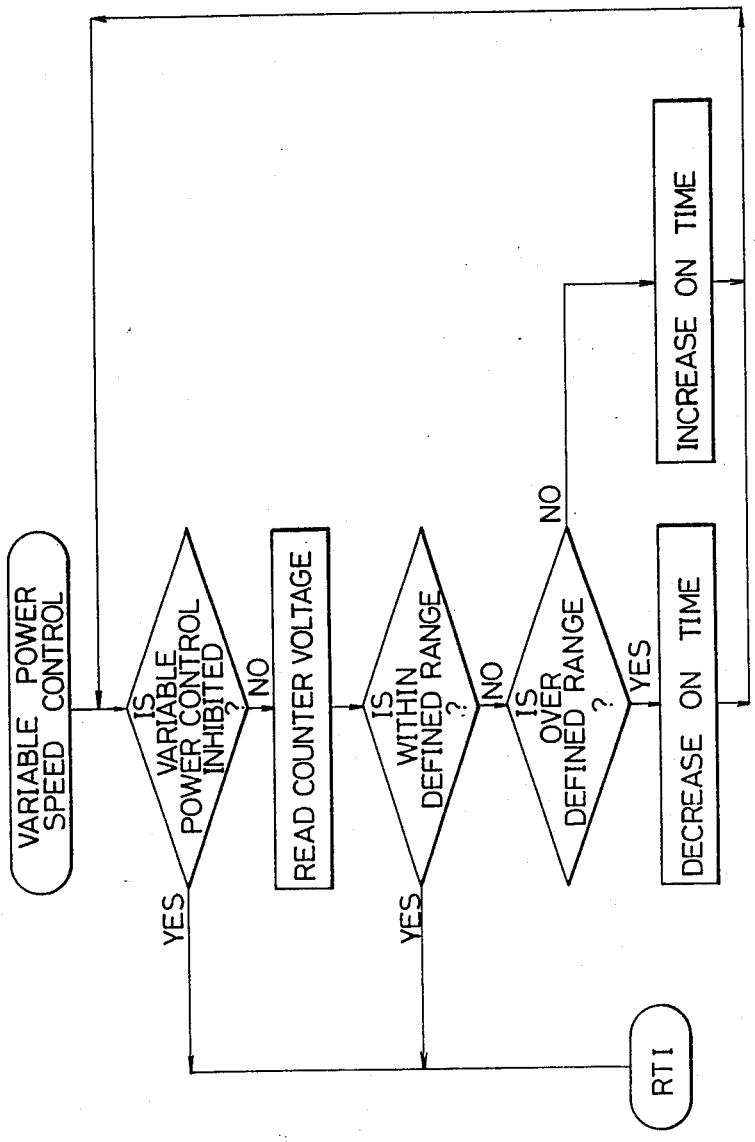

VARIFOCAL LENS DEVICE

BACKGROUND OF THE INVENTION

This invention relates to a varifocal lens device. More particularly, this invention relates to a varifocal lens device provided with a variable power optical system composed of a variable power lens group and a focusing lens group disposed in an optical axis, for compensating a deviation produced in the image forming position for an object when the focusing lens group of the optical system is set at a focusing position between the nearest possible position to the infinitely far position on the optical axis corresponding to the object distance falling between the shortest possible distance to the infinitely long distance and the overall focal length of the variable power optical system is subsequently renewed from a first to a second focal length selected freely between the shortest possible focal length to the longest possible focal length by means of the variable power lens group.

A zoom lens does not incur any deviation in the image forming position (so-called unstable focusing or incorrect focusing) from a zooming work and, therefore, is free from the necessity for adjusting a focus after each zooming work and excellent in operability. Since it nevertheless has a large F-number for the diaphragm as compared with the monofocal lens, it requires the user of the zoom lens mounted in a single lens reflex camera, for example, to possess a considerable amount of skill in the adjustment of a focus (focusing) with a range finder. In recent years, the automatic camera focusing mechanisms have advanced to a point where the problem of difficult focusing mentioned above is solved and the cameras using zoom lenses are enabled to manifest fully the mobility inherent in the zoom lens. The zoom lenses enjoy notably improved operability and, therefore, the users thereof are enabled to devote all their attention solely to the selection of a composition of a given scene to conform to their design in mind.

Generally, the focusing of the zoom lens is effected by the movement of a focusing lens group which is disposed in part of a variable power optical system. The zoom lens has an advantage that the amount of movement of the focusing lens group for object distance is substantially constant throughout the entire zone of zooming (hereinafter this fact will be referred to as "equivalent movement"). For the operation of the zoom lens, therefore, it suffices to attach a graduation of the distance of object to a moving member (distance ring) for the focusing lens group and inscribe an index on a stationary ring juxtaposed to the moving member. Again it has an advantage that it does not require to change the graduation of the object distance, depending on the particular zooming work to be involved.

An attempt at optically designing a zoom lens on the conditions realizing the equivalent movement mentioned above entails a disadvantage that the lens composition notably gains in complexity, though to a varying degree depending on the particular lens composition in the variable power optical system. This zoom lens has another disadvantage that the amount of movement (amount of delivery) of the focusing lens group is unduly large on the wide-angle side. This fact entails a drawback that the zoom lens inevitably has a large outside diameter and the lens itself and the lens barrel weigh heavily.

For the solution of these problems, the varifocal lens which is relieved of the requirement for the equivalent movement mentioned above has been proposed. This varifocal lens, however, has a drawback that it generates a deviation in the image forming position when it is subjected to the work of power variation corresponding to the work of zooming of the zoom lens mentioned above. It is conceivably possible to solve this problem by having part of the variable power optical system constituting the varifocal lens as a focusing lens group adapted to generate a focusing movement independently of the work of power variation mentioned above, determining by computation the deviation (hereinafter referred to occasionally as "shift") of the image forming position resulting from the work of power variation, compensating the position of the focusing lens group based on the outcome of the computation, and thereby enabling the varifocal lens to acquire substantially the same operability as the zoom lens.

The automatic compensation of shift may be possibly realized by constructing the so-called analog-servo mechanism for analog control with a variable power driving section serving to drive the variable power optical system as with a variable power motor for setting a desired focal length, a focus driving section serving to drive the focusing lens group as with a focus motor, a focal length detecting section such as, for example, a potentiometer serving to detect the currently set focal length as in the form of absolute value of voltage, and a focus position detecting section such as, for example, a potentiometer capable of detecting the current position of the focusing lens group as in the form of absolute value of voltage.

The varifocal lens described above, however, cannot be easily realized with the analog-servo mechanism (analog computation) because the focusing position of the focusing lens group for an object varies with the focal length and the locus of this variation describes a hyperbola having the focal distance (output of the focal length detector) as the variable thereof. If the varifocal lens is realized with this mechanism at all, it will be extremely complicated in construction and will be expensive as an inevitable consequence.

When the driving motor for driving the focusing lens group is adapted for analog control, it is liable to induce the phenomenon of hunting unless it makes use of an expensive and highly accurate circuit member. It is, therefore, difficult to attain any improvement in the speed of the analog control of the driving motor.

In recent years, the automation of camera manipulation has advanced to a point where microcomputers find extensive utility for comprehensive efficient control of various complicated automatic works involved. In a camera using a microcomputer, not only the center of control but also peripheral components are designed for digital operation. For example, the data on distance measurement produced from the distance measuring section, an essential component for the automatic focusing device, are also based on digital notation. It is, therefore, possible of course to provide the varifocal lens itself with the automatic focusing device mentioned above. Economically it is advantageous to utilize the automatic focusing device already incorporated in the camera concurrently for automatic focusing of the varifocal lens. When the existing automatic focusing device is to be concurrently used as described above where the control system for the varifocal lens happens to be designed for analog processing, however, the interface between the photographic lens and the camera body is so complicated as to constitute itself a problem.

Even when the control system for the varifocal lens is adapted for digital processing, the following problem remains to be solved. When the work of power variation is to be made while the focusing lens group is in the focused position, for example, the control system for the varifocal lens tends to retain the focused state by moving the focusing lens group along the hyperbola mentioned above. Generally for purpose of spontaneously smoothening the change of the angle of view in the finder, for example, the focusing lens group is allowed to reach the focal length to be set by alternately repeating the focusing motion for compensation (hereinafter referred to as "shift compensating motion") and the motion of power variation for changing focal length. Whenever the alternately repeated shift motion is performed, the control system requires to compute the amount of delivery of the focusing lens group to the focusing position to be subsequently made. The standard value which forms the basis for the computation of the amount of delivery, however, is renewed for each computation to entail a disadvantage that the errors in the detection of the positions of the variable power lens group and the focusing lens group, the errors in the computation, the errors in the shift control, and other similar errors are suffered to accumulate gradually at a proportional sacrifice of the accuracy with which the shift control is effected.

Where the output of the focal distance detector is subjected to A/D conversion with an A/D converter and the outcome of the conversion is used as the information on focal length for the purpose of facilitating the interface between the photographing lens and the camera body, the output of the A/D converter always fluctuates though very minutely even if the variable power lens group is kept fixed on the optical axis. Further in the computation of the amount of delivery for the shift compensation on the basis of the output of the A/D converter, the computation errors such as those involved in rounding operations occur to aggravate the fluctuation of the output. When the focusing lens group is directly driven with the outcome of the computation, namely the continuous control is effected after the pattern of the analog control, the fluctuation mentioned above causes the focusing lens group to oscillate as an inevitable consequence.

In the varifocal lens of the type in which the focusing position for an object at an infinite distance is invariable relative to the change in the focal length, the inclination of the hyperbola reaches the maximum at the nearest possible position. When the motion for power variation inclusive of the shift compensating motion mentioned above is carried out from the shortest focal length to the longest focal length, therefore, there is a disadvantage that the time required for switching the shortest focal length to the longest focal length is notably varied.

The driving of the focusing lens group for the sake of the shift compensating motion is effected with a focus motor. Since the direction in which the work of power variation is performed is at the mercy of the user's discretion, the direction in which the focus motor is driven cannot be generally fixed. Furthermore, it takes long time for deciding the driving direction of the focus motor. The varifocal lens of this type, therefore, is deficient in response characteristic. As a solution for this problem, Japanese Patent Laid-Open Publication No. SHO 60(1985)-211,414 discloses an automatic focusing device which is designed to detect the change in the focal length of the variable power lens group and decide the driving direction of the focusing lens group on the basis of the outcome of the detection. In this conventional device, a variable resistor interlocked with a variable power lens group is incorporated so that the direction of power variation of the variable power lens group is detected by subjecting the output voltage of the variable resistor to analog processing and consequently the driving direction of the focusing lens is finally decided. The analog processing is effected by the use of a differential amplifying circuit, a sample hold circuit, and a zero-cross comparator, for example. On the assumption that $V_1$ stands for the output voltage mentioned above which exists after the previous renewal of focal length and $V_2$ for the output voltage which is obtained in the current work of power variation, the sample hold circuit retains the output voltage $V_1$, the differential amplifying circuit produces as the output thereof the difference between the output voltage $V_1$ retained as described above and the currently produced output voltage $V_2$, and the zero-cross comparator judges whether the output of the differential amplifying circuit is of a plus quantity or a minus quantity and, based on the output level, decides the driving direction of the focusing lens group.

This conventional device, however, has a possibility of being affected as by the variation of power source voltage applied to the variable resistor, the resolving power of the variable resistor, and the accuracy of the analog processing and consequently compelled to generate an erroneous operation of driving the focusing lens group in the direction opposite the direction to be correctly selected. The situation of this nature entails the possibility that the logic which is operating in the logical circuit for deciding the rotating direction of the focus motor will get out of order under the influence of the outputs of the limiter switches for terminal detection disposed one each at the opposite terminals of the nearest position and the infinite position and the output of the zero-cross comparator and, as the result, the focusing lens group will be deprived of controllability as held in a state of collision against the limiter switch.

Further the fact that the driving direction is produced correctly at times and incorrectly at other times leads to a disadvantage that the focusing lens group is compelled to generate oscillation. As the result, the focus motor incurs wasteful consumption of electricity or the members of the focus driving section undergo unnecessary wear.

In the description given so far, the motion of shift compensation has been portrayed as alternately repeating the motion of power variation and the motion of shift compensation for the sake of easy understanding. When the device is adapted for these two motions to proceed simultaneously, it permits a decrease in the time required for the operation and enjoys an improvement in operational efficiency. Where the varifocal lens operates by itself or by the use of part of the control system of the camera body, the variable power motor and the focus motor both rely for supply of power upon a battery and, for the control system which constitutes itself a load of the battery, the two motors mentioned above are a typical heavy load. When the two motors are simultaneously operated, therefore, the power source incurs a change (drop) of voltage and entails a disadvantage that the operating speed is lowered and the accuracy of positional control of the focusing lens group and the variable power lens group is impaired. The varifocal lens is generally composed of a number of lens groups and the individual lens groups have their motions controlled by means of cam grooves incised in a cam frame and these cam grooves have mutually different shapes. When the focal length is changed from the shortest level to the longest level, for example, the varifocal lens has a disadvantage that it fails to produce the motion of power variation at a uniform speed because the load as viewed from the standpoint of the variable power motor (the torque required for the change mentioned above) is never uniform but is largely varied by the position to which the variable power lens group is moved. From this disadvantage is further derived a drawback that the change of the angle of view is uniform relative to the motion of power variation and the scene produced in the finder has poor appearance particularly when the motion of power variation and the motion of shift compensation are alternately repeated. In other words, this drawback resides in impairment of the accuracy of control. Even when the motion of power variation and the motion of shift compensation are allowed to proceed simultaneously, there is the possibility that the load will be lightened instantaneously and the variable power lens group will be moved with a long quick stroke and, as the result, the shift compensation will exceed the allowable range and, in the worst case, go out of control.

SUMMARY OF THE INVENTION

An object of this invention is to provide a varifocal lens device which is inexpensive, simple in construction, and capable of accurately and quickly compensating the deviation produced in the image forming position in consequence of a renewal of the overall focal length a phenomenon peculiar to the varifocal lens.

Another object of this invention is to provide a varifocal lens device which is capable of quickly and automatically deciding the driving direction of a focusing lens group during the automatic compensation of the deviation produced in the image forming position peculiarly to the varifocal lens.

According to the present invention, the aforementioned objects are attained by a first varifocal lens device provided with a variable power optical system composed of a variable power lens group and a focusing lens group disposed in an optical axis, for compensating a deviation produced in the image forming position for an object when the focusing lens group is set at a focusing position between the nearest possible position to the infinitely far position on the optical axis corresponding to the object distance falling between the shortest possible distance to the infinitely long distance and then the overall focal length of the variable power optical system is subsequently renewed from a first to a second focal length selected freely between the shortest possible focal length to the longest possible focal length by means of the variable power lens group, the first device comprising: a first driving means for driving the variable power lens group; a second driving means for driving the focusing lens group; a first detecting means for detecting the absolute positions of the variable power lens group and the focusing lens group on the optical axis, a calculating means for receiving the information on the focal length and the position of the focusing lens group from the first detecting means and, based on the received information, for calculating an absolute amount of compensation of focal length necessary for the elimination of the deviation in the image forming position; a transforming means for transforming the compensated focus position as an absolute amount into the amount of movement as a relative amount; a second detecting means for detecting the amount of movement of the focusing lens group on the optical axis as a relative amount; a first controlling means for controlling the first driving means; and a second controlling means for receiving the data on distance measurement issued as an absolute amount from measuring means separately installed for measuring the distance to an object or receiving the output of the transforming means and, based on the data or the output so received and in accordance with the output of the second detecting means, for controlling the second driving means thereby driving the focusing lens group to an estimated focal position for the object or to the compensated focal position.

The first device described above is inexpensive and simple in construction and capable of quickly and accurately attaining the control of the position of the focusing lens group because it is so constructed as to accomplish the compensation of the deviation produced in the image forming position in consequence of a renewal of the overall focal length peculiarly to the varifocal lens by transforming the data on focus compensation calculated as an absolute value into the amount of movement as a relative amount and continuing to control the second driving means with the second controlling means until the amount of movement mentioned above conforms to the amount of movement of the focusing lens group on the optical axis to be detected by the second detecting means. Further, this device realizes both automatic focusing and compensation of the deviation in the image forming position and permits a decrease of cost through concurrent use of component parts because it is so constructed as to accomplish focus control of the focusing lens group by the same control system receiving the data on distance measurement issued as a relative amount from the measuring means of an automatic focusing device.

A second varifocal lens device contemplated by this invention for accomplishing the objects described above comprises: a first driving means for driving the variable power lens group; a second driving means for driving the focusing lens group; a first detecting means for detecting absolute positions of the variable power lens group on the optical axis and feeding out information on focal length and information on the position of the focusing lens group; a first calculating means for receiving the aforementioned information on focal length and, based on the information, for calculating the amount of delivery of the focusing lens group from the infinite far position to the nearest position correspondingly to the pertinent focal length; a second calculating means for receiving the output of the first calculating means and the data of the first detecting means as information on the position of the focusing lens group and, based on the ratio of the two outputs, for calculating a proportional constant; a third calculating means for receiving the proportional constant, the maximum amount of delivery, and the information on the position of the focusing lens group and, based on the information so received, for calculating the amount of the deviation of the image forming position from the focal position mentioned above to be produced in consequence of a renewal of the overall focal length as an amount of compensation; a transforming means for transforming the amount of compensation as an absolute amount to the amount of movement as a relative amount; a second detecting means for detecting the amount of movement of the focusing lens group on the optical axis as a relative amount; a first controlling means for controlling the first driving means; and a second controlling means for continuing the control of the second driving means thereby moving the focusing lens group until the output of the transforming means conforms with the output of the second detecting means, whereby the arithmetic operation of the second calculating means is carried out immediately before the first renewal is made in the overall focal length and immediately before the overall focal length is renewed after the focusing lens group is newly set at the estimated focal position.

The second device described above is capable of accomplishing accurate compensation for the deviation in the image forming position without entailing accumulation of the errors in the detection of the positions of the variable power lens group and the focusing lens group and the errors in the calculations of the maximum amount of delivery, the proportional constant, and the amount of compensation for the deviation in the image forming position even after the shift compensation due to the work of power variation is repeated because it is so constructed as to effect decision of the proportional constant as the basis for the calculation of the compensated focal position, namely the ratio of the maximum amount of delivery to the information on the position of the focusing lens group, exclusively by a calculation performed immediately before the first renewal is made in the overall focal length mentioned above and immediately before the overall focal length is renewed after the focusing lens group is newly set to the estimated focal position.

A third varifocal lens device contemplated by this invention for accomplishing objects described the above comprises: a first driving means for driving the variable power lens group; a second driving means for driving the focusing lens group; a detecting means for detecting the absolute positions of the variable power lens group and the focusing lens group on the optical axis; a calculating means for receiving the information on focal length issued from the detecting means and the information on the position of the focusing lens group and, based on the received information, for calculating as an amount of compensation the amount of movement of the focusing lens group to the compensated focal position necessary for compensation of the deviation in the image forming position; a judging means for comparing the amount of compensation with the reference amount (reference value) as a threshold amount and for issuing an execute signal when the amount of compensation exceeds the reference amount; a first controlling means for controlling the first driving means; and a second controlling means for controlling the second driving means thereby driving the focusing lens group to the compensated focal position based on the amount of compensation at the time that the execute signal is received.

The third device described above is inexpensive, simple in construction, and capable of quickly and stably effecting the control of the position of the focusing lens group because it is so constructed as to effect control of the second driving means, during the compensation of the derivation produced in the image forming position in consequence of a renewal of the overall focal length peculiarly to the varifocal lens, by enabling the second controlling means to drive the focusing lens group to the compensated focal position based on the amount of compensation only when the amount of compensation exceeds the reference amount as a threshold amount. Moreover, this device is capable of preventing wasteful wear of the second driving means in particular because the second driving means and the second controlling means are allowed to remain at rest until the amount of compensation exceeds the reference amount.

A fourth varifocal lens device contemplated by this invention for accomplishing the objects described above comprises: a first driving means for driving the variable power lens group; a second driving means for driving the focusing lens group; a first detecting means for detecting the position of the variable power lens group on the optical axis correspondingly to the overall focal length; a second detecting means for detecting the position of the focusing lens group; an externally operable indicating means for issuing to the first driving means a power ratio increment indicating signal instructing the variable power lens group to be driven from the shortest focal length side to the longest focal length side or a power ratio decrement indicating signal instructing the variable power lens group to be driven in the opposite direction from that for power ratio increment; and a controlling means for calculating the amount of compensation necessary for the elimination of the deviation in the image forming position relative to the focal length while the variable power lens group is being driven by the first driving means, for deciding the driving direction of the focusing lens group based on the output of the indicating means, and for controlling the second driving means thereby driving the focusing lens group to the focal position correspondingly to the amount of compensation.

The fourth device described above is such that the optical system of lens itself is very simple in construction, small, light, and inexpensive and, at the same time, the lens device as a whole is similarly small, light, and inexpensive. This device is capable of easily deciding, based on the output of the indicating means, the driving direction of the focusing lens group necessary for the compensation of the deviation produced in the image forming position peculiarly to the varifocal lens, effecting instantaneous compensation of the deviation in the image forming position, and enabling the focused state to be retained substantially constantly even when the overall focal length is renewed by the movement of the variable power lens group from the first to second focal length freely selected by the indicating means.

A fifth varifocal lens device contemplated by the present invention for accomplishing the objects described above comprises: a first driving means for driving the variable power lens group; a second driving means for driving the focusing lens group; a detecting means for detecting the positions of the variable power lens group and the focusing lens group on the optical axis; a calculating means for receiving the information on focal length and the information of the position of the focusing lens group issued from the detecting means and, based on the information so received, for calculating the amount of movement and the driving direction necessary for the movement of the focusing lens group to the compensated focal position for compensation of the deviation in the image forming position respectively as an amount of compensation and as a direction of focus compensation; a first controlling means for controlling the first driving means; an externally operable indicating means for indicating the direction of work of power variation necessary for renewal of the overall focal length; a judging means for transforming the direction of the work of power variation indicated by the indicating means, based on the specific relation arising from the characteristics of the varifocal lens, into the driving direction of the focusing lens group, for comparing the driving direction resulting from the transformation with the direction of focus compensation, and for issuing an execution signal only when the two directions mentioned above confirm with each other; and a second controlling means for controlling the second driving means so as to enable the focusing lens group to be driven to the compensated focal position based on the amount of compensation on condition that the execution direction signal has been received.

The fifth device described above is inexpensive, simple in construction, and yet capable of quickly and stably effecting the compensation of the deviation produced in the image forming position in consequence of a renewal of the overall focal length peculiarly to the varifocal lens because it is so constructed as to accomplish the compensation mentioned above by preparatorily transforming the direction of the work of power variation indicated by the indicating means, based on the specific relation arising from the characteristics of the varifocal lens, into the driving direction of the focusing lens group and thereafter, on the condition that the direction of focus compensation to be issued by the calculating means conforms with the driving direction mentioned above, enabling the second controlling means to control the driving of the second controlling means thereby driving the focusing lens group to the compensated focal position based on the amount of compensation to be issued by the calculating means.

A sixth varifocal lens device contemplated by this invention for accomplishing the object described above comprises: a first driving means for driving the variable power lens group; a second driving means for driving the focusing lens group; a detecting means for detecting the absolute positions of the variable power lens group and the focusing lens group on the optical axis; a calculating means for receiving the information on focal length and the information on the position of the focusing lens group to be issued from the detecting means and, based on the information thus received, for calculating the amount of movement of the focusing lens group to the compensated focal position necessary for the compensation of the deviation in the image forming position as an amount of compensation; a first controlling means for controlling the work of power variation for renewal of the overall focal length through the first driving means; a judging means for issuing an execution signal and an inhibiting signal to indicate the time at which the amount of compensation or the information on focal length exceeds the standard amount as a threshold amount; an inhibiting means for instructing the first controlling means to stop the work of power variation at the time that the inhibiting signal is received; and a second controlling means for controlling the second driving means thereby starting to drive the focusing lens group to the compensated focal position, based on the amount of compensation at the time that the execution signal is received, whereby during compensation of the deviation produced in the image forming position in consequence of a renewal of the overall focal length of the variable power optical system, the work of power variation is inhibited.

The sixth device described above is inexpensive, simple in construction, and yet capable of effecting quick and accurate control of the position of the focusing lens group because it is so constructed as to accomplish the compensation of the deviation produced in the image forming position in consequence of a renewal of the overall focal length peculiarly to the varifocal lens by causing the work of power variation for the renewal of the overall focal length to be inhibited while the work of focus compensation is in progress for the purpose of enabling the second controlling means to control the driving of the second driving means thereby driving the focusing lens group to the compensated focal position.

A seventh varifocal lens device contemplated by the present invention for accomplishing the objects described above comprises: a first driving means for driving the variable power lens group; a second driving means for driving the focusing lens group; a detecting means for detecting the positions of the variable power lens group and the focusing lens group on the optical axis and for producing in response thereto the information on focal length and the information on the position of the focusing lens group; a calculating means for receiving the information on the focal length and the information on the position of the focusing lens group and, based on the information thus received, for calculating as an amount of compensation the amount of movement for the focusing lens group to reach the compensated focal position necessary for the compensation of the deviation in the image forming position; a first controlling means for controlling the work of power variation for the renewal of the overall focal length through the medium of the first driving means; means for monitoring the amount of compensation and for continuing to issue an inhibiting signal over the period in which the amount of compensation exceeds the prescribed allowable amount; an inhibiting means for instructing the first controlling means to keep the work of power variation inhibited while the inhibiting signal is being received; and a second controlling means for controlling the second driving means so as to drive the focusing lens group to the compensated focal position based on the amount of compensation, whereby the work of power variation is inhibited while the amount of compensation exceeds the allowable amount during the execution of the work of focus compensation for automatic compensation of the work of power variation and of the deviation produced in the image forming position in consequence of the work of power variation.

The seventh device described above is capable of enabling the motion of focus compensation to follow infallibly a change in the speed of the motion of power variation and stably retaining the motion of focus compensation because it is so constructed as to permit simultaneous progress of the work of power variation and the work of focus compensation and keep the work of power variation inhibited while the amount of compensation arising from the work of power variation exceeds the allowable amount.

An eighth variable lens device contemplated by the present invention for accomplishing the objects described above comprises: a first driving means for driving the variable power lens group; a second driving means for driving the focusing lens group; a first detecting means for detecting the positions of the variable power lens group and the focusing lens group on the optical axis and for producing in response thereto the information on the focal length and the information on the position of the focusing lens group; a calculating means for receiving the information on the focal length and the information on the position of the focusing lens group and, based on the information so received, for calculating as an amount of compensation the amount of movement of the focusing lens group to the compensated focal position necessary for the compensation of the deviation in the image forming position; a second detecting means for detecting the speed of the work of power variation for driving the variable power lens group and renewing the overall focal length; a first controlling means for receiving the output of the first detecting means and, based on the output, for controlling the first driving means to perform the work of power variation at a prescribed speed, so as to retain the speed of the work of power variation at a prescribed level in spite of a change in the load of the first controlling means; and a second controlling means for controlling the second driving means so as to move the focusing lens group to the compensated focal position based on the amount of compensation.

The eighth device described above is capable of effecting quick and accurate compensation of the deviation in the image forming position without suffering the speed of power variation to be effected by a change in the load of the first driving means because the device is constructed to effect detection of the speed of the work of power variation by the second detecting means and permit retention of the aforementioned speed of the work constant by the first controlling means.

BRIEF DESCRIPTION OF THE DRAWINGS

FIG. 27 is a flow chart of an interrupt subroutine for the variable power speed control which is started for working the routine shown in FIG. 26.

DETAILED DESCRIPTION OF THE PREFERRED EMBODIMENTS

Figure 1:
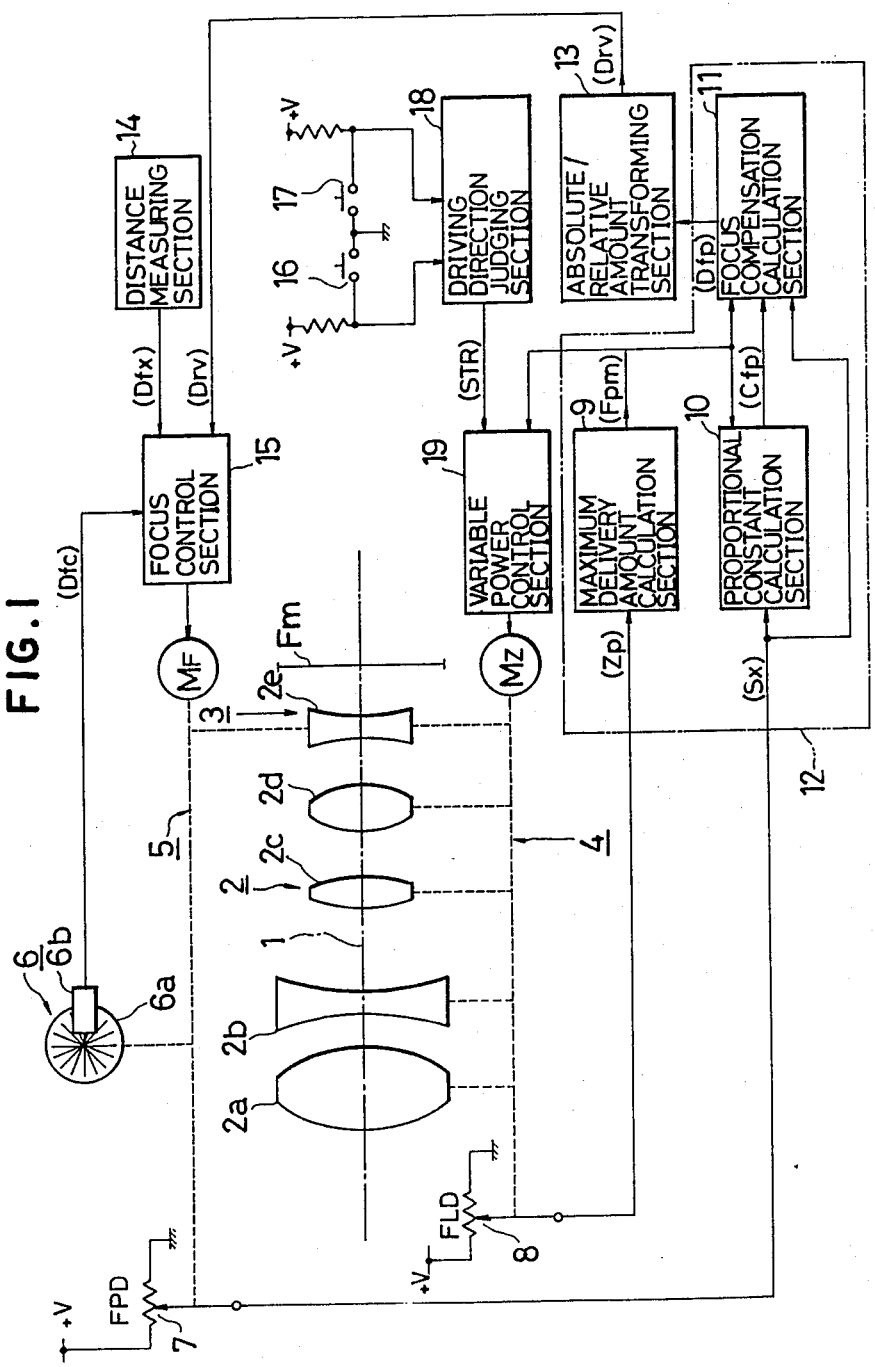
FIG. 1 is a block diagram illustrating the whole construction of a typical varifocal lens device as one embodiment of the present invention.

The present invention will now be described more specifically below with reference to embodiments illustrated in the accompanying drawings. As a preliminary thereto, the theory underlying the present invention will be described.

The term "zoom lens" is defined as a lens in which the focus of an image remains unchanged while the work of power variation (renewal of the overall focal length f) is in progress. As the starting point for the theory, this invention allows the focus to change (though this shift of the focus is finally removed by compensation). The theory will be described below tentatively on the premise of the front focusing system.

When the variation of the angle of view by the zooming operation is viewed from the visional standpoint, particularly on the condition that the so-called power zoom, i.e. a system relying on a motor for operation of the zooming mechanism, is used, it is logical to conclude that there is a linear relation between the rotation of the motor and the variation of the angle of view. Since the variation of the angle of view is approximately proportional to the reciprocal of the overall focal length f, i.e. 1/f, the variation of the angle of view appears to be natural where the rotation of the motor is proportional to the overall focal length f. When means for detecting the overall focal length f is assumed to be so constructed that the information on the focal length Zp to be produced by the detecting means is proportional to the rotation of the motor mentioned above, the relation between the overall focal length f and the information on the focal length Zp required for the variation of the angle of view to look natural can be expressed by the following formula (1):

$$\frac{1}{f} = C_{P0} \cdot Z_p + C_{P1} \quad (1)$$

wherein $C_{P0}$ and $C_{P1}$ stand for design constants.

Since the present theory allows for a change in the focal length $f_F$ of the focusing lens group F the relation between the overall focal length f and the focal length $f_F$ of the focusing lens group F which permits a decrease in the unwanted amount of motion of the focusing, lens group F produced on the wide-angle side by the equivalent motion inherent in the conventional zoom lens and consequently permits a decrease in the outside diameter of the lens will be sought.

So, the relation represented by the following formula will be considered.

$$f_F{}^2 = C_{F0} \cdot f \quad (2)$$

wherein $C_{F0}$ similarly stands for a design constant.

The formula (3) is derived by multiplying the opposite sides of the equation of the formula (2) by $1/f^2$ and then effecting substitution of the formula (1) in the right side of the resultant equation.

$$\left(\frac{f_F}{f}\right)^2 = C_{F0}(C_{P0} \cdot Z_p + C_{P1}) \quad (3)$$

Here, by letting $\delta$ stand for the amount of defocus on the film surface to be obtained by the calculation of an auto focusing system and by introducing new design constants $C_{10}$ and $C_{11}$, the amount of motion $\Delta$ of the focusing lens group F to the focal position will be found by calculating the formula, $$\Delta = (C_{10} \cdot Z_p + C_{11}) \cdot \delta \quad (4)$$

Now, the way of finding the distance of an object will be considered.

Now, a design constant $C_{30}$ is assumed for the postulate that the information on the focal position Sx is produced proportionately to the position of the focusing lens group on the optical axis (amount of motion). Consequently, the following formula (5) is derived.

$$Sx = C_{30} \cdot \Delta \quad (5)$$

The distance $d_1$ of the object, therefore, can be found from the following formula.

$$d_1 = (C_{40} \cdot Z_p + C_{41}) \cdot Sx + C_{42} \quad (6)$$

wherein $C_{40}$, $C_{41}$, and $C_{42}$ stand for newly introduced design constants.

Here, to simplify the symbols, the formula (6) will be rewritten as follows.

$$D = (C_0 \cdot Z_p + C_1) \cdot Sx + C_2 \quad (7)$$

wherein D stands for the distance of the object and $D = d_1$, $C_0$, $C_1$, and $C_2$ stand for design constants, satisfying $C_0 = C_{40}$, $C_1 = C_{41}$, and $C_2 = C_{42}$. Specifically, the formula (7) indicates that the shift of focus due to the work of power variation can be eliminated (compensated) by controlling Zp and Sx so as not to induce any change in the distance of the object D.

Now, embodiments of the varifocal lens device contemplated by the present invention will be described below.

FIG. 1 is a block diagram illustrating the construction of a typical varifocal lens device embodying the present invention. In FIG. 1, 1 stands for an optical axis of a variable power optical system, 2 for a variable power lens group disposed on the optical axis movably along the optical axis 1 so as to form the variable power optical system mentioned above, and 2a, 2b, 2c, 2d, and 2e stand respectively for a first lens group, a second lens group, a third lens group, a fourth lens group, and a fifth lens group severally formed of either one lens or a plurality of lenses. The fifth lens group 2e constitutes itself a focusing lens group 3. The first lens group 2a through the fifth lens group 2e, inclusive of the fifth lens group 2e, constitute a variable power lens group 2. The overall focal length of the variable power optical system composed of the variable power lens group 2 is denoted by f. The symbol Fm stands for the film surface. Reference numeral 4 is denoted a variable power driving section composed of a variable power motor Mz and a mechanical part (not shown) and intended as a driving means for driving the variable power lens group 2 for the purpose of setting the overall focal distance f at any desired point between the telescopic side focal distance as the longest focal distance (hereinafter referred to as "tele side") and the wide-angle side focal distance as the shortest focal length (hereinafter referred to as "wide side"). A focus driving section 5 comprises a focus motor $M_F$ and a mechanical part so as to serve as a driving means for driving the fifth lens group 2e, i.e. the focusing lens group 3, to a focal position between the infinitely far position ($\infty$ position) and the nearest position on the optical corresponding to the distance of the object. A focus counter 6 and a focusing lens group position detector (hereinafter referred to as "FPD") 7 are driven in conjunction with the focusing lens group 3 by the focus driving part 5. The focus counter 6 which comprises a slit disc 6a adapted to produce a rotation proportionate to the relative movement of the focusing lens group 3 on the optical axis and a photo-interrupter 6b adapted to issue a pulse proportionate to the revolution number of the slit disc 6a functions as a detecting means for detecting the amount of the relative movement mentioned above based on the pulse from the photo-interrupter 6b. The focusing lens group position detector 7 forms part of a detecting means for producing a voltage proportionate to the absolute position of the focusing lens group 3 on the optical axis as information on the focal position Sx namely as information on the position of the focusing lens group. A focal length detector (hereinafter referred to as "FLD" for short) 8, in combination with the FPD 7, forms the detecting means which is driven in conjunction with the variable power lens group 2 by the variable power driving section 5 and adapted to produce a voltage proportionate to the absolute position of the variable power lens group 2 on the optical axis or the overall focal length f as information on the focal length Zp. A maximum delivery amount calculation section 9 serves as a calculating means for receiving the information on the focal length Zp subjecting this information to A/D transformation, and thereupon calculating the amount of movement (or the amount of delivery) Fpm of the focusing lens group 3 from the $\infty$ position to the nearest position, included in the information Zp. A proportional constant calculation section 10 serves as a calculating means for receiving the output Fpm of the maximum delivery amount calculation section 9 and the output Sx, namely the information on the focal position (information on the position of the focusing lens group), of the FPD 7, subjecting the output Sx to A/D transformation, thereon calculating the ratio of the outputs and producing a proportional constant Cfp which will be fully described later on. A focus compensation calculation section 11 serves as a calculating means for receiving the three outputs Fpm, Cfp and Sx mentioned above and thereupon calculating an amount of compensation Dfp necessary for the purpose of focusing. The maximum delivery amount calculation section 9, the proportional constant calculation section 10, and the focus compensation calculation section 11 mentioned above jointly constitute a comprehensive compensation calculating section 12 which serves as a calculating means. The compensation focal position which the comprehensive compensation calculating section 12 produces as an absolute amount by calculation is identical with the amount of compensation mentioned above. An absolute/relative amount transforming section 13 serves as a transforming means for transforming the amount of compensation Dfp which is an absolute amount, into a relative amount of compensation Drv. A distance measuring section 14 measures the distance to an object and, based on the outcome of this measurement, produces a defocus amount Dfx as an absolute amount proportionate to the revolution number of the focus motor $M_F$ required for the movement to an estimated focal position. A focus control section 15 serves as a controlling means for receiving the output Dfc of the focus counter 6 and the relative amount of compensation Drv or the defocus amount Dfx mentioned above and, based on the outputs thus received, controls the focus driving section 5 so as to drive the focusing lens group 3 to the compensated focal position corresponding to the relative amount of compensation Drv or to the estimated focal position corresponding to the defocus amount Dfx. Variable power switches 16 and 17 each comprise an externally operable pushbutton switch and serves as a starting means for starting the work of power variation. There are also disposed a power ratio up switch (hereinafter referred to as "up switch") 16 and a power ratio down switch (hereinafter referred to as "down switch") 17. A driving direction judging section 18 receives the outputs of these up and down switches 16, 17 and, based on the outputs, decides the direction of rotation of the variable power motor Mz and issues a start signal (STR). A variable power control section 19 serves as a controlling means for receiving the start signal STR and the output Fpm and, based on the information thus received, controls the variable power driving section 4. The symbol +V stands for a power source. The input/output statuses of relevant sections are indicated only with main signals.

The focus counter 6 in the present embodiment is adapted to produce, as the output Dfc, "16" pulses per rotation of the focus motor $M_F$.

The maximum delivery amount calculation section 9 is adapted to execute an arithmetic calculation of the following formula.

$$Fpm = C_{22}/(Zp + C_{21}) + C_{23} \tag{8}$$

wherein Fpm stands for the maximum delivery amount of the focusing lens group 3 from the position to the nearest position as included in the information on the focal length Zp and $C_{21}$, $C_{22}$, and $C_{23}$ stand for intrinsic constants of the lens elements of the variable power lens group 2.

The constants $C_{22}$ and $C_{23}$ have the distance of object D as a parameter. It follows that these constants $C_{22}$ and $C_{23}$ each include the nearest distance $D_0$ of the object.

The proportional constant calculation section 10 is adapted to execute an arithmetic operation of the following formula.

$$Cfp = S(i)/Fp(i) \tag{9}$$

wherein Cfp stands for the output of the section 10 and S(i) and Fp(i) stand respectively for the information on the focal position Sx existing immediately before the work of power variation and the maximum delivery amount Fpm.

The focus compensation calculation section 11 is adapted to execute an arithmetic operation of the following formula.

$$Dfp = \{Cfp \cdot Fp(e)/256\} - S(i) \tag{10}$$

wherein Dfp stands for the output of the section 11 and Fp(e) for the maximum delivery amount Fpm corresponding to the information on the focal length Zp a the time that the compensation is effected.

The FLD 8 is so adapted that the output Zp thereof assumes a value of "255" on the tele side and a value of "0" on the wide side. The FPD 7 is adapted so that the output Sx thereof assumes a value of "0" at the ∞ position and "255" at the nearest position on the tele side.

Figure 2:
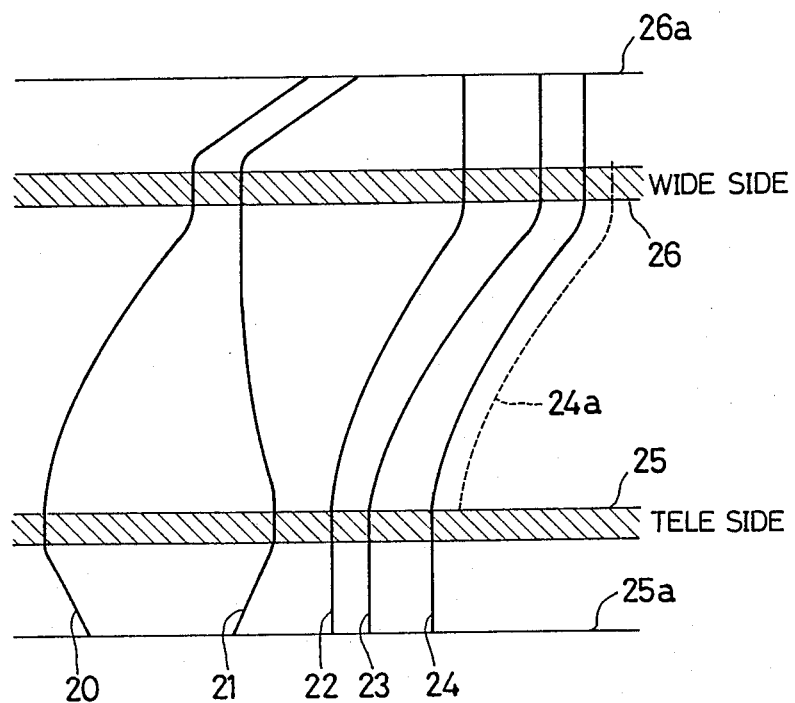
FIG. 2 is a cam diagram showing the movements of the variable power optical system illustrated in FIG. 1.

FIG. 2 is a cam diagram illustrating the movements which the variable power lens group 2 of FIG. 1 produces in the variable power mode, the macro-mode, the receipt mode assigned thereto.

In FIG. 2, reference numerals 20 to 24 stand for cam curves representing the loci which the first to fifth lens groups 2a to 2e respectively describe when they are moved by the variable power operation, the macro operation, and the receipt operation. Particularly, the cam curve 24 represents the locus which is described by the focusing lens group 3 while it is assuming the ∞ position, 24a stands for a cam curve representing a locus which is described by the fifth lens group 2e while the focusing lens group is at the nearest position, 25 for the tele position showing the position on the tele side, and 26 for the wide position showing the position on the wide side. And 25a and 26a respectively represent the macro position and the receipt position.

Figure 3:
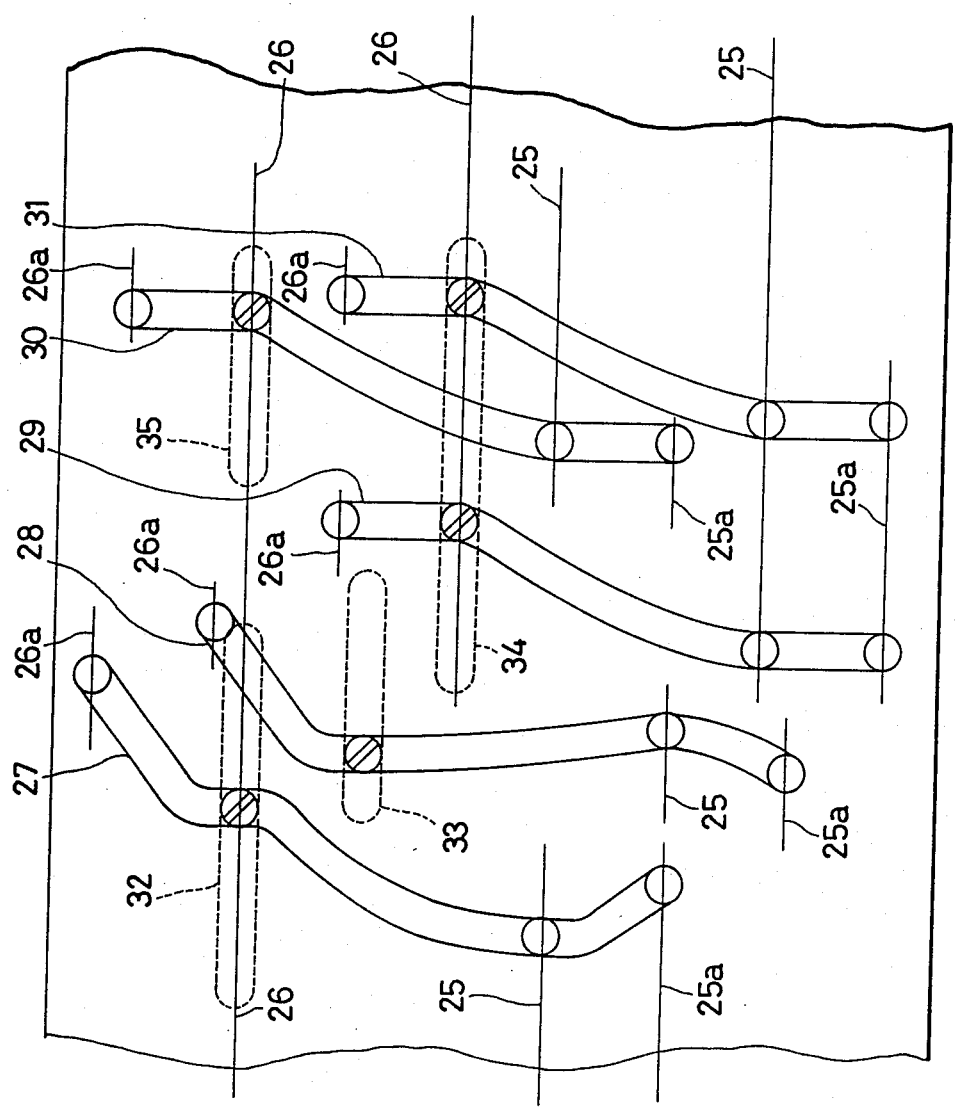
FIG. 3 is a developed diagram illustrating as magnified the concrete shapes of cam grooves corresponding to the cam diagram.

FIG. 3 is a developed diagram illustrating concrete shapes of the cam grooves corresponding to the cam diagram of FIG. 2, in a magnified state.

In FIG. 3, reference numerals 27 to 31 stand for cam grooves which are formed in a cam frame corresponding to the cam curves 20 to 24 of FIG. 2 and 32 to 35 for linear cam grooves formed in a stationary frame and adapted to guide the first lens group 2a, the second lens group 2b, the third lens group 2c and the fifth lens group 2e, and the fourth lens group 2d respectively in the direction of the optical axis. The tele position 25 and the wide position 26 mentioned above do not actually line in one straight line as illustrated in the cam diagram of FIG. 2 but are properly staggered in the circumferential direction by the individual cam grooves 27 to 31 so as to avoid mutual interference. In FIG. 2, the tele position 25 and the wide position 26 are depicted equivalently.

Figure 4:
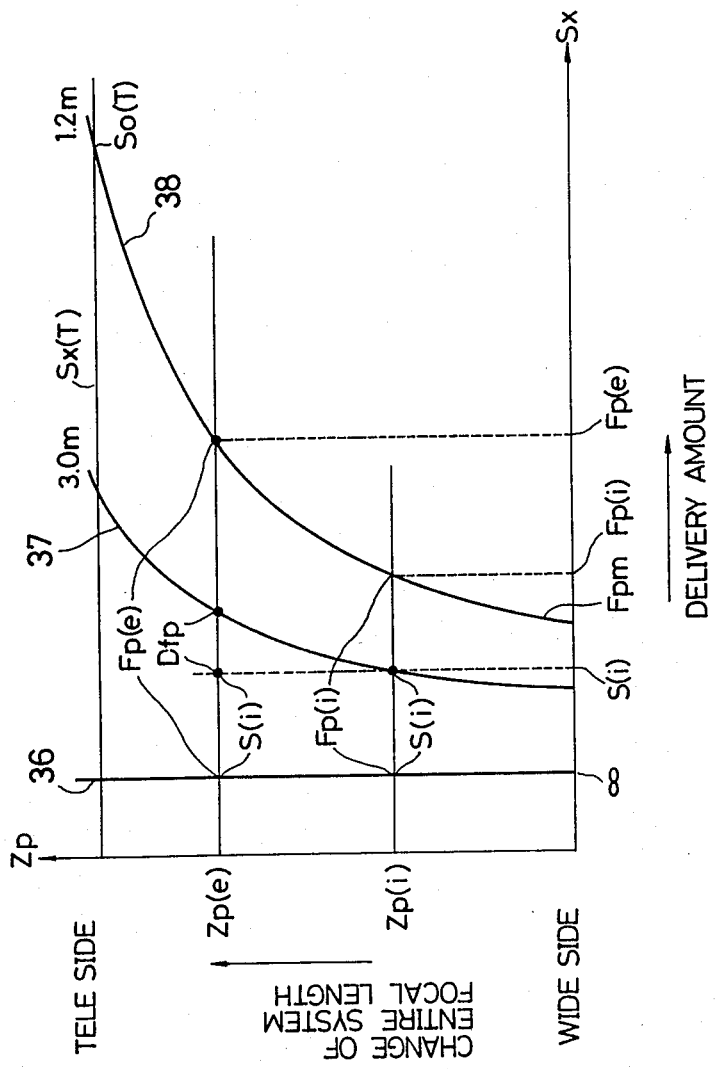
FIG. 4 is a graph showing characteristics of the device illustrated in FIG. 1, particularly for the explanation of the operation of various arithmetic sections regarding the relation between the overall focal length f to be set and the amount of delivery of the focusing lens group Sx corresponding to the distance D of an object for varying object distances.

FIG. 4 is a graph for explanation of the principle of arithmetic operations to be performed in the comprehensive compensation calculating section 12 in the embodiment of FIG. 1. FIG. 4 shows the relation between the entire system focal length f to be set and the delivery amount (amount of movement) of the focusing lens group 3 relative to the object distance D for representative magnitudes of the object distance D with the vertical axis as the scale of the change in the entire system focal length f and the horizontal axis the scale of the delivery amount of the focusing lens group 3 based on the focal position for infinity. In this case, the tele position is expressed as f=135 mm and the wide position as f=35 mm. In the diagram, reference numerals 36 to 38 stand for focal curves respectively for the object distances D of ∞, 3.0 m, and 1.2 m (nearest). They are obtained by setting the object distance D a parameter for the constants $C_{22}$ and $C_{23}$ in the formula (8) mentioned above, at ∞, 3.0 m, and 1.2 m. Thus, they constitute themselves hyperbolas which represent changes in the delivery amount of the focusing lens group 3 from the infinite position to the focal position relative to the change in the information on focal length Zp. The focus curve 38, therefore, represents the focus curve of the nearest position which produces the largest delivery amount and the amount of movement particularly from the focus curve 36 for ∞ to the focus curve 38 for the nearest position constitutes itself the maximum delivery amount Fpm mentioned above. Zp(i), S(i), and Fp(i) represent the information on focal length (information on the first focal length) Zp, the information focal position Sx, and the amount of movement (maximum delivery amount) Fpm, at the aforementioned point Ap(i) from the focus curve 36 for ∞ to the focus curve 38 for the nearest distance, respectively immediately before the operation of power variation and Zp(e), Fp(e), and Dfp represent the information on focal length (information on the second focal length) at the point that compensation should be made and the amount of movement from the focus curve 36 to the focus curve 38 and the amount of compensation at the aforementioned Zp(e), respectively after the variable power driving section 4 begins to operate.

When the ratio of the maximum delivery amount Fp(i) on Zp, namely on Zp=Zp(i), immediately before the operation of power variation to the delivery amount S(i) made to the present position of the focusing lens group 3 is found by the aforementioned formula (9) and then the focusing lens group 3 is given no movement by the operation of power variation (no focusing action produced during the operation of power variation) on Zp, namely Zp=Zp(e), after completion of the operation of power variation, S(i) remains to be equal to the aforementioned S(i) and Fe(e) can be found by effecting substitution of Zp(e) in the formula (8). In other words, Dfp which is an unknown value on Zp=Zp(e) can be found by the formula (10) using the proportional constant Cfp to be found by the formula (9). This Dfp constitutes itself an absolute amount of compensation. In FIG. 4, Sx(T) represents the information Sx on the focal position where the information, Zp on the focal length is at a position on the tele side and So(T) the information Sx on the focal position when the aforementioned Sx(T) is on the focus curve 38 for the nearest position (namely the point of intersection of Sx(T) and Fpx).

Figure 5:
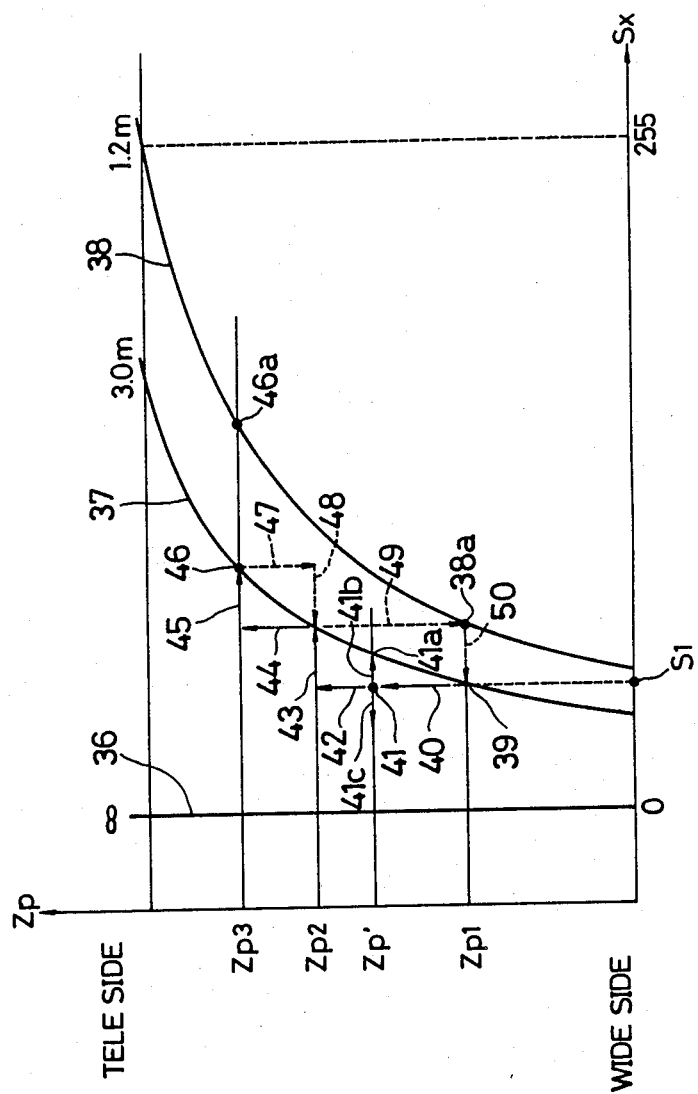
FIG. 5 is a graph depicting the operation of the embodiment of FIG. 1, FIG. 6 and FIG. 7 are flow charts showing the sequence of operation of the embodiment illustrated in FIG. 1.

FIG. 5 is a graph for explanation of the operation of the embodiment illustrated in FIG. 1. In this graph, the parts similar to those found in FIG. 4 are designated by the same reference numerals.

In FIG. 5, reference numerals 38a and 39 stand for the points at which the line Zp=Zp$_1$ intersect the focus curves 37 and 38; 40, 42, and 44 for arrows indicating the amounts of chain and directions of the information Zp on focal length during the operation power ratio up; $S_1$ for the value of the information Sx on the focal position of the point 39; 41 and 41a for the points at which the imaginary lines of Sx=S$_1$ on Zp=Zp′ intersect the focus curve 37; 43 and 45 for arrows indicating the amounts of change and directions of the information Sx on the focal position during the operation of power ratio up; 46 and 46a for the points at which the focus curves 37 and 38 intersect the line of Zp=Zp$_3$; 47 and 49 for arrows indicating the amounts of change and directions of Zp during the operation of power ratio down; and 48 and 50 for broken line arrows indicating amounts of change and the information Sx on the focal position during the operation of power ratio down. The arrows 43 and 48 are both parallel to Zp=Zp$_2$.

Now, the operation of the embodiment constructed as described above will be explained. As a preliminary to the explanation on the operation of power variation as an essential part and on the operation of shifting for compensation of the focal movement, the operation of automatic focusing in the conventional automatic focusing device will be described. It is assumed that the focusing lens group 3 is initially located at the nearest position, for example, and that the distance to a given object is 3.0 m (D=3.0 m). As the distance measuring switch for starting the motion of distance measurement or the release switch for starting the photographic motion (neither shown) is actuated, the distance measuring section 14 is set operating to measure the distance to the object (not shown) and produces the outcome of this measurement as the defocus amount Dfx reduced to the revolution number of the focus motor $M_F$. The focus control section 15, on receiving this output, sets the focus motor $M_F$ rotating and, at the same time, monitors the output Dfc of the focus counter 6, and stops the focus motor $M_F$ on detection of the focal position of Dfc=Dfx. This situation, as viewed in FIG. 5, arises when the focusing lens group 3 is set on the focus curve 37 for 3.0 m. In other words, the focusing lens group 3 has completed the movement thereof from the point 38a to the point 39 in the diagram of FIG. 5.

Now, the operation of power variation and the shifting operation will be described with reference to the flow charts of FIG. 6 and FIG. 7. It is assumed that the focusing lens group 3 is located where the object placed at a distance of 3.0 m is focused as described above. The focusing lens group 3, therefore, falls on the focus curve 37 in FIG. 5.

First, the operation of power ratio up with the movement from the wide side to the tele side will be described. A depression exerted on the up switch 16 of FIG. 1 causes the driving direction judging section 18 to issue as an output a start signal (STR) including the information on the direction of power variation, causing "START" in the flow chart of FIG. 6. First, at the conditional branch "IS MAGNIFICATION UP? " the driving direction judging section 18 checks the existing state of the up switch 16. In the present case, the branching proceeds toward YES. If the branching occurs toward NO, then the driving direction judging section 18 checks the existing state of the down switch 17 at the subsequent conditional branch "IS MAGNIFICATION DOWN? " If the down switch 17 happens not to be in operation, the branching proceeds toward NO and returns to the conditional branch "IS MAGNIFICATION UP? " This same operation is repeated until either of the switches 16 and 17 is set operating. Here, this loop of operation will be referred to as "SWITCH CHECK LOOP". Then, at the next step "ZDR=1" the driving direction judging section 18, discerning the driving direction to be on toward magnification up, issues a start signal (STR) including the outcome ZDR=1 of judgment to the variable power controlling section 19. Then, at the "READ Zp" step and the "READ Sx" step, the maximum delivery amount calculating section 9 receives the output Zp of the FLD 8 in the form of the information on focal length and effects A/D transformation and the proportional constant calculating section 10 receives the output Sx of the FPD 7 in the form of the information on the position of the focusing lens group and effects A/D transformation. The outputs of the transformation are now assumed to be $Zp_1$ and $S_1$ indicated in the diagram of FIG. 5. In other words, the variable power lens group 2 is assumed to be located at the point 39. At the next step "CALCULATE MAXIMUM DELIVERY AMOUNT" the maximum delivery amount calculation section 9 performs a calculation to find the maximum delivery amount Fpm by effecting substitution of the aforementioned $Zp_l$ in the formula (8) mentioned above.

At the next conditional branch "IS OBJECT DISTANCE UPDATED?" the presence or absence of any change in the object distance is checked after the up and down switches 16, 17 have been operated from the state assumed at the end of the preceding focusing operation, namely from the object distance (3.0 m specifically in the aforementioned case) set by the aforementioned automatic focusing operation preparatory to photography. In the present case, since the object distance D remains to be 3.0 m, the branching proceeds toward NO. At the next conditional branch "IS FIRST VARIABLE POWER?" the branching proceeds toward YES because the answer is in the affirmative. At the next step "CALCULATE PROPORTIONAL CONSTANT" the proportional constant calculation section 10 receives the maximum delivery amount Fpm and performs a calculation to find the proportional constant Cfp in accordance with the formula (9). Specifically, this proportional constant Dfp is determined by substituting S(i) for the aforementioned $S_1$ and Fp(i) for Fpm with respect to the aforementioned $Zp_l$ respectively in the formula (9). This calculation, as viewed in the diagram of FIG. 5, permits determination of the ratio of the length from the focus curve 36 for $\infty$ to the point 39 on $Zp=Zp_1$ to the length from the focus curve 36 for to the point 38a. As the processing reaches 1 in the flow chart of FIG. 6, it moves on to 1 in the flow chart of FIG. 7. Here, the operation from the end of the "SWITCH CHECK LOOP" mentioned above through 1 will be referred to as "INITIALIZING OPERATION".

Figure 6:
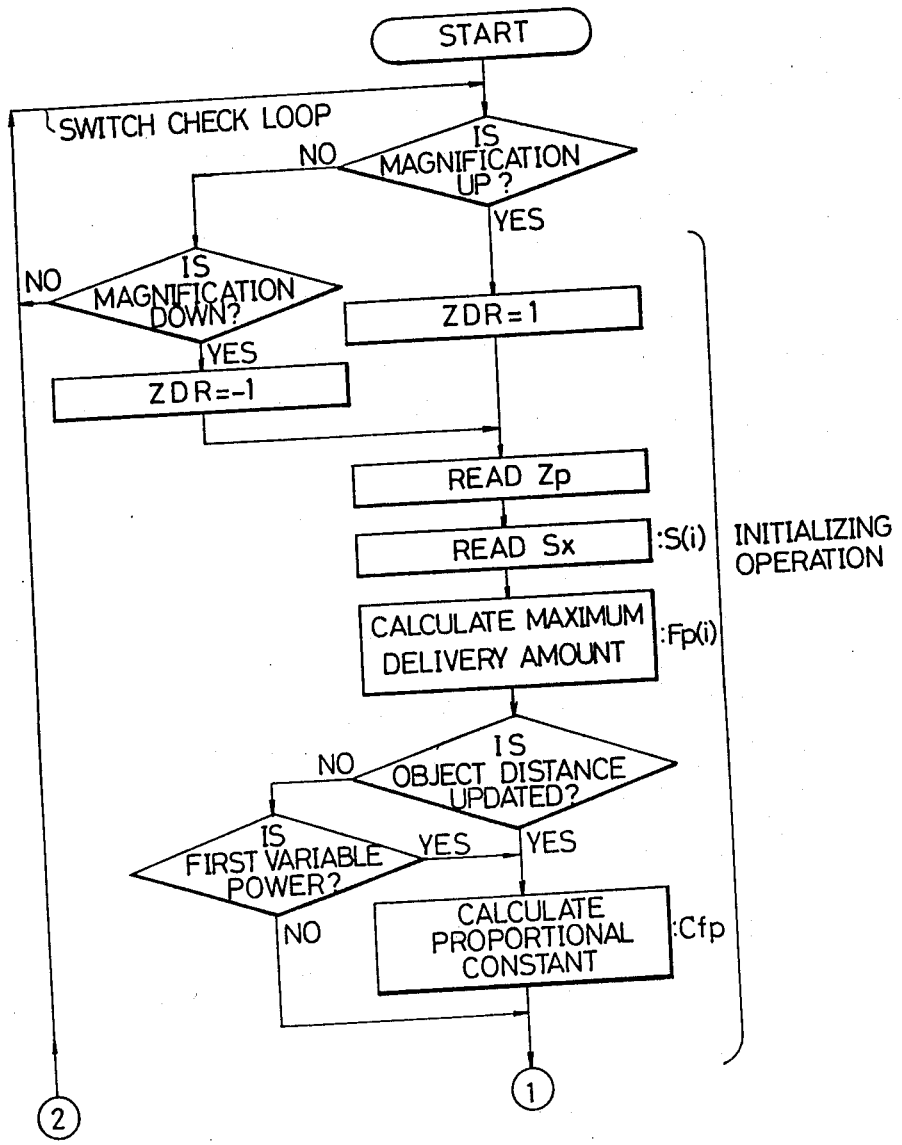
Figure 7:
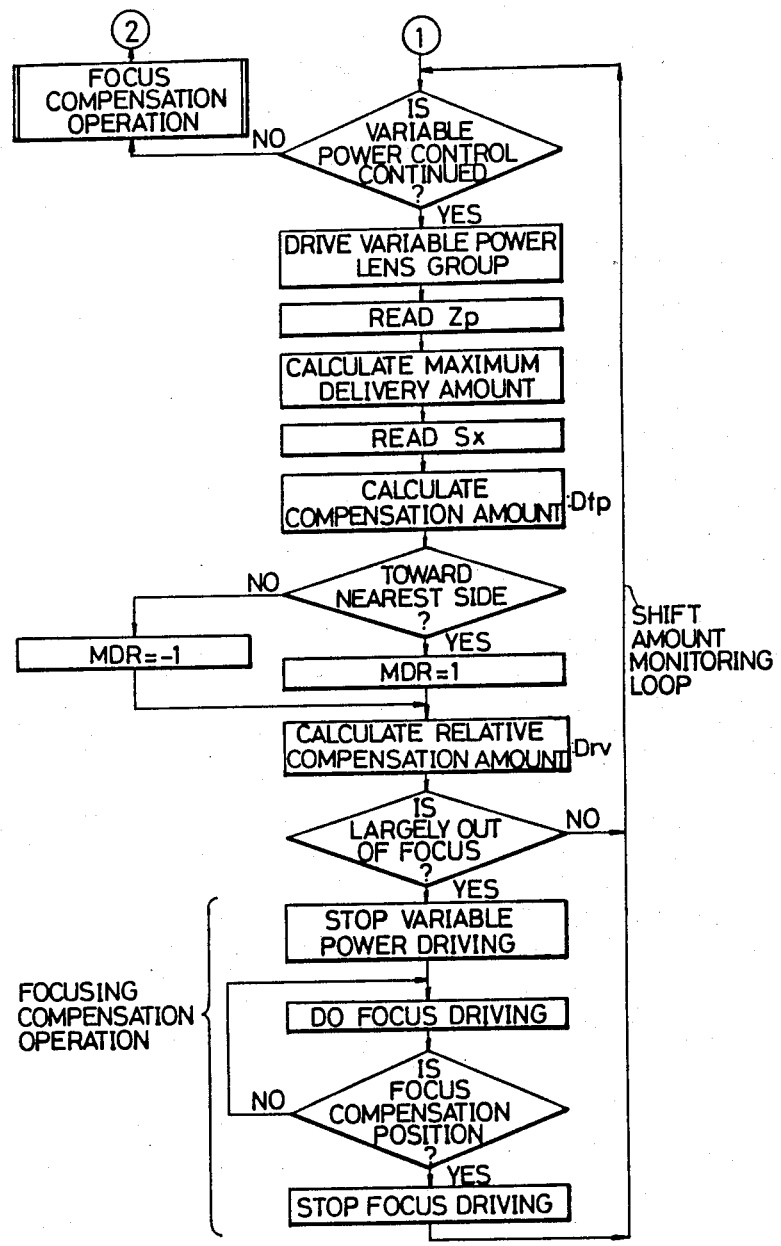

At the conditional branch "IS VARIABLE POWER CONTROL CONTINUED?" in the flow chart of FIG. 7, the driving direction judging section 18 checks the up/down switch 16/17 to find whether it has been depressed or not (presence or absence of ON status). It is now assumed that the up switch 16 has been depressed. (Hereinafter this state will be assumed to be continuing unless otherwise specified.) At the aforementioned conditional branch, therefore, the branching proceeds toward YES. At the next step "DRIVE VARIABLE POWER LENS GROUP" the variable power control section 19, based on the aforementioned variable power direction ZDR=1, sets the variable power motor Mz in the direction of magnification up, thus initiating the variable power operation. As the result, the variable power lens group 2 is moved and the output Zp of the FLD 8 is varied as indicated by the arrow 40. Since the FPD 7 has not yet set the focus motor $M_F$ operating, the fifth lens group 2e changes its position (moves) along the cam curve 24 of FIG. 2 or the cam groove 31 of FIG. 3 and the focusing lens group 3 is retained fast at a fixed position in spite of the variable power operation. At the next step "READ Zp" the maximum delivery amount calculation section 9 reads in the latest value Zp' (position of the point 41) of the information Ap on the focal length which has just began to vary in the direction indicated by the arrow 40 in FIG. 5. At the next step "CALCULATE MAXIMUM DELIVERY AMOUNT" the latest value of Fpm is calculated by effecting the aforementioned substitution of Zp' in the formula (8). At the step "READ Sx" though no change ought to have arisen, the focus compensation calculation section 11 reads in Sx once again for the sake of precaution and in consideration of rounding error and mechanical backlash in the A/D transformer. Then, at the next step "CALCULATE COMPENSATION AMOUNT" the compensation amount Dfp as an absolute amount is calculated in accordance with the formula (10) using the proportional constant Cfp found in the step "CALCULATE PROPORTIONAL CONSTANT" in the flow chart of FIG. 6 and substituting Fp(e) for Fpm relative to Zp' and $S_1=S(i)$ for the Sx read in again. At the next conditional branch "TOWARD NEAREST SIDE?" the focus compensation calculation section 11 decides the question as to whether the focusing direction is toward the nearest side or the $\infty$ side. Specifically in the present case, since the variable power direction is toward increasing magnification or in the direction of the arrow 40 of FIG. 5, the judgment to be drawn is that for the purpose of focusing, the focusing lens group 3 has to be driven in the direction of the arrow 43, namely toward the focus curve 37. Consequently, the branching proceeds toward YES. Then, at the next step "MDR=1" the information on focal direction, MDR=1, purporting the driving toward the nearest side, is issued in combination with the compensation amount Dfp. At the next step "CALCULATE RELATIVE COMPENSATION AMOUNT" which constitutes one of the essential requirements for the present embodiment, the absolute/relative amount transforming section 13 effects transformation of the compensation amount Dfp as an absolute amount into the compensation amount Drv as a relative amount by performing a calculation, Drv=Dfp·Ct, wherein Ct stands for the constant which is fixed by the specific construction of the focus counter 6 and the focus driving section 5. The purpose of the operation of this essential part resides in transforming the amount of movement Dfp of the focusing lens group 3 calculated from the information Zp on the position of the variable power lens group 2 into the revolution number of the focus motor $M_F$. It is theoretically possible to effect control of the focusing lens group 3 using the compensation amount Dfp while monitoring the output Sx of the FPD 7. Actually, however, since the range of movement (between the position $\infty$ and the nearest position) allowed for the focusing lens group 3 is on the order of several mm, it is extremely difficult to effect the positional control accurately with the compensation amount (amount of movement) Dfp and the FPD 7 within this limited range of movement of several mm. If this positional control is realized at all, then the FPD 7 requires to operate with extremely high accuracy. The FPD 7 then will be prohibitively expensive and, at the same time, the control for the stop of the focus motor $M_F$ will consume very much time. The present embodiment, therefore, contemplates effecting the aforementioned positional control accurately and quickly by transforming the compensation amount Dfp into the relative compensation amount Drv as a relative amount as described above and consequently heightening the resolution.

Recent cameras are more often than not provided with an automatic focusing device. When the automatic focusing function in the automatic focusing device is diverted for the aforementioned shift compensation of the varifocal lens, this diversion ought to contribute to promotion of shared use of component parts and consequent economization of camera production. To make the most of this advantage, the present embodiment uses the absolute/relative amount transforming section 13 for transforming the compensation amount Dfp into the data of relative amount reduced to the revolution number of the focus motor $M_F$ which is the same signal as the defocus amount Dfx produced from the distance measuring section 14 of the aforementioned automatic focusing device.

With reference again to the flow chart of FIG. 7, at the subsequent conditional branch "IS LARGELY OUT OF FOCUS?", the absolute/relative amount transforming section 13 checks the relative compensation amount Drv to find whether it has surpassed the prescribed level or not (for example, Drv=20) and monitors the focus movement (shift amount) due to the operation of power variation to find whether it has surpassed the prescribed level or not. In the present case, since it is not long after the driving of the variable power lens group 2 is started and the shift amount (corresponding to the length between the point 41 and the point 41a in the diagram of FIG. 5) is consequently small, the flow of processing is branched toward NO and returned to the conditional branch "IS VARIABLE POWER CONTROL CONTINUED?" to repeat the operations mentioned above all over again. Here, the operational loop described so far will be referred to hereinafter as "SHIFT AMOUNT MONITORING LOOP". The variable power motor Mz continues its rotation to drive the variable power lens group 2 in the direction of the arrow 40 toward the point 41 and further past this point 41 in the direction of the arrow 42 in the diagram of FIG. 5. On the assumption that Drv=20 is satisfied where $Zp=Zp_2$ is reached, the aforementioned shift amount monitoring loop is branched toward YES at the conditional branch "IS LARGELY OUT OF FOCUS?". At this time, the absolute/relative transforming section 13 produces the compensation amount Drv and the aforementioned condition MDR=1. Then, at the next step "STOP VARIABLE POWER DRIVING", the variable power control section 19 stops the variable power motor Mz. At the next step "DO FOCUS DRIVING", the focus control section 15, which has received the aforementioned relative compensation amount Drv and the information on focal direction MDR=1 sets the focus motor $M_F$ rotating and drives the focusing lens group 3 toward the nearest side, namely in the direction of the arrow 43 in FIG. 5. This direction equals that from the cam curve 24 toward the cam curve 24a in the diagram of FIG. 2. At the next conditional branch "IS FOCUS COMPENSATION POSITION?", the focus control section 15 continuously compares the output Dfc from the focus counter 6 with the relative compensation amount Drv and continues the driving of the focusing lens group 3 by causing the processing to be branched toward N and returned to the step "DO FOCUS DRIVING" until the two amounts mentioned above conform to each other. Thereafter, when the focusing lens group 3 moving in the direction of the arrow 43 in the diagram of FIG. 5 arrives on the focus curve 37 for 3.0 m to satisfy Dfc=Drv, the processing is branched toward YES at the aforementioned conditional branch. As the result, the focus motor $M_F$ is brought to a stop at the next step "STOP FOCUS DRIVING". The operations performed up to this point constitute themselves the first cycle of the operation of power variation and the shifting operation. Then, the flow chart of FIG. 7 returns to the aforementioned conditional branch "IS VARIABLE POWER CONTROL CONTINUED?" and set out for the second cycle of control. Here, the operations from the aforementioned step "STOP VARIABLE POWER DRIVING" to the step "STOP FOCUS DRIVING" which follow the aforementioned "SHIFT AMOUNT MONITORING LOOP" will be referred to hereinafter as "FOCUS COMPENSATION OPERATION".

The operation of the second cycle is switched to the focus compensation operation mentioned above when the variable power lens group 2 is driven in the direction of the arrow 44 by the operation of the "SHIFT AMOUNT MONITORING LOOP" and the shift amount consequently reaches the prescribed amount at the point of $Zp=Zp_3$. Then, on the assumption that the up switch 16 assumes the OFF state during the course of the focus compensation operation, the focus compensation operation is continued and the focusing lens group 3 is driven in the direction of the arrow 45. Thereafter, when the focusing lens group arrives on the focus curve 37 (the position of the point 46) and the pertinent component parts complete the focus compensation operation and return to the conditional branch "IS VARIABLE POWER CONTROL CONTINUED?", the driving direction judging section 18 detects the fact that the up switch 16 is in the OFF state and causes the processing to be branched toward NO and forwarded to the next sub-routine "FOCUS COMPENSATION OPERATION". The contents of the operation of this sub-routine are identical with those of the focus compensation operation described above. In the present case, substantially no operation is produced at the step of the sub-routine "FOCUS COMPENSATION OPERATION" because the step "STOP VARIABLE POWER CONTROL" has been already executed to stop the variable power motor Mz and increase the shift amount so much as to satisfy Drv=0. In other words, this sub-routine is prepared for the possible situation in which the uptown switch 16/17 is turned off during the course of the operation of the operation of the shift amount monitoring loop. The flow chart of FIG. 7, on arrival at 2 , continues to 2 of FIG. 6 and enters the "SWITCH CHECK LOOP" mentioned above. Since neither the up switch 16 nor the down switch 17 is depressed, the operation of "SWITCH CHECK LOOP" will be repeated. Thus, all the magnification up operations have been completed.

At this time, the variable power lens group 2 and the focusing lens group 3 are located at the point 46 of FIG. 5. The operation of magnification down will be described briefly to portray exclusively the essential points of the operation which is effective in two manners. In the first manner, the operation of magnification down is initiated at the point 46. In the second manner, the operation of magnification down is stated after the object distance D has been renewed preparatorily.

In the first manner of the operation, on the assumption that the down switch 17 has been depressed, the processing is branched toward YES at the conditional branch "IS MAGNIFICATION DOWN?" within the "SWITCH CHECK LOOP" illustrated in the flow chart of FIG. 6 and the signal ZDR=−1, signifying that the variable power direction is toward the magnification down is issued at the step "ZDR=−1" and, during the course of the initial setting operation mentioned above, the proportional constant Cfp used in the previous magnification up operation is left intact (stored) by allowing the processing to be branched toward NO both at the conditional branch "IS OBJECT DISTANCE UPDATED?" and the conditional branch "IS FIRST VARIABLE POWER?" and avoiding calculation of a new proportional constant Cfp. With reference to the flow chart of FIG. 7, the variable power operation is started and, within the shift amount monitoring loop mentioned above, the processing is branched toward NO at the conditional branch "TOWARD NEAREST SIDE?" and the focusing direction is decided toward the side at the step "MDR=−1" In the flow chart of FIG. 5, when the variable power lens group 2 moves from the, point 46 in the direction of the arrow 47 and the shift amount surpasses the prescribed level, the existing operation switches to the focus compensation operation mentioned above and the focusing lens group 3 is driven in the direction of the arrow 48 to complete the first cycle. Then, when the movement proceeds in the directions of the arrow 49 and the arrow 50 and the down switch 17 is turned OFF, the operation is stopped.

In the second manner, it is assumed that by the focusing operation, the focusing lens group 3 is moved from the point 46 to the point 46a, for example, and brought to a focused state at the point 46a. When the down switch 17 is depressed, the branching of the processing within the switch check loop in the flow chart of FIG. 6 is the same as in the case of the first manner described above to effect calculation of a new proportional constant Cfp by causing the processing at the conditional branch "IS OBJECT DISTANCE UPDATED?" to be branched toward YES. The operation which follows is the same as in the case of the first manner will not be described here to avoid repetition. As described above, the present embodiment is so constructed that the compensation of any deviation occurring in the image formation in consequence of the variable power operation is effected by transforming the compensation amount DFP calculated as an absolute amount into the relative compensation amount Drv capable of being compared with the count number of the focus counter 6 corresponding to the angle of rotation of the focus motor $M_F$ (pulse number) and carrying out necessary control of the position of the focusing lens group 3. In this construction, the positional control of high accuracy can be obtained because the ability of resolution is decisively high as compared with a construction using a potentiometer like FPD 7 as means for detection of the relative movement. Further, the construction of this embodiment is capable of materializing quick control of the position because it has no use for any A/D transformation. An effort to realize the control of the stop position of the focus motor $M_F$ with high accuracy by analog control incurs a detestful phenomenon of hunting and renders the positional control a time-consuming work. Conversely, an effort to realize quick control necessitates use of a prohibitively expensive analog control circuit and renders the operation itself economically infeasible. The present embodiment realizes quick control of the position with an inexpensive and simple construction.

The present embodiment is further constructed so that the absolute/relative amount transforming section 13 effects necessary shift compensation by transforming the compensation amount Dfp into the relative compensation amount Drv which is a relative amount (digital amount) similarly to the defocus amount Dfx produced by the distance measuring section 14 of an automatic focusing device incorporated in a camera. Thus, part of the automatic focusing device built in the camera, namely the focus counter 6, the focus motor $M_F$, the focus control section 15, etc., can be diverted for the shift compensation of the varifocal lens. The overall construction can be simplified by the part thus diverted and the cost can be proportionately decreased.

Moreover, the present embodiment is constructed so that the proportional constant Cfp is calculated at the point preceding the first variable power operation and the point preceding the subsequent variable power operation which follows the focusing operation and the data obtained by the calculation is committed to memory and thereafter utilized for the compensation of the deviation in the image forming position due to a renewal of the focal position. Thus, the error in the shift control due to the repetition of the variable power operation, the error in the detection of positions of the focusing lens group 3 and the variable power lens group 2, and the error in the calculations performed by the various arithmetic operation parts 9, 10, and 11 are not suffered to accumulate. Thus, the shift compensation can be carried out with very high accuracy. The judgment at the conditional branch "IS LARGELY OUT OF FOCUS?" in the flow chart of FIG. 7 need not be limited to Drv≧20 but may be increased or decreased from this particular value by optimally selecting the speed of control, the stability of control, appearance of the object viewed through the finder, for example. Alternatively, the construction may be so modified that the shift compensation will be carried out after the variable power reaches a prescribed amount.

Of course, the output Dfc of the focus counter 6 need not be limited to 16 pulses per rotation of the focus motor $M_F$ but may be increased or decreased from this particular number without jeopardizing the balance between the accuracy of control and the speed of control.

During the course of the focus compensation operation, the variable power driving need not be suspended but may be simultaneously carried out on the condition that the simultaneous performance of the two operations does not adversely affect the power sources for the two motors $M_F$ and Mz.

The embodiment described above is constructed so that the automatic focusing is effected on the basis of the defocus amount signal to be received from the distance measuring section 14 in the automatic focusing device incorporated in the camera. Of course, the present invention can be applied effectively to a camera which is not provided with an automatic focusing device.

Figure 8:
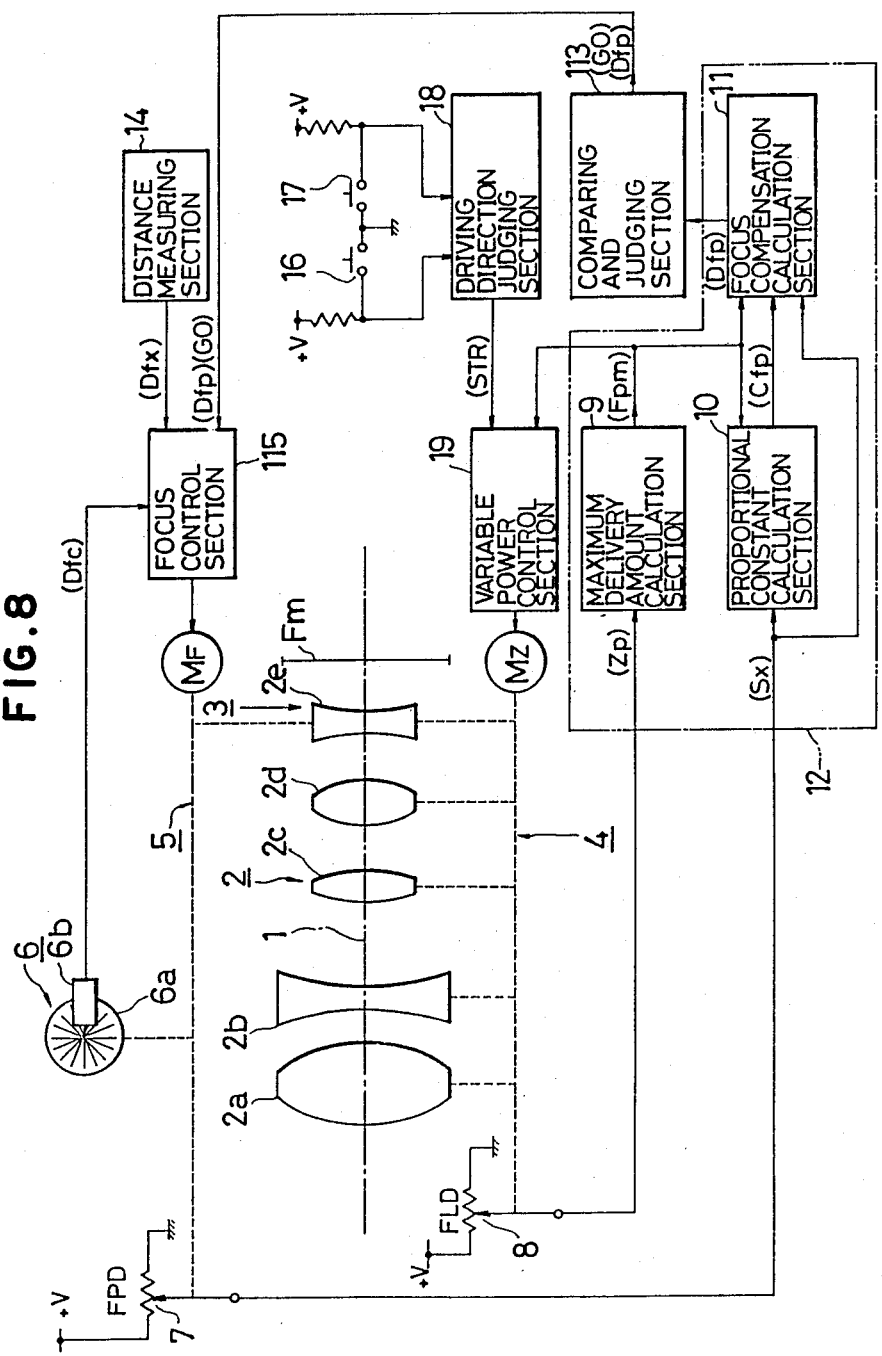
FIG. 8 is a block diagram illustrating the whole construction of another typical varifocal lens controlling device embodying the present invention.

FIG. 8 is a block diagram illustrating the construction of another typical varifocal lens device embodying the present invention. The device of FIG. 8 is identical in construction to the device of FIG. 1 except for the following point.

The device of FIG. 8 is provided with a comparing and judging section 113 in the place of the absolute/relative amount transforming section 13 of the device of FIG. 1. The comparing and judging section 113 compares the compensation amount Dfp from the comprehensive compensation calculating section 12 with the reference value Dst as a predetermined threshold value (such as, for example, Dst=20) and, when the compensation amount Dfp surpasses the reference value, produces an execution signal (GO) in combination with the compensation amount (Dfp). This reference value, Dst=20, is set at a level amply larger than the variable component of the output (compensation amount Dfp) due to the error of transformation in the A/D transformation and the errors of calculation in the comprehensive compensation calculating section 12.

The focus control section 115 serves the purpose of receiving the output Dis of the focus counter 6 and the compensation amount Dfp or the defocus amount Dfx mentioned above and controlling the focus driving section 5 in such a manner that the focusing lens group 3 will be driven to the compensated focal position corresponding to the compensation amount Dfp at the time of receiving the execution signal (GO) mentioned above and to the estimated focal position corresponding to the Dfx at the time of receiving the defocus amount Dfx.

The cam curves of the variable power lens group 2 in the device of the present embodiment and the shapes of the cam grooves corresponding thereto are entirely the same as those of the device of FIG. 1. Further, the principle of the arithmetic operations to be carried out in the comprehensive compensation calculation section 12 of the present device is identical to that of the device of FIG. 1.

Figure 9:
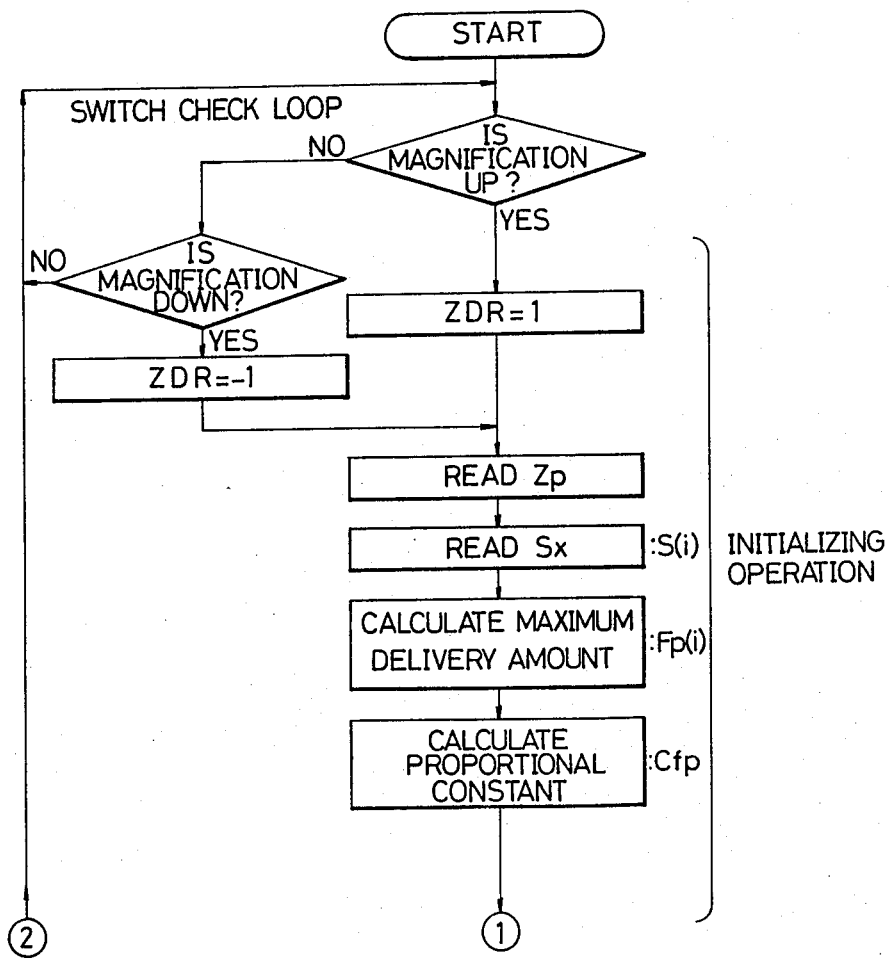
FIG. 9 and FIG. 10 are flow charts illustrating the sequence of operation of the embodiment illustrated in FIG. 8.
Figure 10:
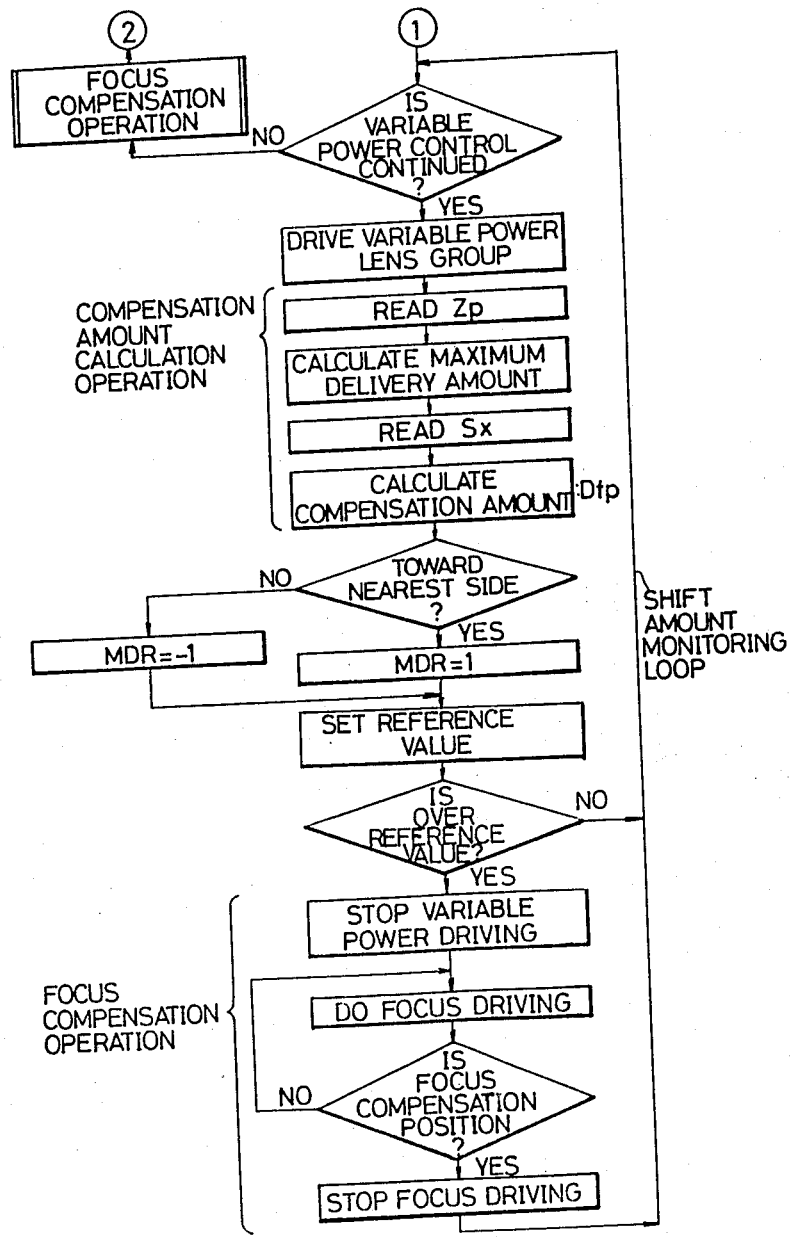

FIG. 9 and FIG. 10 are flow charts illustrating the sequence of the operations to be involved in the present embodiment and correspond respectively to the flow charts of FIG. 6 and FIG. 7. In the present embodiment, as illustrated in FIG. 9, when the maximum delivery amount Fpm is calculated at the step "CALCULATE MAXIMUM DELIVERY AMOUNT", the processing is not subjected to any conditional branch but advanced to the step "CALCULATE PROPORTIONAL CONSTANT" to effect calculation of the proportional constant Cfp. The other operations to be performed in the present embodiment illustrated in FIG. 9 are entirely the same as those of the first embodiment illustrated in FIG. 6. The present embodiment, in the routine of FIG. 10, is described below as not involving the step "SET REFERENCE VALUE". In this case, the present embodiment is constructed so that the conditional branch "IS OVER REFERENCE VALUE?" will be executed in the place of the step "CALCULATE RELATIVE COMPENSATION AMOUNT" and the conditional branch "IS LARGELY OUT OF FOCUS?" (FIG. 7) in the embodiment of FIG. 1. At this conditional branch "IS OVER REFERENCE VALUE?" the comparing and judging section 113 compares the compensation amount Dfp at the aforementioned point Zp=Zp′ with the reference value, Dst=20, set in advance therein to check and find whether the reference value Dst surpasses the compensation amount Dfp, more specifically whether or not the compensation amount satisfies Dfp≧20 or not and continues to monitor the focus movement (shift amount) caused by the variable power operation and find whether it surpasses the prescribed amount or not. Then in the present case, the processing is branched toward NO because it is not long after the variable power lens group 2 is set driving and the shift amount (corresponding to the length from the point 41 to the point 41a in the diagram of FIG. 5) is small. As the result, the comparing and judging section 113 produces no execution signal (GO). The processing then returns to the conditional branch "IS VARIABLE POWER CONTROL CONTINUED?" and the operations mentioned above are repeated. Here again, the operations will be referred to as "SHIFT AMOUNT MONITORING LOOP". The variable power motor Mz further continues its rotation to drive the variable power lens group 2 in the direction of the arrow 40 and past the point 41 in the direction of the arrow 42 in the diagram of FIG. 5. Then, on the assumption that Dfp≧20 is fulfilled at the point Zp=Zp1, the processing of the shift monitoring loop is branched toward YES at the conditional branch "IS OVER REFERENCE VALUE?". At this point, the comparing and judging section 113 issues the execution signal (GO, the compensation amount Dfp, and the signal designating MDR=1 mentioned above. Then, at the next step "STOP VARIABLE POWER DRIVING", the variable power control section 19 stops the variable power motor Mz and the focus control section 115 which has received the compensation amount Dfp and the information on the focal direction, MDR=1, sets the focus motor $M_F$ moving at the next step "DO FOCUS DRIVING" so as to drive the focusing lens group 3 toward the nearest side, namely in the direction of the arrow 43 in FIG. 5. This movement corresponds to the movement in the direction from the cam curve 24 to the cam curve 24a in the diagram of FIG. 2. At the next conditional branch "IS FOCUS COMPENSATION POSITION?", the focus control section 115 continuously compares the output Dfc of the focus counter 6 with the compensation amount Dfp and continues to cause the processing to be branched toward NO until the output Dfc and the compensation amount Dfp conform with each other and returns to the step "DO FOCUS DRIVING" to continue the driving of the focusing lens group 3. Thereafter, when the focusing lens group 3 further moves in the direction of the arrow 43 and reaches the focus curve 37 for 3.0 m shown in FIG. 5 to satisfy the condition, Dfc=Dfp, the processing is branched toward YES at the conditional branch. Then, at the next step "STOP FOCUS DRIVING", the focus motor $M_F$ is stopped. The operations performed up to this point constitute themselves the first cycle of the variable power operation and the shift compensating operation. The flow chart of FIG. 10 returns to the conditional branch "IS VARIABLE POWER CONTROL CONTINUED?" and transfers to the control of the second cycle. The operations from the step 'STOP VARIABLE POWER DRIVING" through the step "STOP FOCUS DRIVING" which follow the "SHIFT AMOUNT MONITORING LOOP" mentioned above will be referred to hereinafter as "FOCUS COMPENSATING OPERATION".

The operation of the second cycle transfers to the focus compensating operation mentioned above when the variable power lens group 2 is driven in the direction of the arrow 44 by the operations of the "SHIFT AMOUNT MONITORING LOOP" and the shift amount reaches the prescribed amount at the point Zp=Zp₃. When the up switch 16 is turned OFF while the focus compensating operation is in process, the focus compensating operation is continued and the focusing lens group 3 is driven in the direction of the arrow 45. Thereafter, the focusing lens group 3 arrives on the focus curve 37 (the position of the point 46) and the relevant component parts complete the focus compensating operation and return again to the conditional branch "IS VARIABLE POWER CONTROL CONTINUED?". At this point, the driving direction judging section 18 detects the fact that the up switch 16 has been turned OFF. The flow chart is then branched toward NO and advanced to the next sub-routine "FOCUS COMPENSATING OPERATION". The contents of the operation of this sub-routine are identical to the focus compensating operation mentioned above. In this case, however, substantially no operation is produced at the sub-routine because the variable power motor Mz has been stopped and the shift amount brought to the point satisfying Dfp=0 in consequence of completion of the step "STOP VARIABLE POWER DRIVING". In other words, this sub-routine is prepared for the possible situation in which the up/down switch 16/17 will be turned OFF while the operations in the "SHIFT AMOUNT MONITORING LOOP" are in process. The flow chart of FIG. 10, on reaching ② transfers ② in the flow chart of FIG. 9 and enters the "SWITCH CHECK LOOP" mentioned above. Since neither the up switch 16 nor the down switch 17 is depressed, the operation of the "SWITCH CHECK LOOP" will be repeated. Thus, all the magnification up operations have been completed.

At this point, the variable power lens group 2 and the focusing lens group 3 are located at the point 46 of FIG. 5. Now, the magnification down operation will be described below. Since it is similar to the magnification up operation described above, it will be briefly described to portray only the essential points thereof.

Now, on the assumption that the down switch 17 has been depressed, the processing is branched toward YES at the conditional branch "IS MAGNIFICATION DOWN?" within the "SWITCH CHECK LOOP" illustrated in the flow chart of FIG. 9 and the signal, ZDR=−1, signifying that the variable power direction is toward the magnification down is issued at the step "ZDR=−1", and the processing, on completing the initial setting operation mentioned above, reaches ① and transfers to the flow chart of FIG. 10 to set the variable power operation. Within the "SHIFT AMOUNT MONITORING LOOP" mentioned above, the processing is branched toward NO at the conditional branch "TOWARD NEAREST SIDE?" and the focusing direction is decided toward the side at the step "MDR=−1". In the flow chart of FIG. 5, when the variable power lens group 2 moved from the point 46 in the direction of the arrow 47 and the shift amount surpasses the reference value, the existing operation switches to the focus compensating operation mentioned above and the focusing lens group 3 is driven in the direction of the arrow 48 to complete the first cycle. Then, when the movement proceeds in the directions of the arrow 49 and the arrow 50 and the down switch 17 is turned OFF, the operation is stopped. The present embodiment is constructed so that the shift compensating operation will be executed only when the compensation amount Dfp surpasses the reference value Dst during the compensation of the deviation produced in the image formation in consequence of the variable power operation. The reference value Dst=20 is amply larger than the aforementioned component of variation. The present embodiment, therefore, has an advantage that the possibility of the focusing lens group 3 generating vibration owing to the component of variation can be eliminated and the control can be realized with extremely high stability as in the case of the direct control of the compensation amount Dfp containing the component of variation.

During the period preceding the fulfillment of the condition, Dfp≧20, the operation of the focus control section 15 may be suspended and that of the focus motor M_F similarly suspended, the present embodiment has an advantage that the possible vibration of the focusing lens group 3 can be eliminated and the otherwise inevitable wasteful consumption of electric power can be precluded.

The judgment at the conditional branch "IS OVER REFERENCE VALUE?" need not be limited to Dfp≧20 but may be increased or decreased from this particular value so as to suit optimally the speed of control, the stability of control, and the appearance image observed in the finder. It is also permissible to effect the shift compensation each time the variable power amount reaches a fixed level.

Figure 11:
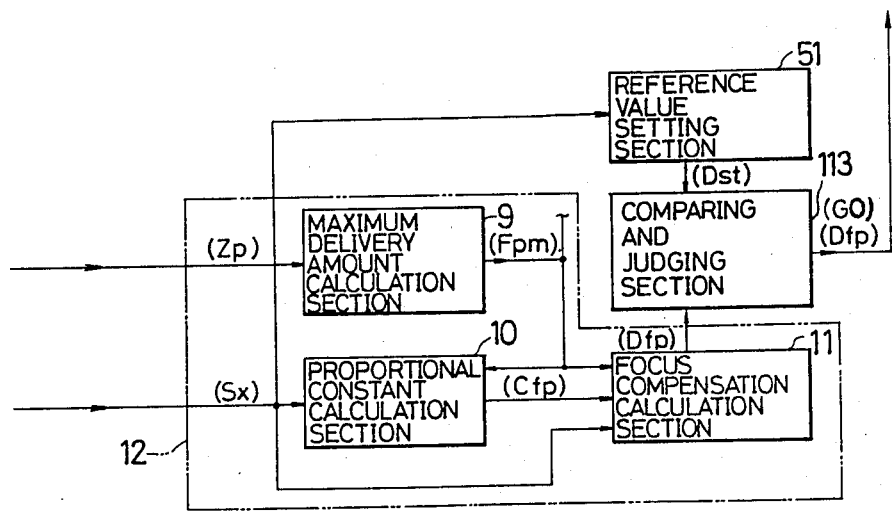
FIG. 11 is a block diagram illustrating a modified version of the embodiment of FIG. 8, particularly the periphery of a newly incorporated part, in contrast to FIG. 8.

The reference value Dst need not be limited to one prescribed level as mentioned above but may be variable. Specifically in the flow chart, the "SET REFERENCE VALUE" operation illustrated in FIG. 10 may be incorporated. In the block diagram of FIG. 8, a reference value setting section 51 illustrated in FIG. 11 may be newly incorporated. In contrast to the embodiment described above in which the reference value Dst=20 is set in advance within the comparing and judging section 113, the modification of FIG. 11 may be constructed so that mutually different reference values are set in advance one each in a plurality of regions each extending from the nearest position to the ∞ position, the reference value setting section 51, on receiving the information on focal position Sx, selects from the plurality of regions one particular region corresponding to a given object distance and feeds the reference value to the comparing and judging section 13, and the comparing and judging section 113 compares the output of the reference value setting section 51 as the reference value with the compensation amount Dfp.

As clearly noted from FIG. 2 and FIG. 3, the focus curves 36 to 38 have different inclinations, depending on the information on focal position Sx (object distance D) and have different ratios of variation for an object, depending on the focal length. The device, therefore, may be so constructed that the reference value setting section 51 will receive the information on focal length Zp and enable the reference value to be varied along the focus curves 36 to 38. The two modifications described above have an advantage that the difference in the switching time necessary for the variable power operation including the shift compensating operation to be performed between the tele side to the wide side, on the nearest side and the side of the object distance can be minimized. To be specific, the switching time mentioned above on the nearest side can be minimized to permit quick switching of the focal length.

Figure 12:
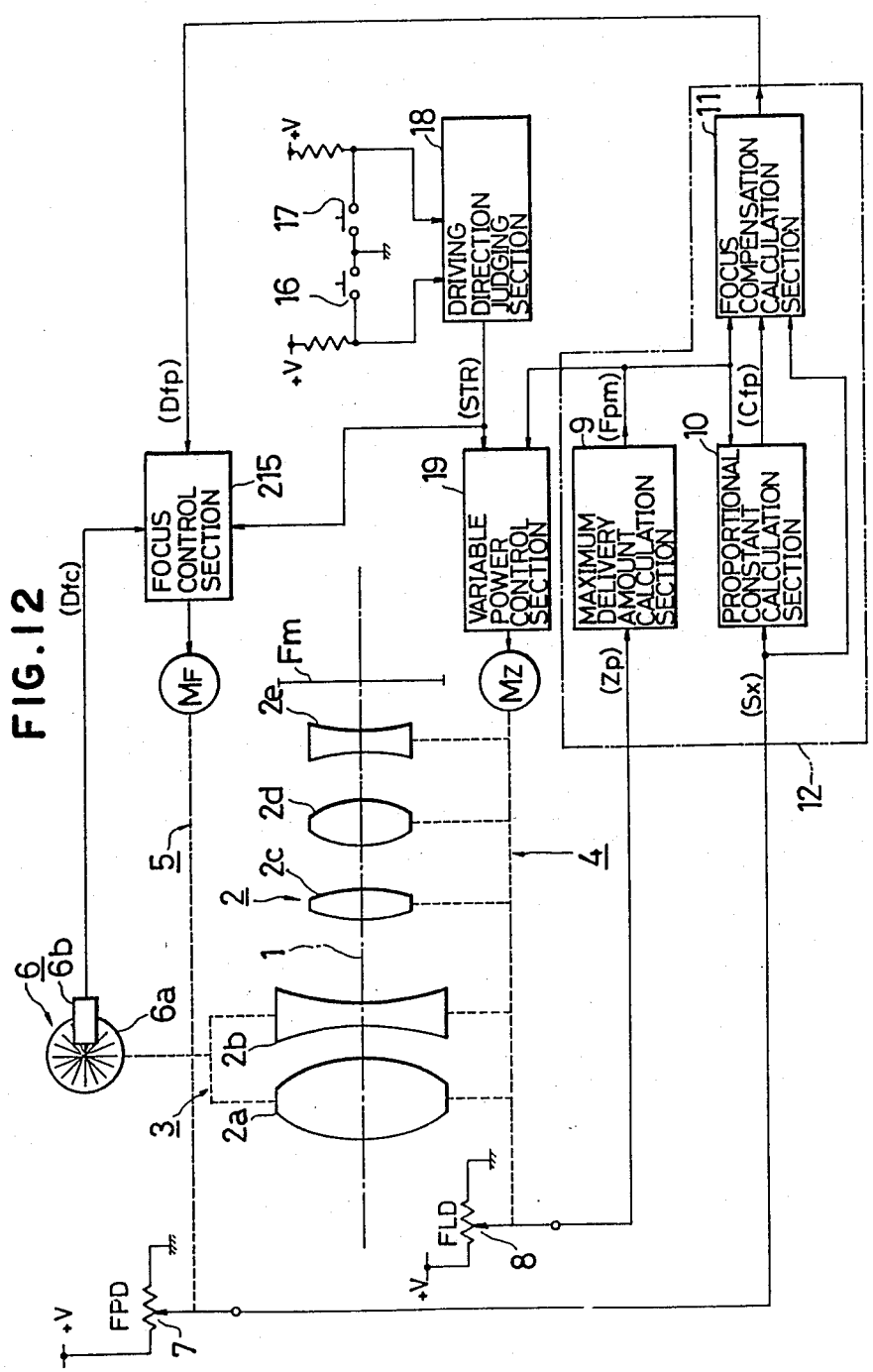
FIG. 12 is a block diagram illustrating the whole construction of yet another typical varifocal lens controlling device embodying this invention.

FIG. 12 is a block diagram illustrating the construction of yet another typical varifocal lens device embodying the present invention. The construction of the device of FIG. 12 is identical to that of the device of FIG. 1 except for the following point. In contrast to the device of FIG. 1 in which the fifth lens group 2e constitutes itself the focusing lens group 3, the device of FIG. 12 has the focusing lens group 3 thereof formed of the first lens group 2a and the second lens group 2b. The focus motor $M_F$, therefore, drives the first lens group 2a and the second lens group 2b. In this case, the first lens group 2a and the second lens group 2b are moved in the direction of the optical axis as held at a fixed distance from each other. Further, the device of FIG. 12 is devoid of a section equivalent to the absolute/relative amount transforming section 13 of the device of FIG. 1 and, therefore, requires the compensation amount Dfp produced from the comprehensive compensation calculating section 12 to be forwarded directly to a focus control section 215. It is not provided with an equivalent to the distance measuring section 14. The focus control section 215, therefore, controls the focus driving section 5 on the basis of the output Dfc of the focus counter 6, the compensation amount produced as the output Dfp from the compensation calculation section 11 in the comprehensive compensation calculation section 12, and the start signal (STR).

Figure 13:
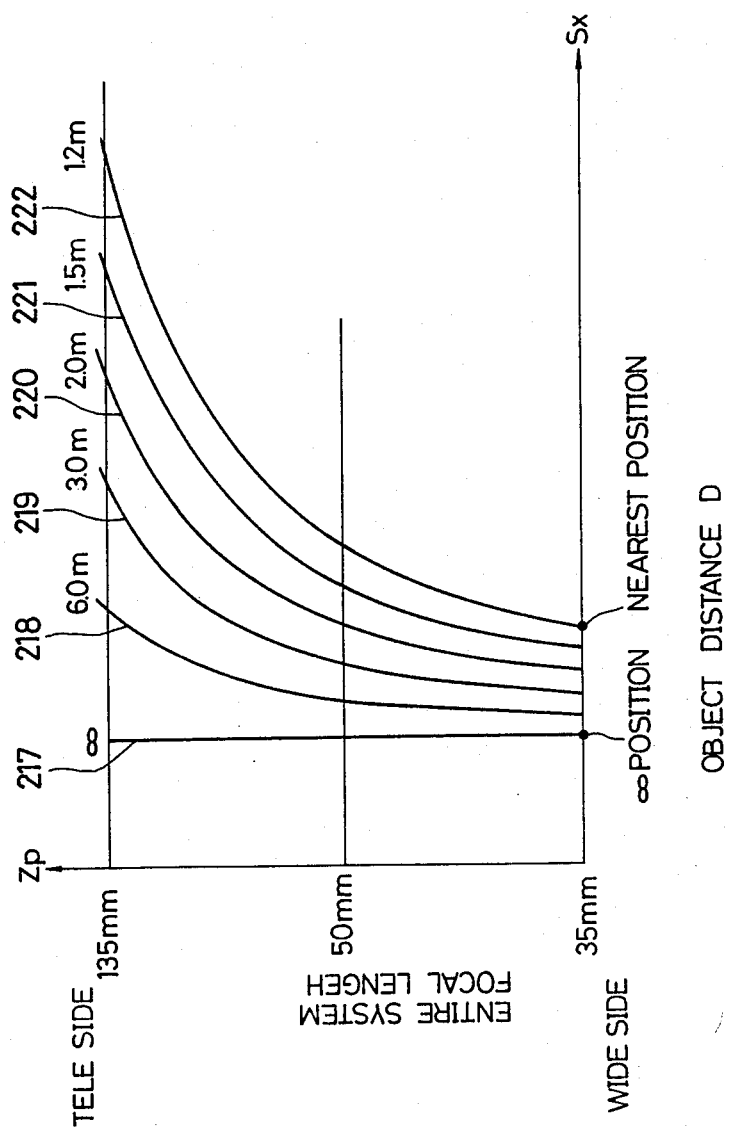
FIG. 13 is a graph showing characteristics of the device of FIG. 12, particularly the relation between the overall focal length f to be set and the amount of delivery Sx of the focusing lens group corresponding to the distance D of an object, for varying distances of object.

FIG. 13 is a graph showing the characteristics of the device of FIG. 12. This graph shows the relation between the entire system focal length f to be set and the delivery amount (amount of movement) of the focusing lens group 3 (the first lens group 2a and the second lens group 2b) relative to the object distance D for representative magnitudes of the object distance D with the vertical axis as the scale of the change in the entire system focal length f and the horizontal axis the scale of the delivery amount of the focusing lens group 3 based on the focal position for infinity. In this case, the tele position is expressed as f=135 mm and the wide position as f=35 mm. In FIG. 13, reference numerals 217 to 222 stand for focus curves, showing the changes in the delivery amounts of the focusing lens groups 2a, 2b from the position of infinity to the focal position versus the changes in the information on the focal length Zp when the object distance D in the left member of the formula (7) set at ∞, 6.0 m, 3.0 m, 2.0 m, 1.5 m, and 1.2 m. The focus curve 222 represents the nearest position at which the maximum delivery amount is obtained. Let Fpm stand for the focus curve 222 of the nearest position, and the maximum delivery amount will be given by the formula (8) which was described in the embodiment of FIG. 1. The graph of FIG. 4 represents what is obtained by partially omitting the graph of FIG. 13. The curves 36 and 38 in FIG. 4 correspond respectively to the curves 217 and 222 of FIG. 13. The compensation amount Dfp has already been described with reference to FIG. 4 and need not be repeated here.

Figure 14:
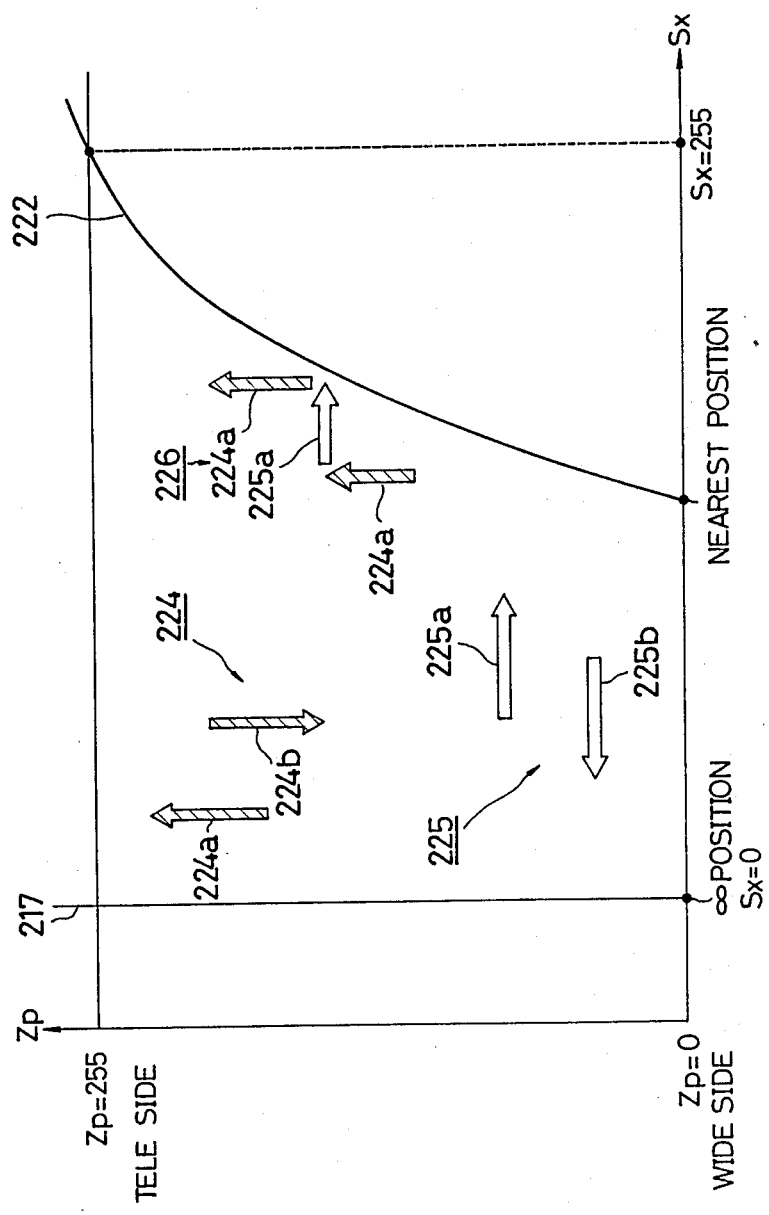
FIG. 14 is a diagram illustrating the relation between the direction of variable power driving and the direction of focus driving as essential factors of the embodiment.

FIG. 14 is a diagram obtained by omitting part of the diagram of FIG. 13 showing the relation between the direction of the focus driving and the variable power driving as an essential component of the present embodiment.

When the accuracy of the A/D transformation of the information on focal length Zp is assumed to be 8 bits, "255" corresponds to the tele position and "0" to the wide position. When that of the information on the focal position Sx is assumed to be similarly 8 bits, "0" corresponds to the ∞ position and "255" to the nearest position.

In the diagram, reference numeral 224 stands for the arrow indicating the direction of the variable power driving and 224a indicating the direction of the magnification up. The direction of the arrow 224a will be designated as ZDR=1. An arrow 244 indicates the direction of the magnification down. This direction will be designated as ZDR=−1. An arrow 225 indicates the direction of the focus driving and an arrow 225a indicates the direction of the focus driving from the position side to the nearest position side. The direction of this arrow 225a will be designated as MDR=1. An arrow 225b indicates the driving direction from the nearest position side to the position side, contrary to that of the arrow 225a. This direction will be designated as MDR=−1. By reference numeral 226 is represented the condition in which the variable power driving and the focus driving are alternately repeated. This condition will be designated as ZDR=MDR.

Figure 15:
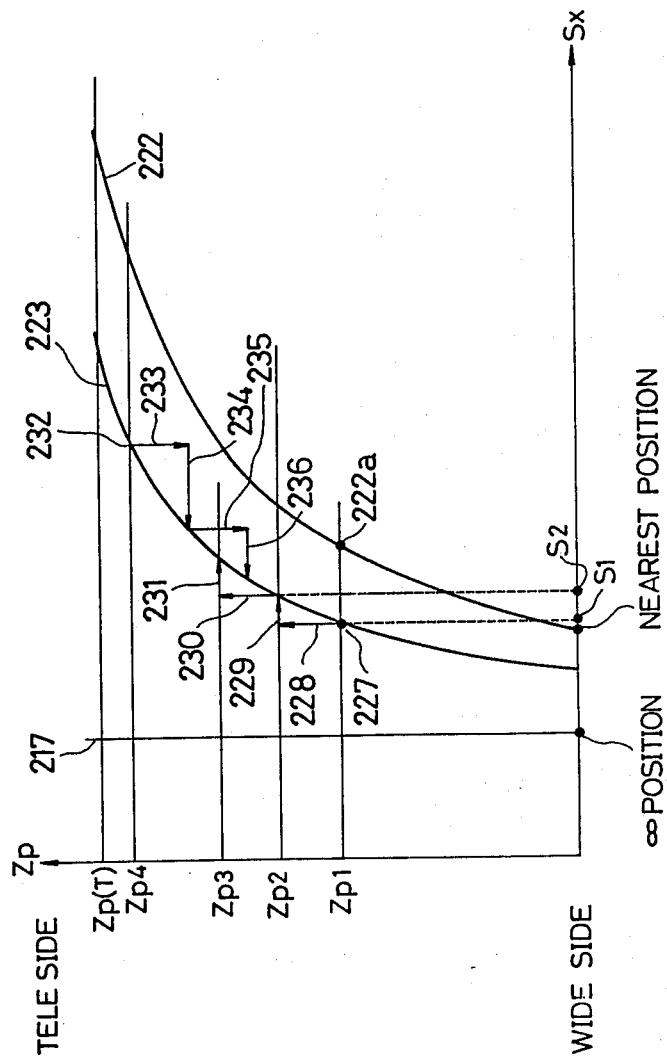
FIG. 15 is a diagram depicting the operation of the embodiment of FIG. 12.

FIG. 15 is a diagram for the explanation of the operation of the embodiment illustrated in FIG. 12. In this diagram, the parts similar to those found in FIG. 13 are designated with the same reference numerals. In FIG. 15, reference numeral 227 stands for the point for the information on focal length $Zp_1$ falling on a given focus curve 223, 228, 230, 233, and 235 stand for arrows indicating the amounts and directions of change in the information on focal length Zp, 229, 231, 234, and 236 stand for arrows indicating the amounts and directions of change in the information on focal position Sx, 232 stands for a point falling at Zp on the focus curve 223, $Zp(\gamma)$ stands for the information on focal length at the tele position, and $Zp_1$, $Zp_2$, and $Zp_3$ stand for the values of the information on focal length at certain focal distances.

Figure 16:
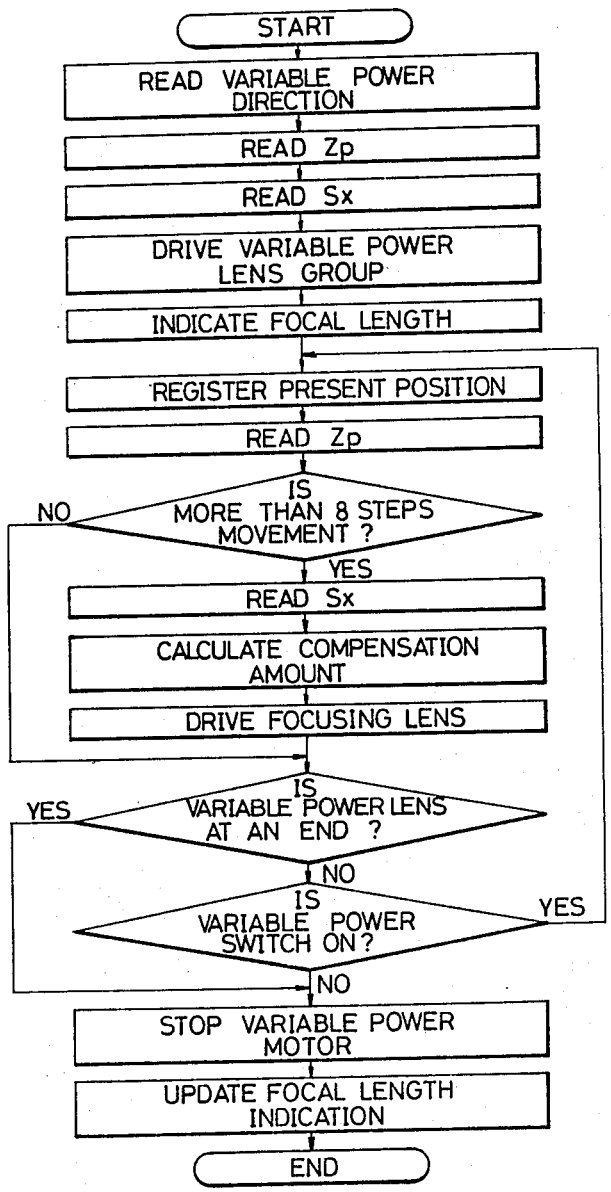
FIG. 16 is a flow chart illustrating the sequence of operation of the embodiment of FIG. 12.

FIG. 16 is a flow chart illustrating the sequence of the operations of FIG. 12. The operations involved in the present embodiment will be described mainly with reference to the flow chart of FIG. 16.

First, the magnification up operation for the movement from the wide side to the tele side will be described. When the up switch 16 shown in FIG. 12 is depressed, the driving direction judging section 18 issues the starting signal (STR) including ZDR=1 as the information on the variable power direction. The processing of the flow chart of FIG. 16 is initiated at the step "READ VARIABLE POWER DIRECTION", the variable power control section 19 temporarily memorizes ZDR=1 indicating the direction of the magnification up. Then, at the next step "READ Zp" and the step "READ Sx", the maximum delivery amount calculation section 9 receives the output (Zp) of the FLD 8 and subjects it to A/D transformation and the proportional constant calculation section 10 receives the output (Sx) of the FPD 7 and subjects it to A/D transformation, to produce Zp1 and S1 respectively as shown in FIG. 15. It is now assumed that the variable power lens group 2 is located at the point 227. Then, at the step "DRIVE VARIABLE POWER LENS GROUP", the variable power control section 19 sets the variable power motor Mz rotating in the direction for magnification up. Then, the variable power lens group 2 is moved and the output (Zp) of the FLD 8 is changed as indicated by the arrow 228. Since the focus motor $M_F$ is not operating now, the FPD 7 allows the distance between the first lens group 2a and the second lens group 2b to be varied by a prescribed cam operation. In contrast, the focusing lens group 3 is retained at a fixed position and is not affected by the variable power operation.

Then, at the step "INDICATE FOCAL LENGTH", the present value $Zp_1$ of the information on focal length Zp is displayed on a focal length display device. At the next step "REGISTER PRESENT POSITION", the information on focal length existing immediately before the rotation of the variable motor Mz, indicating the aforementioned Zp1 as $Zp_0=Zp_1$, is registered. At the next step "READ Zp", the latest value $Zp_2'$ of the information on focal length Zp which has just begun to vary in the direction indicated by the arrow 228 of FIG. 15 is read in. At the conditional branch "IS MORE THAN 8 STEPS MOVEMENT", the movement is checked to determine whether it has surpassed the prescribed amount or not. When the movement has not reached 8 steps, the processing is branched toward NO. Then, at the next conditional branch "IS VARIABLE POWER LENS AT AN END?", the processing is branched toward NO because the variable power lens group has not yet reached the tele side (in the present case, the tele side constitutes itself the terminal for the variable power lens group movement). At the conditional branch "IS VARIABLE POWER SWITCH ON?", the switch 16 or 17 is checked to determine whether it has been depressed or not (in this case, it is assumed that the up switch 16 is still in the depressed state). As the result, the processing is branched toward YES and returned again to the step "REGISTER PRESENT POSITION" to effect repetition of the aforementioned operation, with the aforementioned $Zp_1'$ indicated as $Zp_0=Zp_1'$.

When the movement reaches the aforementioned 8 steps at the point $Zp_2$ of FIG. 15, the processing is branched toward YES at the conditional branch "IS MORE THAN 8 STEPS MOVEMENT?" At the step "READ Sx", the information on the existing focal position Sx, namely $Sx=S(i)=Si$, is read in because the focus driving section 5 is not in operation.

At the next step "CALCULATE COMPENSATION AMOUNT" which constitutes itself an essential part of the present embodiment, the driving directions of the focusing lens groups 2a, 2b are decided by $ZDR=MDR$. To be more specific, it is apparent from the arrows 228 to 231 shown in FIG. 15 that since the focused condition is retained so long as the focusing lens groups 2a, 2b remain on the focus curve 223, they ought to be driven in the direction toward the focus curve 223, namely in the direction of $MDR=1$ indicated by the arrow 229 in FIG. 15 or by the arrow 25 in FIG. 14 when the variable power driving is made in the direction of the arrow 228. The proper direction of the variable power driving, therefore, can be determined simply by mechanically setting the equation, $ZDR=MDR$, because $ZDR=1$ is satisfied and the right members of the equations are both 1. When the magnification down operation is proceeding in the opposite direction, namely when the direction of the variable power driving is that of $ZDR=-1$ indicated by the arrow 224 of FIG. 14, it is readily found that the direction of focus driving has to be that of $MDR=-1$ indicated by the arrow 225b. That is, again in this case, $ZDR=MDR$ suffices.

Another essential operation to be performed at the aforementioned step "CALCULATE COMPENSATION AMOUNT" is for the focus compensation calculating section 11 to calculate the compensation amount Dfp on the basis of the formulas (8), (9), and (10) mentioned above. In the manner described above, the driving directions and the amounts of driving (movement) of the focusing lens groups 2a, 2b are decided. The focus controlling section 245, on receiving the data mentioned above, sets the focus motor $M_F$ rotating at the step "DRIVE FOCUSING LENS" shown in FIG. 16. As the result, the output (Sx) of the FPD 7 is varied in the direction indicated by the arrow 229 of FIG. 15.

To simplify the description, FIG. 15 is depicted as causing the variable power motor Mz to be kept out of operation while the focus motor Mf is in operation. In the present case, as noted from the flow chart of FIG. 16, the variable power motor Mz continues its rotation while the compensation operation is carried out by the focus motor $M_F$. Further, the focus controlling section 215 continuously compares the output Dfc of the focus counter 6 with the aforementioned compensation amount Dfp and, after $Dfc=Dfp$ is satisfied, namely after the movement in the direction of the arrow 229 in FIG. 15 reaches the focus curve 223, stops the focusing motor $M_F$ and completes one cycle of the magnification up operation. When the variable power lens group 2 does not reach the terminal and the variable power switch 16 is kept depressed, the processing returns to the step "REGISTER PRESENT POSITION", taking $Zp_2$ and $S_2$ as the present positions, so as to start the second cycle or initiate the movements indicated by the arrows 230 and 231. When the up switch 16 is turned OFF, the processing is branched toward NO at the conditional branch "IS VARIABLE POWER SWITCH ON?" At the step "STOP VARIABLE POWER MOTOR", the variable power control section 19 stops the variable power motor Mz and puts a stop to the operation of the variable power driving section 4. Then, at the next step "UPDATE FOCAL LENGTH INDICATION", the display of the entire system focal length f is updated by reading in the information on focal length Zp ($Zp_3$ in the present case), to complete the magnification up operation.

The magnification down operation for the movement from the tele side to the wide side may well be regarded as substantially equaling the aforementioned magnification up operation. Thus, it will be described briefly.

It is now assumed that the variable power lens group 2 is located at the point 232 in FIG. 15, for example. When the down switch 17 is depressed, the variable power lens group 2 is started from this point 232 and the variable power driving section 4 is driven in the direction of the arrow 233. Then, as the movement reaches 8 steps as prescribed, the focus driving section 5 is driven in the direction indicated by the arrow 234 based on the aforementioned $ZDR=MDR$ $(=-1)$, to complete one cycle. Then, the second cycle indicated by the arrows 235 and 236 is executed. The variable power down operation is completed when the down switch 17 is turned OFF.

Since the present embodiment is constructed so that the variation in the focusing position at a varying object distance will conform to the formula (7) or the focus curves 217 to 222 shown in FIG. 13, it has an advantage that the proper direction of focus driving can be very easily decided by $ZDR=MDR$ using the information on the variable power switches 16, 17 on condition that the direction of the variable power driving and the direction of the focus driving are defined as illustrated in FIG. 14. Thus, the present embodiment has no use for any analog processing, has no possibility of suffering an operational error to induce loss of control on the ∞ position side or the nearest position side, and permits the control to be effected infallibly and quickly. It has another advantage that the amounts of movement of the focusing lens groups 2a,2b on the wide side are not unduly large and, as the result, the outside diameter of lens can be decreased appreciably. It has still another advantage apparently (from the standpoint of convenience of use) that no unintentional focus movement is caused by the variable power operation once the focus is fixed similarly to the conventional zoom lens.

Further, since the present device electrically effects the compensation for the deviation in the focusing which has been heretofore effected mechanically with cams, it permits the outside diameter of lens to be fully decreased and the construction of lens barrel to be simplified and the capacity of the motor for driving the focusing lens group to be reduced. Thus, it enjoys an advantage that the desire to decrease the size and weight of the device as a whole and lower the production cost of the device can be accomplished. Particularly where the camera and the device are to be used as interlocked to each other, the auto focusing circuit incorporated in the camera can be diverted to serve for the operation of the device. This fact also contributes to further decreasing the production cost.

The conditional branch "IS MORE THAN 8 STEPS MOVEMENT?", for example, need not be limited to 8 steps but may be changed to 4 steps, 6 steps, etc. to suit the convenience of design. Optionally, the device may be modified so that the check of the amount of movement of the variable power lens group will be made at fixed time intervals instead of being made after a fixed number of steps.

Figure 17:
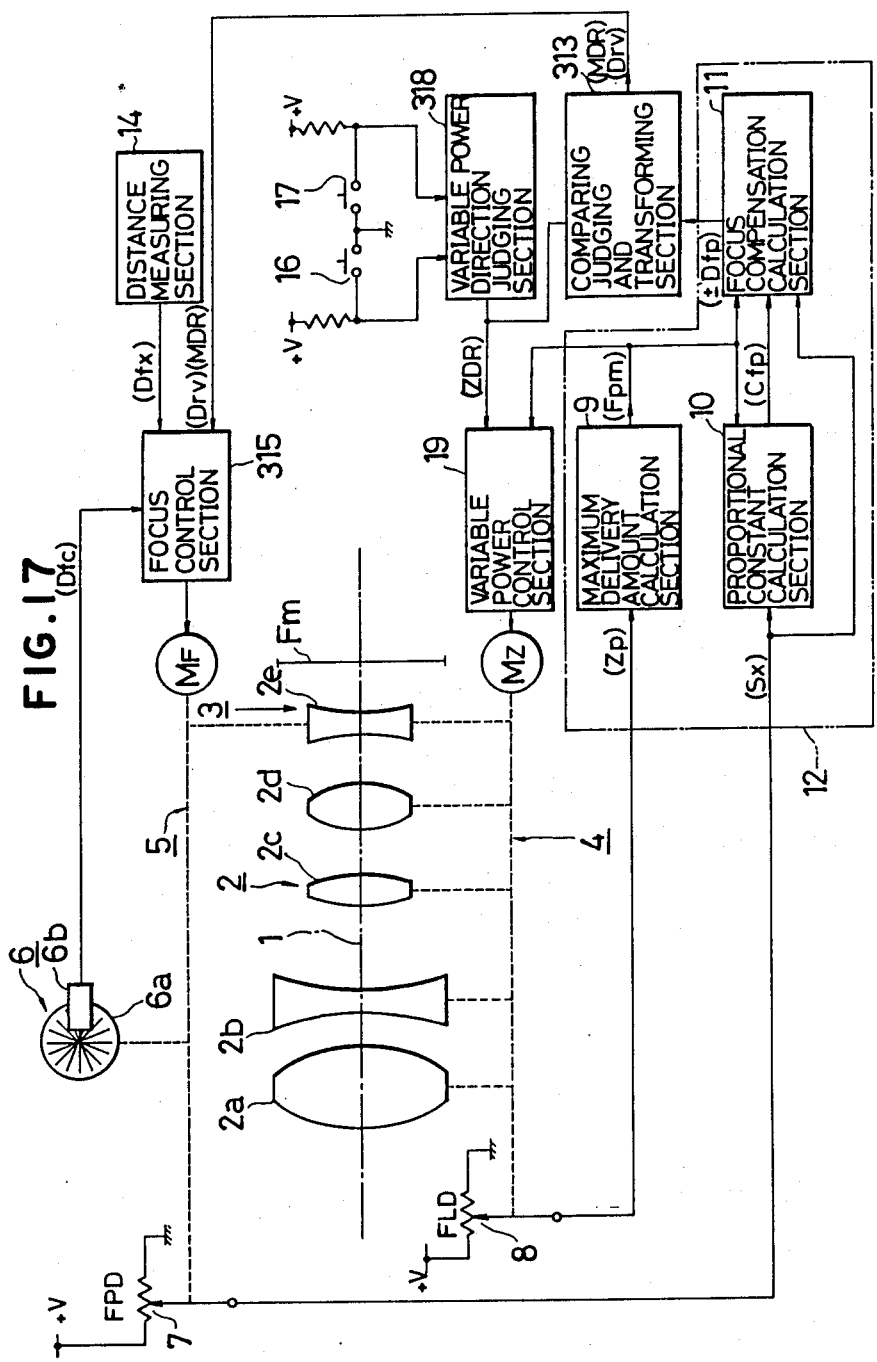
FIG. 17 is a block diagram illustrating the whole construction of still another typical varifocal lens controlling device embodying the present invention.

FIG. 17 is a block diagram illustrating the construction of still another typical varifocal lens device embodying the present invention. The construction of the device of FIG. 17 is identical to that of the device of FIG. 1 except for the following point. The device of FIG. 17 is provided with a comparing, judging and transforming section 213 in the place of the absolute/-relative amount transforming section 13 of the device of FIG. 1. This comparing, judging and transforming section 313 receives a variable power direction signal (ZDR) which will be described fully later on, transforms this signal into a driving direction of the focusing lens group 3 based on a prescribed relation determined by the characteristics of the variable power lens group 2, monitors the focus compensation direction produced by the focus compensation calculation section 11 (though this is substantially the compensation amount Dfp itself, it is designated as ±Dfp for the sake of explanation so that the algebraic sign ± will serve to indicate the direction of focus compensation) to find whether it conforms to the aforementioned driving direction, issues an execution direction sign (MDR) where the two directions conform to each other, further transforms the compensation amount Dfp mentioned above into the relative compensation amount Drv which is a relative amount of movement, and produces as an output the relative compensation amount Drv when it surpasses a prescribed level. The execution direction signal (MDR) in the form of MDR=1 designates the driving toward the nearest position side and in the form of MDR=−1designates the driving toward the ∞ position side. Thus, the focus compensation direction (±Dfp) designates with +Dfp the fact that the focus compensation position is present on the nearest position side and with −Dfp the fact that the focus compensation position is present on the position side. The prescribed level mentioned above is amply large as compared with the range of error of A/D transformation in the comprehensive compensation calculation section 12 and the range of error of calculation. In the device of FIG. 17, the constructions and functions of the focus control section 315 and the variable power direction control section 318 are partly different from those of the counter types in the device of FIG. 1. The focus control section 315 receives the output Dfc of the focus counter 6 and the relative compensation amount Drv mentioned above or the defocus amount Dfx from the distance measuring section 14 and controls the focus driving section 5 so that the focusing lens group 3 will be driven to the focus compensation position corresponding to the relative compensation amount Drv or to the estimated focal position corresponding to the defocus amount Dfx. The variable power direction judging section 318 receives the outputs of the up switch 16 and the down switch 17, decides the rotating direction of the variable power motor Mz, and then produces the variable power direction signal (ZDR) mentioned above.

The cam diagram of the variable power lens group 2 in the device of the present embodiment and the shapes of the cam grooves corresponding thereto are entirely identical to those of the device of FIG. 1. Further, the principle of the calculating performed by the comprehensive compensation calculating section 12 is substantially the same as that of the device of FIG. 1. The Dfp to be determined by the formula (10) in the present case, however, is designated by an absolute value and an algebraic sign as the prefix for the absolute value. Thus, the compensation amount in the present case is designated as +Dfp. In FIG. 4, the compensation amount Dfp is exaggerated for the sake of convenience of the explanation. As pointed out in the earlier paragraph discussing the prior art, when the compensation amount Dfp has a size small enough to be embraced in the range of error of calculation at the comprehensive compensation calculating section 12 including the error of A/D transformation, there is the possibility of the focus compensation direction being designated in the opposite direction. If the variable power lens group 2 and the focusing lens group 3 remain at rest, the true compensation amount Dfp is 2, and the compensation amount erroneously obtained in consequence of calculation Dfp is"1", for example, then the focus compensation direction in this case is −Dfp and, conversely the compensation amount obtained by calculation is an erroneous Dfp. As already pointed out in the earlier paragraph regarding the prior art, +Dfp and −Dfp are randomly produced as the focus compensation direction within the aforementioned range of calculation error and the focusing lens group 3, when directly driven based on the output, is suffered to generate vibration.

Figure 18:
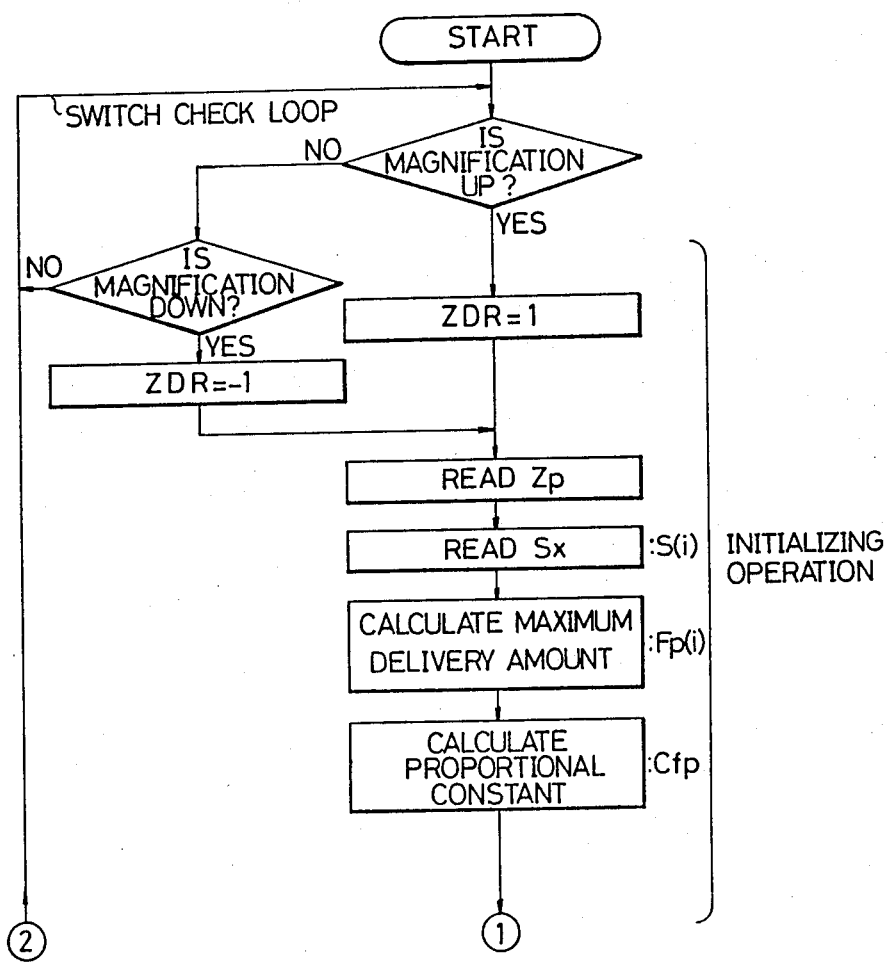
FIG. 18 and FIG. 19 are flow charts illustrating the sequence of operation of the embodiment of FIG. 17.
Figure 19:
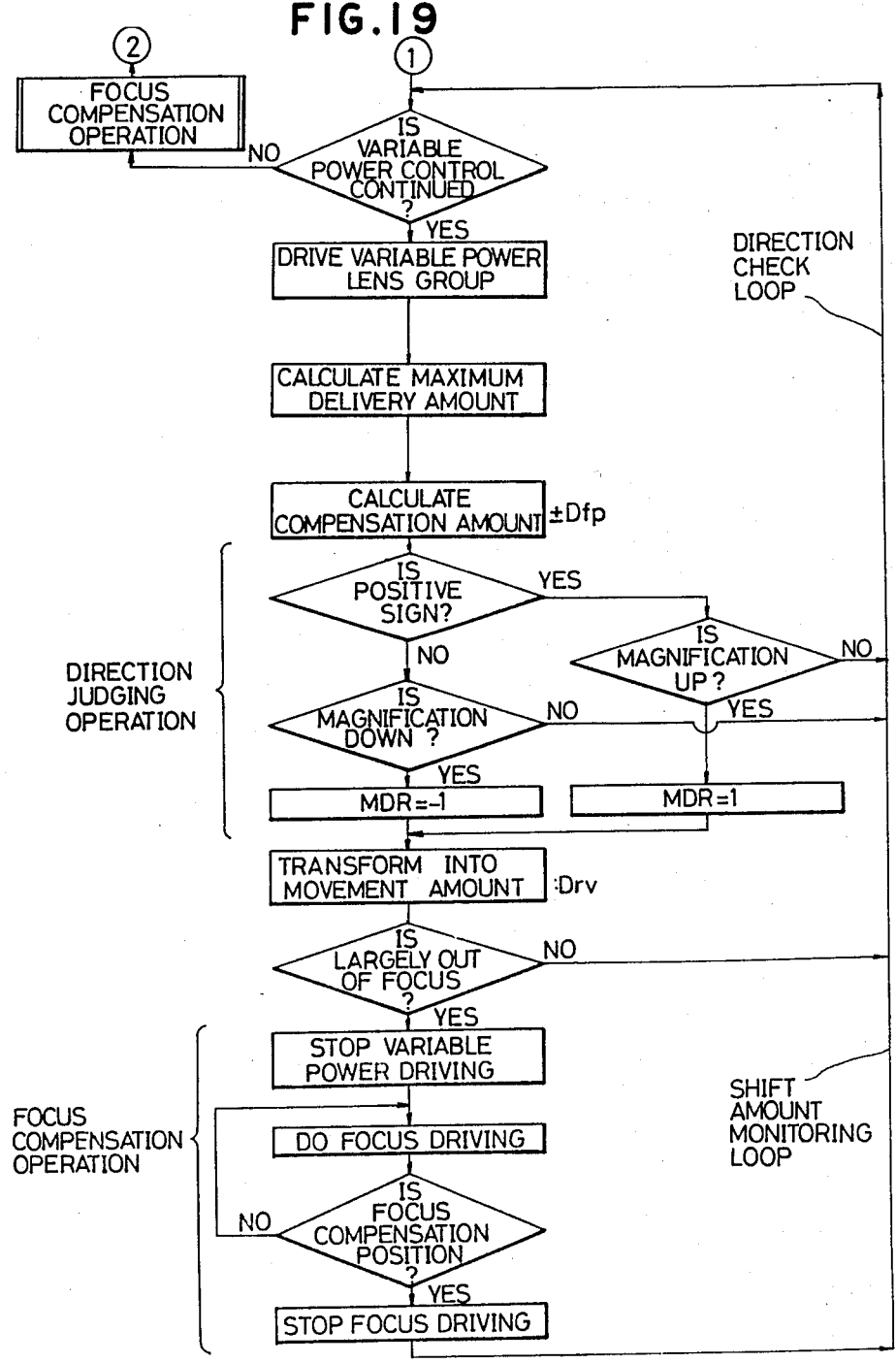

FIG. 18 and FIG. 19 are flow charts illustrating the sequence of operations to be performed in the present embodiment.

First, the magnification up operation for movement from the wide side to the tele side will be described. A depression exerted on the up switch 16 of FIG. 17 starts a variable power direction judging section 318. The processing of the flow chart of FIG. 18 is initiated at "START". At the conditional branch "IS MAGNIFICATION UP?", the variable power direction judging section 318 checks the condition of the up switch 16. In the present case, the processing is branched toward YES. When the branching occurs toward NO, the variable power direction judging section 318 checks the condition of the down switch 17 and, on finding the down switch 17 not in operation, causes the processing to be branched toward NO and returned to the conditional branch " IS MAGNIFICATION UP?" This operation is repeated until either of the magnification switches 16 and 17 is put to operation. Now, this operation loop will be referred to as "SWITCH CHECK LOOP". Then, at the next step "ZDR=1", the variable power direction judging section 318, on finding the variable power direction to be in the magnification up direction, forwards ZDR=1 as a variable power direction signal to the variable power control section 19. At the next step "READ Zp" and the step "READ Sx", the maximum delivery amount calculation section 9 receives the output (Zp) of the FLD 8 as the information on the focal length and subjects this information to A/D transformation and the proportional constant calculation section 10 receives the output (Sx) of the FPD 7 as the information on the position of the focusing lens group and subjects this information to A/D transformation. It is now assumed that the outputs of the transformation are $Zp_1$ and $S_1$ indicated in FIG. 5. This means that the variable power lens group 2 is assumed to be located at the point 39. At the next step "CALCULATE MAXIMUM DELIVERY AMOUNT", the maximum delivery amount calculation section 9 calculates the maximum delivery amount Fpm by effecting substitution of the output $Zp_1$ in the formula (8).

At the next step "CALCULATE PROPORTIONAL CONSTANT", the proportional constant calculation section 10 receives the maximum delivery amount Fpm and calculates the proportional constant Cfp in accordance with the formula (9) using this maximum delivery amount. To be specific, this calculation of Cfp is accomplished by effecting substitution of Fp(i) for Fpm relative to $Zp_1$ mentioned above in the formula (9). With reference to the diagram of FIG. 5, the proportional constant is determined as the ratio of the length between the focus curve 36 for the infinity ∞ and the point 39 on $Zp=Zp_1$ to the length between the focus curve 36 for the infinity ∞ and the point 38a. The processing of the flow chart of FIG. 18, on reaching 1 , transfers to 1 in the flow chart of FIG. 19. Now, the operations following the "SWITCH CHECK LOOP" mentioned above and preceding 1 will be referred to hereinafter as "INITIALIZING OPERATION".

At the conditional branch "IS VARIABLE POWER CONTROL CONTINUED?" in the flow chart of FIG. 19, the variable power direction judging section 318 checks the up/down switch 16/17 to determine whether the switch has been depressed (ON state) or not. Here, it is assumed that the up switch 16 is kept depressed. (It is further assumed that this state continues unless otherwise specified hereinafter.) At the aforementioned conditional branch, therefore, the processing is branched toward YES. Then, at the next step "DRIVE VARIABLE POWER LENS GROUP", the variable power control section 19 sets the variable power motor Mz rotating in the magnification up direction with reference to the variable power control direction ZDR - 1 mentioned above. As the result, the variable power operation is initiated. Thus, the variable power lens group 2 is moved and the output (Zp) of the FLD 8 is varied as indicated by the arrow 40 (FIG. 5). Since the focus motor $M_F$ is now not in operation, the FPD 7 causes the fifth lens group 2e to change position (move) along the cam curve 24 of FIG. 2 or the cam groove 31 of FIG. 3. The focusing lens group 3 is retained at a fixed position and is not made to change position by the variable power operation. At the next step "CALCULATE MAXIMUM DELIVERY AMOUNT", the maximum delivery amount calculation section 9 reads in the latest value Zp' (the position of the point 41) of the information on the focal length Zp which has begun to vary in the direction indicated by the arrow 40 in FIG. 5 and calculates the latest Fpm by effecting substitution of Zp' in the formula (8). At the next step "CALCULATE COMPENSATION AMOUNT", the focus compensation calculation section 11 reads in Sx in due consideration of the rounding error of the A/D transformer and the mechanical backlash and calculates the compensation amount Dfp by using the proportional constant Cfp found at the step "CALCULATE PROPORTIONAL CONSTANT" in FIG. 18 and effecting substitution of Fp(e) for Fpm relative to Zp' and $S_1$ or S(i) for Sx in the formula (10).

Now, the direction judging operation which constitutes itself an essential part of the present embodiment will be described below. At the next conditional branch "IS POSITIVE SIGN?", the comparing, judging, and transforming section 313 checks the focus direction and decides whether it is toward the nearest position side or the position side. As a preliminary to the description of this operation, the prescribed relation which arises from the characteristics of the varifocal lens or the variable power lens group 2 will be described. As clearly noted from FIG. 2 to FIG. 5 (particularly the focus curves 37 and 8), where the variable power direction is in the magnification up direction indicated by ZDR=1, the focus compensation direction for the arrival at the focus curve 37 or 38 is invariably in the driving direction (MDR=1) toward the nearest position side. In the case of the magnification down operation indicated by ZDR=−1, when the variable power lens group 2 is driven toward the ∞ position side indicated by MDR=−1, it never fails to reach the focus curve 37 or 38 which is the compensated focal position. In other words, it suffices to select MDR=1 for ZDR=and MDR=−1for ZDR=−1. With reference again to the flow chart of FIG. 19, on the assumption that the rounding error by the A/D transformer and the calculation error by the focus compensation calculation section 11, etc. are both absent, the comparing, judging, and transforming section 313 receives +Dfp corresponding to the arrow 41b as the compensation amount including the focus compensation direction and, at the aforementioned conditional branch "IS POSITIVE SIGN?" causes the processing to be branched toward YES because the sign of the compensation amount (+Dfp) is plus. Then, at the next conditional branch "IS MAGNIFICATION UP?", the processing is branched toward YES with reference to the variable power direction signal MDR=1 issued from the variable power direction judging section 318. At the next step "MDR=1", since the variable power direction is in the magnification up direction or the direction indicated by the arrow 40 in FIG. 5, the judgment to be drawn is that it suffices for the purpose of focusing to drive the focusing lens group 3 in the direction of the arrow 41b toward the focus curve 37. Thus, the focus compensation direction is decided as MDR=1 (though this decision is not yet issued as an output at this point). Here, the conditional branches "IS POSITIVE SIGN?" and "IS MAGNIFICATION UP?" and the step "MDR 1" mentioned above and the conditional branch "IS MAGNIFICATION DOWN?" and the step "MDR=−1" not yet described will be collectively referred to hereinafter as "DIRECTION JUDGING OPERATION".

When the compensation amount (+Dfp) is not produced correctly as described above and the incorrect compensation amount (−Dfp) indicated by the arrow 41c is produced by mistake, the processing is branched toward NO at the conditional branch "IS POSITIVE SIGN?" and then toward NO at the next conditional branch "IS MAGNIFICATION DOWN?" because ZDR=1 is satisfied and consequently returned again to the conditional branch "IS VARIABLE POWER CONTROL CONTINUED?" This operation is continued until the correct direction is judged, namely until the correct compensation amount (+Dfp in the present case) is produced as an output. Here, the operational loop which starts from the conditional branch "IS VARIABLE POWER CONTROL CONTINUED?" mentioned above, passes the conditional branches "IS MAGNIFICATION DOWN?" and "IS MAGNIFICATION UP?" within the direction judging operation mentioned above both toward NO, and returns to the conditional branch "IS VARIABLE POWER CONTROL CONTINUED?" mentioned above will be referred to hereinafter as a "DIRECTION CHECK LOOP". After deciding MDR=1, the comparing, judging, and transforming section 313 at the next step "TRANSFORM INTO MOVEMENT AMOUNT" effects transformation in the form of Drv=Dfp×Ct, i.e. the transformation of the compensation amount Dfp into the relative compensation amount Drv corresponding to the revolution number of the focus motor $M_F$, wherein Ct stands for the constant to be determined by the specific constructions of the focus counter 6 and the focus driving section 5. Then, at the next conditional branch "IS LARGELY OUT OF FOCUS?", the comparing, judging, and transforming section 313 checks the relative compensation amount Drv to determine whether it has surpassed the prescribed value (such as, for example, Drv≧20) or not, and monitors the focus movement (shift amount) by the variable power operation to determine whether it has surpassed the prescribed amount or not. In the present case, since it is not long after the driving of the variable power lens group 2 is started and the shift amount (corresponding to the length between the point 41 and the point 41a in the diagram of FIG. 5), therefore, is short, the processing is branched toward NO and returned to the conditional branch "IS VARIABLE POWER CONTROL CONTINUED?" Thereafter, the operation mentioned above is repeated. Here, this operational will be referred to as "SHIFT AMOUNT MONITORING LOOP". This shift amount monitoring loop and the aforementioned direction check loop partially overlap. The variable power motor Mz further continues its rotation to drive the variable power lens group 2 in the direction of the arrow 40, through the point 41, and then in the direction indicated by the arrow 42 in the diagram of FIG. 5. When the shift amount reaches Drv≧20 at the point Zp=Zp$_2$, since the compensation amount (+Dfp) in the direction judging operation has already reached a large amount (corresponding to the length of the arrow 43) outside the aforementioned range of calculation error, the focus compensation direction MDR=1 is decided as described above without producing any erroneous compensation amount (such as, for example, −Dfp). Further in the "SHIFT AMOUNT MONITORING LOOP" mentioned above, the processing at the conditional branch "IS LARGELY OUT OF FOCUS?" is branched toward YES. At this point, the comparing, judging, and transforming section 313 issues the relative compensation amount Drv and the focus compensation direction MDR=1 as an execution direction (MDR). Then, at the next step "STOP VARIABLE POWER DRIVING", the variable power control section 19 stops the variable power motor Mz. The focus control section 315 which has received the relative compensation amount Drv and the execution direction signal MDR=1 mentioned above starts the focus motor $M_F$ at the next step "DO FOCUS DRIVING" to drive the focusing lens group 3 toward the nearest position side, namely in the direction of the arrow 43 in FIG. 5. This driving direction corresponds to the direction from the cam curve 24 to the cam curve 24a in FIG. 2. At the next conditional branch "IS FOCUS COMPENSATION POSITION?", the focus controlling section 315 continuously compares the output Dfc of the focus counter 6 with the relative compensation amount Drv and continues to drive the focusing lens group 3, with the processing branched toward NO and returned to the step "DO FOCUS DRIVING", until the two amounts conform to each other. Thereafter, when the focusing lens group 3 moves in the direction of the arrow 4 and reaches the focus curve 37 for 3.0 m in FIG. 5 to satisfy Dfc=Drv, the processing at the aforementioned conditional branch is branched toward YES and the focus motor $M_F$ is stopped at the next step "STOP FOCUS DRIVING" The operations up to this point constitute themselves the first cycle of the variable power operation and the shift compensation operation. The processing of the flow chart of FIG. 19 returns to the conditional branch "IS MAGNIFICATION CONTINUED?" and transfers to the second cycle of control. Here, the operations following the "SHIFT AMOUNT MONITORING LOOP" and including the step "STOP VARIABLE POWER DRIVING" and terminating in the step "STOP FOCUS DRIVING" will be referred to as a "FOCUS COMPENSATION OPERATION".

The operations of the second cycle transfer to the focus compensation operation after the direction judging operation has eliminated the erroneous compensation amount (−Dfp) and the variable power lens group 2 has been driven in the direction of the arrow 44 by the operation of the "SHIFT AMOUNT MONITORING LOOP" until the shift amount reaches the prescribed value at Zp =Zp$_3$. When the up switch 16 is turned OFF while the focus compensation operation is in process, the focus compensation operation is continued to drive the focus lens group 3 in the direction of the arrow 45. Thereafter, the focusing lens group 3 reaches the focus curve 37 (the position of the point 46) and the relevant sections complete the focus compensation operation and return to the conditional branch "IS MAGNIFICATION CONTINUED?" At this point, the variable power direction judging section 318 detects the fact that the up switch 16 has been turned OFF. The processing is then branched toward NO and advanced to the next sub-routine step "FOCUS COMPENSATION OPERATION". The contents of the operation of this sub-routine are identical to those of the focus compensation operation described above. In the present case, however practically nothing is produced in the sub-routine "FOCUS COMPENSATION OPERATION" because the step "STOP VARIABLE POWER DRIVING" has been executed and the variable power motor has been stopped and the shift amount has just been compensated to satisfy Drv=0. This sub-routine is prepared for the possible situation in which the up/down switch 16/17 is turned OFF during the course of the operation of the "SHIFT AMOUNT MONITORING LOOP". The processing of the flow chart of FIG. 19 reaches 2 and then transfers to 2 in the flow chart of FIG. 18 and enters the "SWITCH CHECK LOOP" mentioned above. At this point, since neither the up switch 16 nor the down switch 17 is depressed, the operation of the "SWITCH CHECK LOOP" will be repeated thereafter. Thus, all the magnification up operations have been completed.

At this point, the variable power lens group 2 and the focusing lens group 3 are located at the point 4 in FIG. 5. Now, the magnification down operation from this point onward will be described below. Since this operation is easily inferred from the magnification up operation described above, only the essential points thereof will be explained.

As the down switch 17 is depressed, the processing of the flow chart of FIG. 6 at the conditional branch "IS MAGNIFICATION DOWN?" within the "SWITCH CHECK LOOP" is branched toward YES. At the step "ZDR=−1", the signal of ZDR=−1 indicating that the variable power direction is in the magnification down direction is issued. Then, the initial setting operation is executed and, consequently, the variable power operation indicated in FIG. 19 is started. By the direction judging operation mentioned above, the erroneous compensation amount (+Dfp in this case) is eliminated and the focus compensation direction MDR=−1 is decided.

Thereafter, the operation of the "SHIFT AMOUNT MONITORING LOOP" and the focus compensation operation are executed. With reference to the diagram of FIG. 5, after the variable power lens group 2 has been moved from the point 46 in the direction of the arrow 47 until the shift amount surpasses the prescribed value, the focus compensation operation is initiated to drive the focusing lens group 3 in the direction of the arrow 48 and complete the first cycle. The present operation terminates after the focusing lens group 3 has moved similarly in the directions of the arrow 49 and the arrow 50 until the down switch 17 is turned OFF.

The device of the present embodiment is constructed so that the compensation of any deviation produced in the image forming position in consequence of the variable power operation is effected by transforming the variable power direction signal (ZDR) indicating the direction of the variable power operation into the driving direction of the focusing lens group 2 on the basis of the relation determined by the characteristics inherent in the variable power lens group 2 and subsequently executing the focus compensation (shift compensation operation only when the compensation amount (±Dfp) issued by the comprehensive compensation calculation section 12 as accompanied by an erroneous focus compensation direction happens to contain a focus compensation direction conforming to the driving direction mentioned above. Thus, this device is capable of eliminating the compensation amount (±Dfp) containing the focus compensation direction and, therefore, preventing the focusing lens group 2 from generating vibration. As the result, this device is capable of executing the shift compensation and the variable power operation quickly and stably, keeping the focus motor $M_F$ from wasteful consumption of electric power, and preventing the component parts of the focus driving section 5 from unwanted wear.

This device has an advantage that the control can be effected with great stability because the shift compensation mentioned above is executed only when the relative compensation amount Drv surpasses the prescribed value which is amply larger than the component of variation such as the error of calculation.

The device is further constructed so that the position of the focusing lens group 3 is controlled by transforming the compensation amount Dfp calculated as an absolute amount into the relative compensation amount Drv which is capable of being compared with the count number of the focus counter 6 corresponding to the rotation angle (pulse number) of the focus motor $M_F$. Thus, this device has an advantage that the control of the position can be accomplished with high accuracy because the resolution is decisively high as compared with the device using a potentiometer like the FPD 7 as means for detection of the relative movement amount. The device is further constructed so that the shift compensation is accomplished by transforming the compensation amount Dfp into the relative compensation amount Drv which is the same relative amount (digital amount) as the defocus amount Dfx which is produced by the distance measuring section 14 of the automatic focusing device incorporated in the camera. Thus, part of the automatic focusing device incorporated in the camera, namely the focus counter 6, the focus motor $M_F$, and the focus control section, can be diverted for the purpose of the shift compensation of the varifocal lens. Thus, the device can be constructed as simplified owing to the diversion of the part of the camera and to produced at a cost lowered proportionately.

Optionally, the device may be modified by providing the variable power direction judging section with a memory function so that the switching of the variable power control need not be carried out with the two switches, i.e. the up switch 16 and the down switch 17, but may be effected with one switch instead. The criterion for the judgment regarding the conditional branch "IS LARGELY OUT OF FOCUS?" in the flow chart of FIG. 19 need not be limited to Drv≧20 but may be increased or decreased from this particular value so as to optimize the speed of control, the stability of control, and the appearance of image in the finder. It is also permissible to effect the shift compensation each time the variable power amount reaches a prescribed level.

During the course of the focus compensation operation, the variable power driving may be simultaneously carried out on condition that the simultaneous performance of these two operations should neither stop the variable power driving nor impart any adverse effect upon the power sources of the two motors $M_F$ and Mz.

Figure 20:
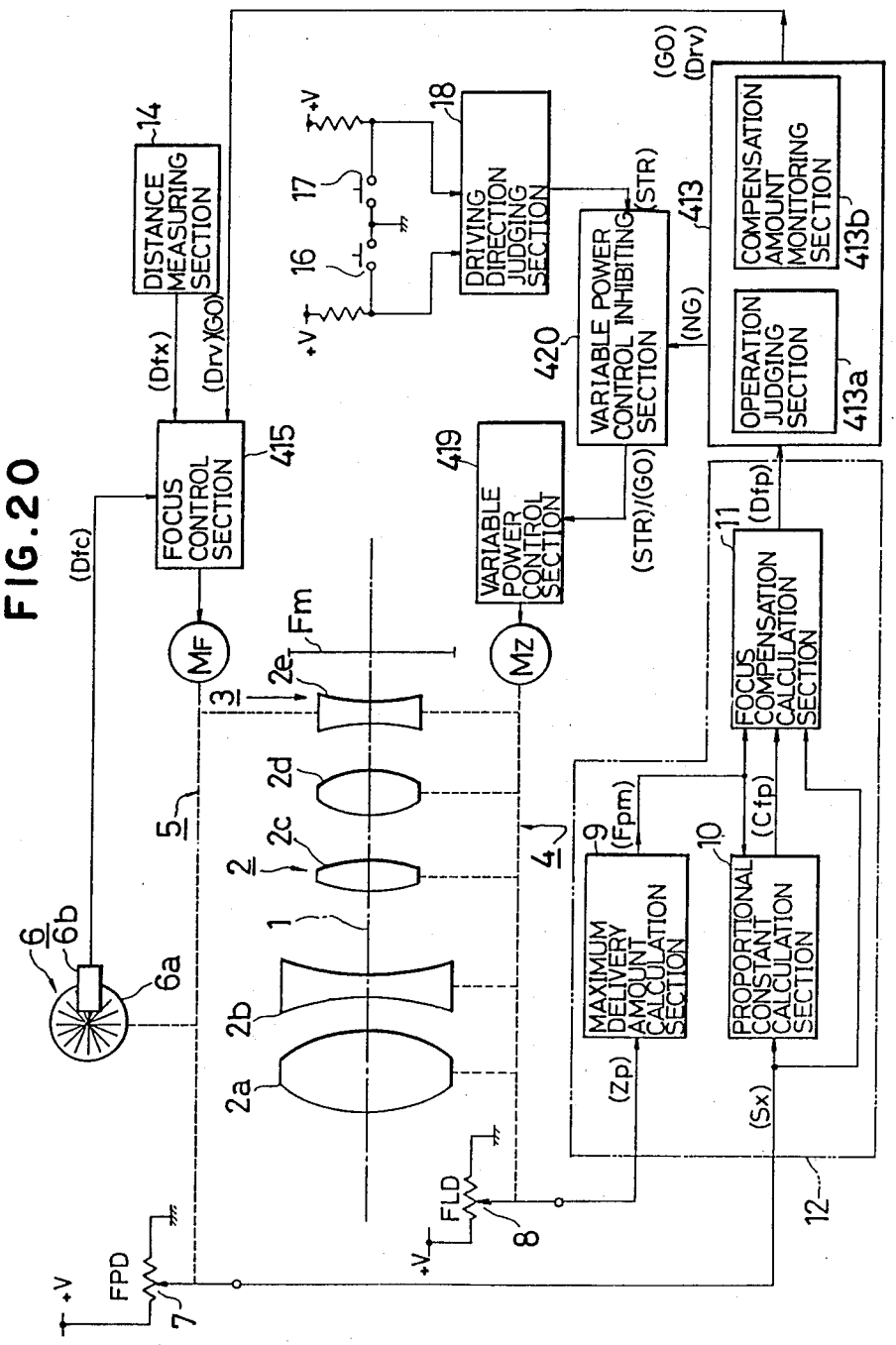
FIG. 20 is a block diagram illustrating the whole construction of a further typical varifocal lens controlling device embodying the present invention.

FIG. 20 is a block diagram illustrating the construction of another typical varifocal lens device embodying the present invention. The construction of the device of FIG. 20 is identical with that of the device of FIG. 1 except for the following point. The device of FIG. 20 is provided with a comprehensive judging section 413 in the place of the absolute/relative amount transforming section 13 of the device of FIG. 1. Further, the device of FIG. 20 is additionally provided with a variable power inhibiting section 420 and has a focus control section 415 and a variable power control section 419 possessing functions partly different from the functions of the respective counter types in the device of FIG. 1.

The comprehensive judging section 413, on receiving the compensation amount Dfp from the comprehensive calculating section 12, transforms this compensation amount Dfp into the relative compensation amount Drv corresponding to the revolution number of the focus motor $M_F$ and, only when the relative compensation amount Drv fulfills a prescribed condition, produces both an inhibition signal (NG) and an execution signal (GO) or only the inhibition signal (NG). To be more specific, the comprehensive judging section 413 comprises an operation judging section 413a as compensation execution judging means for producing the inhibition signal (NG) and the execution signal (GO) when the relative compensation amount Drv and the reference value "20" satisfies the condition Drv≧20 and a compensation amount monitoring section 413b as means for producing only the inhibition signal (NG) when the relative compensation amount Drv and the allowable value "80" satisfies the condition Drv≧80.

A focus control section 415 receives the output Dfc of the focus counter 6, the execution signal (GO), and the relative compensation amount Drv or the defocus amount Dfx mentioned above and controls the focus driving section 5 in such a manner as to drive the focusing lens group 3 to a compensated focal position corresponding to the relative compensation amount or to an estimated focal position corresponding to the defocus amount Dfx.

The variable power inhibiting section 420 receives a start signal (STR) from the driving direction judging section 18 and, during the reception of the inhibition signal (NG), dictates inhibition of the variable power operation by issuing the inhibition signal (NG) and not issuing the start signal (STR) and, during the absence of the reception of the inhibition signal (NG), issues the start signal (STR). The variable power control section 419, on receiving the start signal (STR), controls the variable power driving section 4 or, on receiving the inhibition signal (NG), inhibits the operation of the variable power driving section 4.

The cam diagram of the variable power lens group 2 and the shape of the cam grooves corresponding thereto in the device of the present embodiment are totally identical with those of the device of FIG. 1. The principle of the calculations performed by the comprehensive compensation calculating section 12 is the same as that in the device of FIG. 1.

Figure 21:
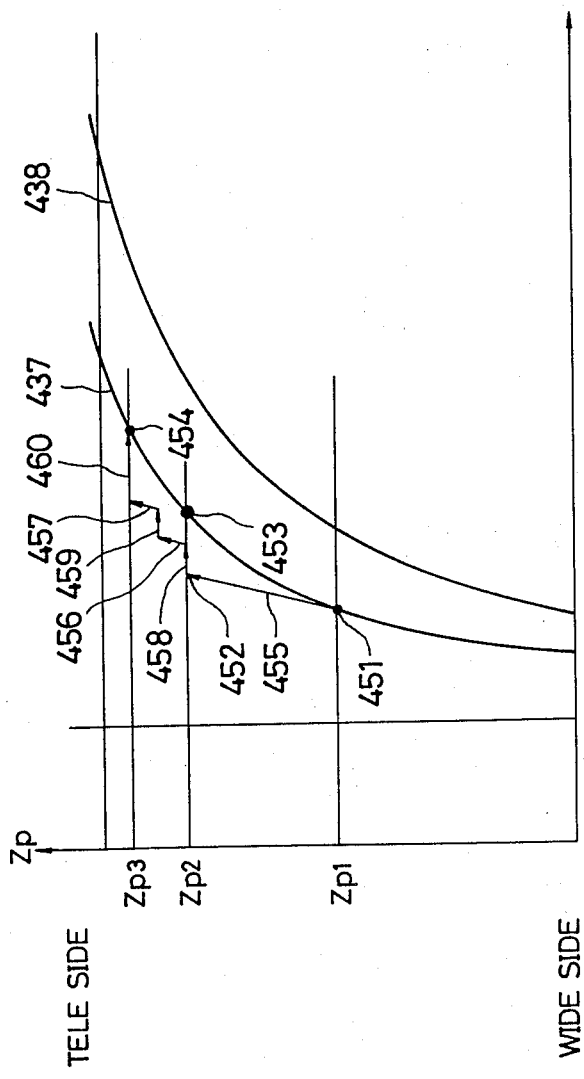
FIG. 21 is a graph depicting the operation of the embodiment of FIG. 20.

FIG. 21 is a graph for the explanation of the operation of the embodiment illustrated in FIG. 20. In the diagram, reference numerals 437 and 438 corresponds to the reference numerals 37 and 38 in the diagram of FIG. 4.

In FIG. 21, reference numeral 451 stands for a start point where the focus curve 437 intersects $Zp=Zp_1$, 452 and 453 stand for points falling on $Zp=Zp_2$, particularly 453 for a point intersecting the focus curve 437, 454 stands for an end point where the focus curve 437 intersects $Zp=Zp_3$, 455 to 457 stand for arrows indicating first to third magnification ratios and corresponding directions and sizes of focus compensation operation, and 458 to 460 stand for arrows indicating directions and sizes of only the focus compensation operation.

Figure 22:
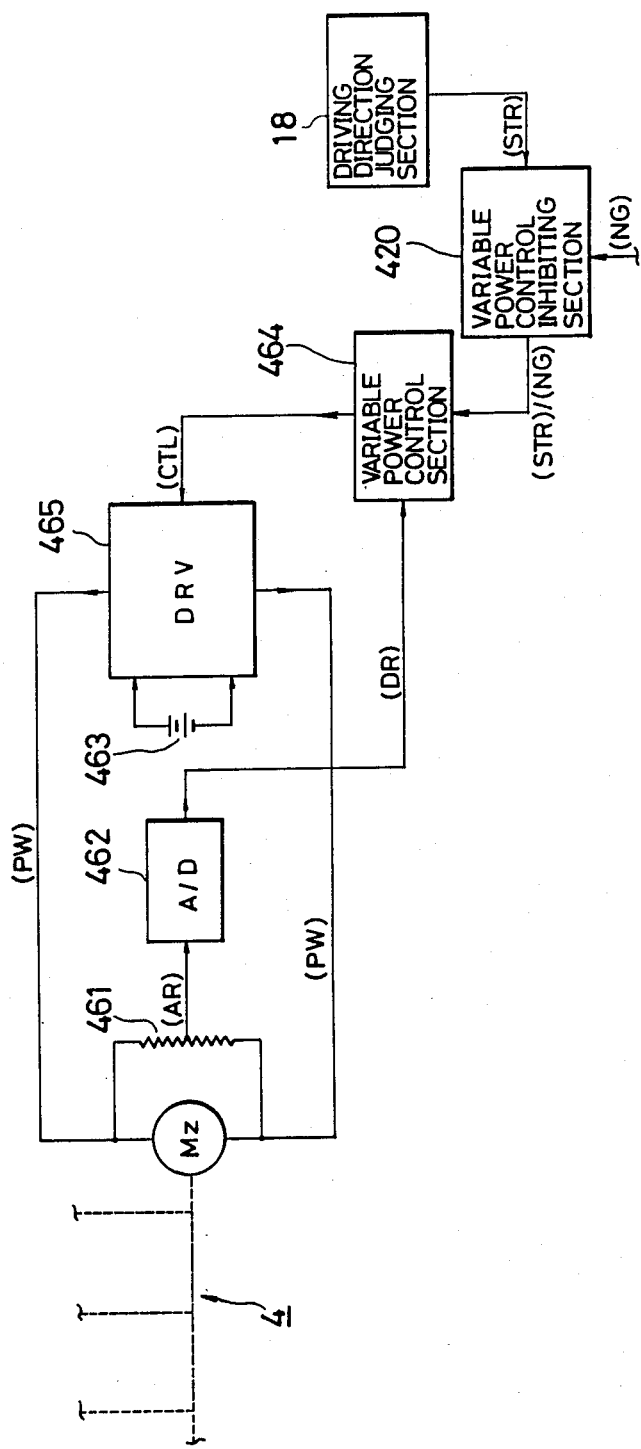
FIG. 22 is a block diagram illustrating a modified version of the embodiment of FIG. 20, particularly the part of alteration in contrast to FIG. 20, FIG. 23 and FIG. 24 are flow charts explaining part of the operation of the embodiment of FIG. 20.

FIG. 22 is a block diagram of a modification of the device of FIG. 20, specifically illustrating portions constituting the modification and part of the periphery thereof. In FIG. 22, reference numeral 4 stands for a partially omitted version of the variable power driving section of FIG. 20; 461 for a counter electromotive force detecting resistor connected to the opposite input terminals of the variable power motor Mz constituting part of the variable power driving section 4; and 462 for an A/D transformer for transforming an analog counter electromotive force (AR) produced from the middle point of the counter electromotive force detecting resistor 461 into a digital signal and issuing the digital signal as a counter electromotive force signal (DR). The A/D transformer 462 and the counter electromotive force detecting resistor 461 are components of means for detection of the variable power speed. A motor power source 463 supplies electric power to the variable power motor Mz, a variable power control section 464 serves as means for receiving the counter electromotive force signal (DR) and produces a prescribed control signal (CTL) which will be described more fully later on, and a drive controlling section (hereinafter referred to as "DRV" for short) 465 to which the motor power source 463 is connected serves the purpose of receiving the control signal (CTL) and controlling, by the switching of the motor power source 463, the driving power source (PW) to be applied to the aforementioned input terminals of the variable power motor Mz. The counter electromotive force (AR) is a voltage component of the induced counter electromotive force which is generated when the driving power source (PW) to be applied to the variable power motor Mz is turned OFF. The induced counter electromotive force is proportional to the rotational speed of the variable power motor Mz. The variable power motor Mz is driven with the pulses produced by the intermission of the driving power source (PW) with a prescribed cycle. The control signal (CTL) is intended to designate the duty ratio of the pulses for the DRV 465 which controls the pulse driving. The reference numerals 18 and 420 denote a driving direction judging section and a variable power inhibiting section similarly to those shown in FIG. 20. The variable power control section 464 starts the variable power operation with the start signal (STR) produced from the variable power inhibiting section 420 and stops the variable power operation with the inhibition signal (NG) similarly to the countertype in the device of FIG. 20.

Figure 23:
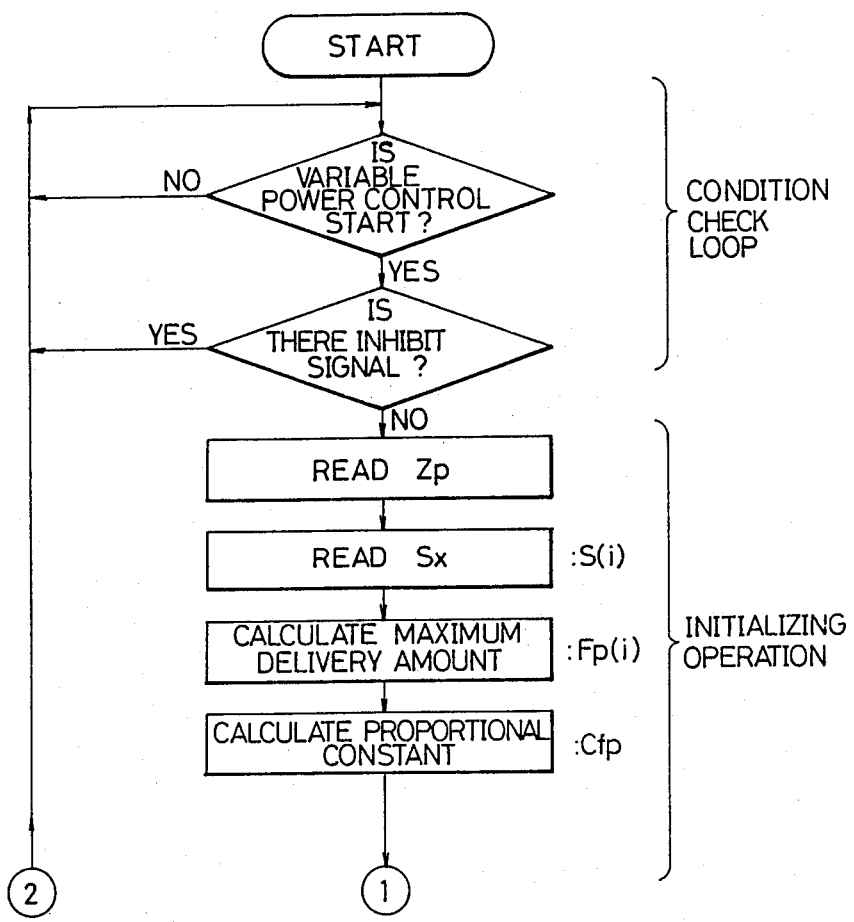
Figure 24:
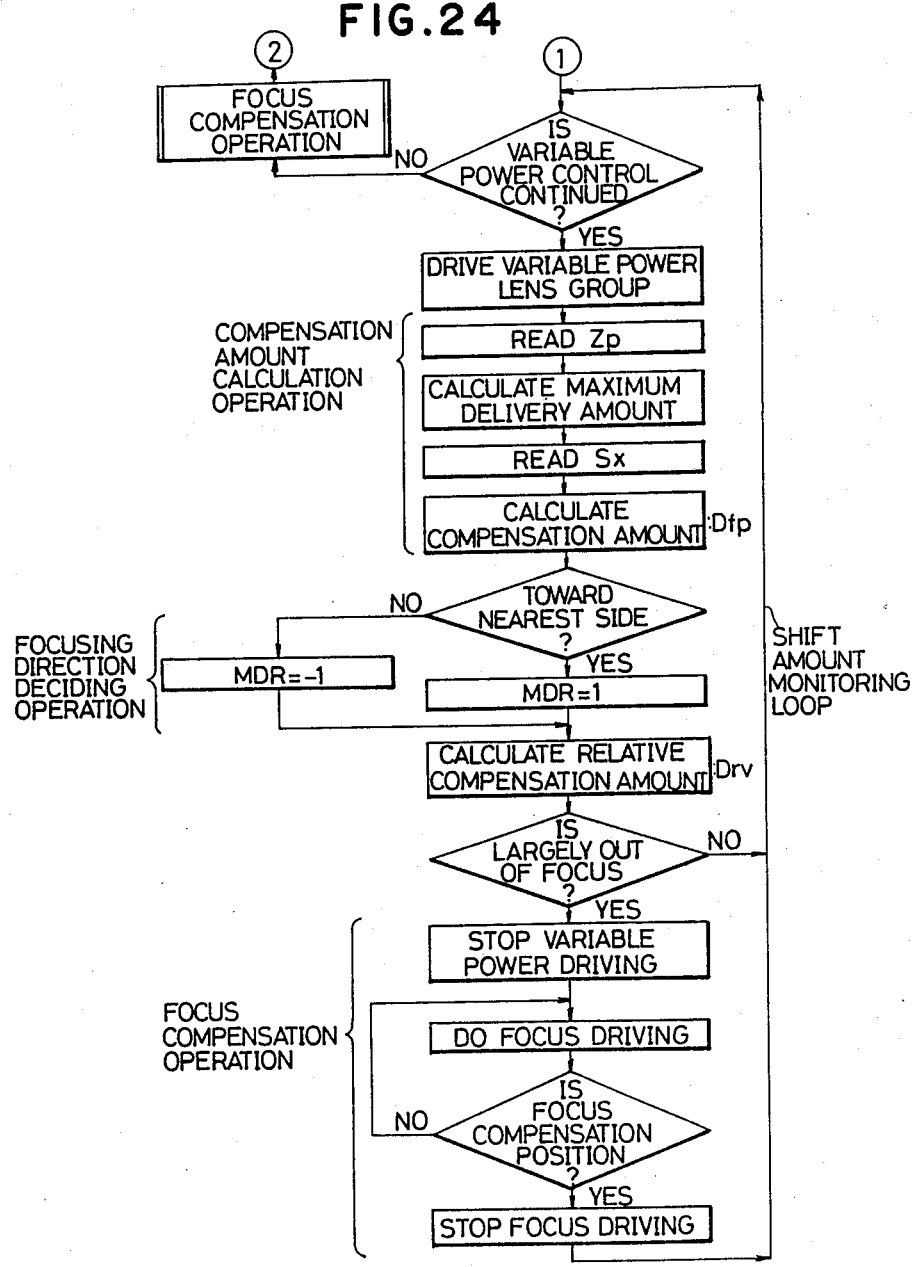
Figure 25:
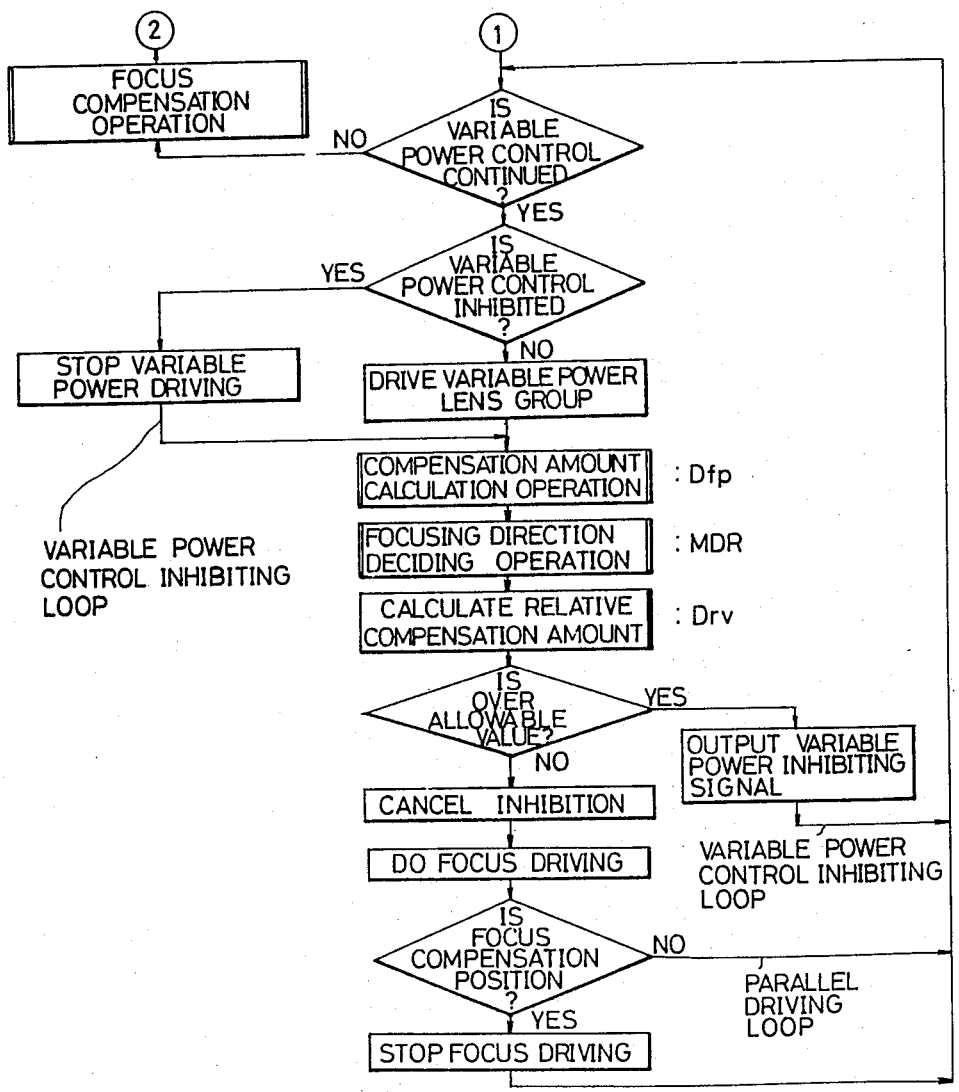
FIG. 25 is a flow chart illustrating the work of power variation and the work of shift compensation performed with the embodiment of FIG. 20.
Figure 26:
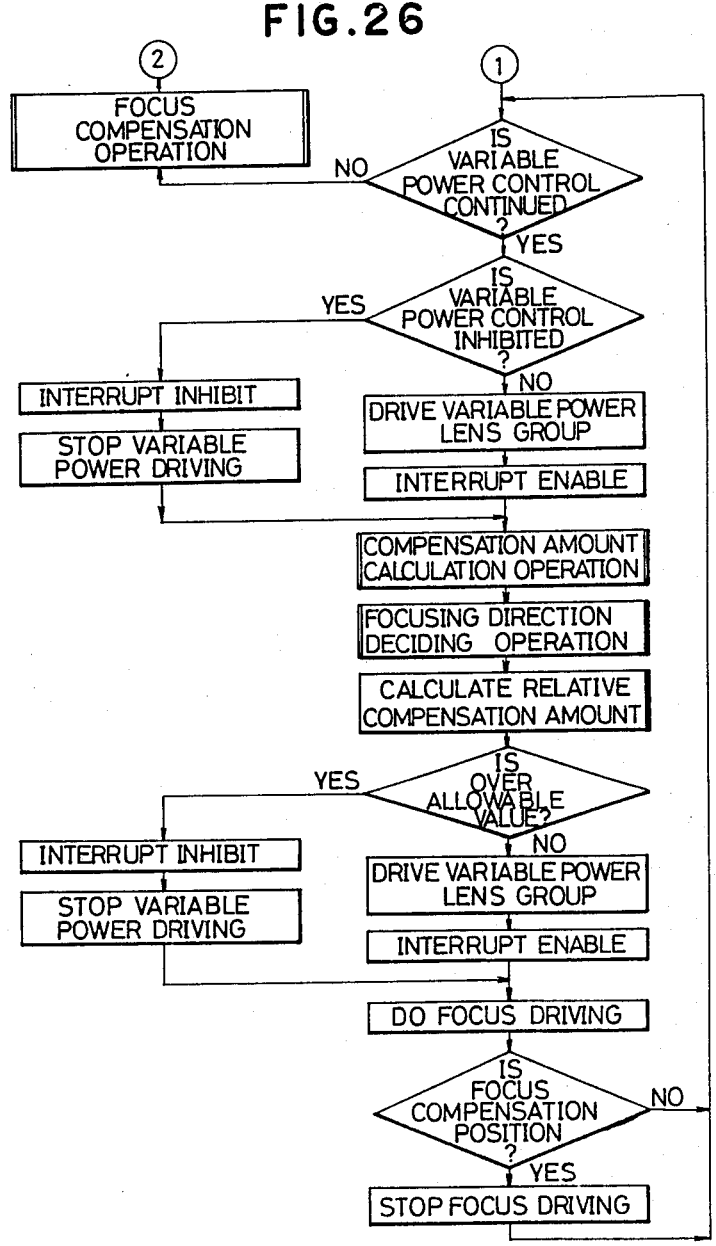
FIG. 26 is a flow chart showing other forms of the work of power variation and the work of shift compensation.

FIGS. 23 to 25 are flow charts illustrating the sequence of operation of the device of FIG. 20. FIG. 26 and FIG. 27 are flow charts illustrating the sequence of operations of the devices of FIG. 20 and FIG. 22. Particularly, the flow chart of FIG. 23 depicts the common operations for the present embodiment, the flow chart of FIG. 24 the operations of the basic aspect of present embodiment, the flow chart of FIG. 25 the operations of a first modification of the present embodiment, and the flow charts of FIG. 26 and FIG. 27 the operations of a second modification of the present embodiment. Especially, FIG. 27 illustrates a sub-routine by an interruption which is generated during the operations of the device of FIG. 26. The contents of the sub-routine are for the variable power speed control. The interruption is adapted to be started at fixed time intervals.

The operations of automatic focusing in the automatic focusing device in the present embodiment constructed as described above are identical to those of the device of FIG. 1.

The variable power operation and the shift operation involved in the basic aspect of the present embodiment will be described below along the flow charts of FIG. 23 and FIG. 24. The following description ignores the presence of the compensation amount monitoring section 413b. Now, it is assumed that the focusing lens group 3 is located at the position at which an object placed at a distance of 3.0 m is focused. It, therefore, falls on the focus curve 37 in the diagram of FIG. 5.

First, the magnification up operation which moves from the wide side to the tele side will be described. As the up switch 16 shown in FIG. 20 is depressed, the driving direction judging section 18 issues a start signal (STR) containing the information on the variable power direction. As the result, the processing of the flow chart of FIG. 23 is initiated at "START". First, at the conditional branch "IS VARIABLE POWER CONTROL START?", the driving direction judging section 18 checks the conditions of the variable power switches 16, 17. In the present case, since the up switch 16 is in a depressed state, the processing is branched toward YES. At the next conditional branch "IS THERE INHIBIT SIGNAL?", the variable power inhibiting section 420 checks the operation judging section 413a of the comprehensive judging section 413 to determine whether it has issued an inhibition signal (NG) or not. In the present case, the processing is branched toward YES because it is not long after the operation is started and the inhibition signal (NG) has not yet been issued. To be specific, the variable power inhibiting section 420 issues the start signal (STR) to the variable power control section 419. The loop passing the conditional branches "IS VARIABLE POWER CONTROL START?" and "IS THERE INHIBIT SIGNAL?" respectively toward NO and YES will be referred to hereinafter as "CONDITION CHECK LOOP". Then, at the next step "READ Zp" and the step "READ Sx", the maximum delivery amount calculation section 9 receives the output (Zp) of the FLD 8 as the information on focal length and subjects it to A/D transformation and the proportional constant calculation section 10 receives the output (Sx) of the FPD 7 as the information on the position of the focusing lens group and subjects it to A/D transformation. The outputs of the transformation are denoted as $Zp_1$ and $S_1$ respectively in the diagram of FIG. 5. The variable power lens group 2 is assumed to be located at the point 39. At the next step "CALCULATE MAXIMUM DELIVERY AMOUNT", the maximum delivery amount calculation section 9 determines the maximum delivery amount Fpm by effecting substitution of $Zp_1$ in the formula (8). At the next step "CALCULATE PROPORTIONAL CONSTANT", the proportional constant calculation section 10 receives the maximum delivery amount Fpm and calculates the proportional constant Cfp by effecting substitution of Fpm in the formula (9). To be specific, the proportional constant Cfp is determined by substituting S(i) for Si and Fp(i) for Fpm relative to $Zp_1$ in the formula (9). This proportional constant equals the ratio of the length between the focus curve 36 for the infinity $\infty$ and the point 39 on $Zp=Zp_1$ to the length between the focus curve 36 for the infinity and the point $38_a$ in the diagram of FIG. 5. The processing of the flow chart of FIG. 23 reaches and then transfers the flow chart of FIG. 24. Here, the operations which follow the "CONDITION CHECK LOOP" mentioned above and precede will be referred to as "INITIALIZING OPERATION".

At the conditional branch "IS VARIABLE POWER CONTROL CONTINUED?" in the flow chart of FIG. 24, the driving direction judging section 18 checks the up switch 16 and the down switch 17 to determine whether they are depressed (ON state) or not. It is now assumed that the up switch 16 is in a depressed state. (It is assumed that this state of the up switch 16 remains intact until specified otherwise.) The processing, therefore, is branched toward YES at the aforementioned conditional branch. Then, at the next step "DRIVE VARIABLE POWER LENS GROUP", the variable power control section 419 sets the variable power motor Mz in the magnification up direction with reference to the variable power direction contained in the start signal (STR). This means that the variable power operation is initiated. Thus, the variable power lens group 2 is moved and the output (Zp) of the FLD 8 is varied as indicated by the arrow 40 (FIG. 5). Since the focus motor $M_F$ is not in motion, the FPD 7 causes the fifth lens group 2e to change position (move) along the cam curve 24 of FIG. 2 or the cam groove 31 of FIG. 3. The focusing lens group 3 is retained at a fixed position and is not affected by the variable power operation. At the next step "READ Zp", the maximum delivery amount calculation section 9 reads in the latest value Zp' (the position of the point 41) of the information on the focal length which has begun to vary in the direction indicated by the arrow in FIG. 5. At the next step "CALCULATE MAXIMUM DELIVERY AMOUNT", the latest Fpm is calculated by effecting substitution of Zp' in the formula (8). At the next step "READ Sx", though no change ought to have occurred, the focus compensation calculation section 11 reads in the Sx once again in consideration of the rounding error of the A/D transformer and the mechanical backlash. Then at the next step "CALCULATE COMPENSATION AMOUNT", the compensation amount Dfp as an absolute amount is calculated by using the proportional constant Cfp found at the step "CALCULATE PROPORTIONAL CONSTANT" in FIG. 23 and effecting substitution of Fp(e) for Fpm relative to Zp' and S1 =S(i) for Sx read in again in the formula (10). The operations from the step "READ Zp" to the step "CALCULATE COMPENSATION AMOUNT" will be referred to as "COMPENSATION AMOUNT CALCULATION OPERATION". At the next conditional branch "TOWARD NEAREST SIDE?" the focus compensation calculation section 11 makes judgment as to whether the focusing direction is toward the nearest side or the infinity $\infty$ side. In the present case, since the variable power direction is in the magnification up direction, namely in the direction indicated by the arrow 40 of FIG. 5, the processing is branched toward YES with the judgment that for the purpose of focusing, it suffices to drive the focusing lens group 3 toward the focus curve 37, namely in the direction indicated by the arrow 43. Then, at the next step "MDR=1", the information on focal direction, MDR=1, signifying the driving toward the nearest position is issued in combination with the compensation amount Dfp. The conditional branch "TOWARD NEAREST SIDE?" the step "MDR=1", and the step "MDR=-1" will be collectively referred to as "FOCUSING DIRECTION DECIDING OPERATION". At the next step "CALCULATE RELATIVE COMPENSATION AMOUNT", the comprehensive judging section 413 transforms the compensation amount Dfp into the relative compensation amount Drv by carrying out a calculation of Drv=Dfp×Ct wherein Ct stands for the constant to be determined by the specific constructions of the focus counter 6 and the focus driving section 5.

Now, at the conditional branch "IS LARGELY OUT OF FOCUS?" which is an essential part for the basic aspect of the present embodiment, the operation judging section 413a checks the relative compensation amount Drv to determine whether this amount has surpassed a prescribed level (such as, for example, Drv≧20) and monitors the focus movement (shift amount) by the variable power control operation to determine whether the movement amount has surpasses a prescribed level or not. In the present case, since it is not long after the driving of the variable power lens group 2 is started and the shift amount (corresponding to the length between the point 41 and the point 41a in FIG. 5) is small, the processing is branched toward NO and returned again to the conditional branch "IS VARIABLE POWER CONTROL CONTINUED?" and the operations described above are repeated. Here, this operational loop will be referred to as "SHIFT AMOUNT MONITORING LOOP". The variable power motor Mz continues its rotation and the variable power lens group 2 is driven in the direction of the arrow 40, passed through the point 41 and forwarded in the direction of the arrow 42 in FIG. 5. When Drv=20 is reached at $Zp=Zp_2$, the "SHIFT AMOUNT MONITORING LOOP" mentioned above is branched toward YES at the conditional branch "IS LARGELY OUT OF FOCUS?". At this time, the comprehensive judging section 413 produces the execution signal (GO), the relative compensation amount Drv, and MDR=1 and, at the same time, issues the inhibition signal (NG). Then, at the next step "STOP VARIABLE POWER DRIVING", the variable power control section 419 which has received the inhibition signal (NG) stops the variable power motor Mz and the focus control section 415 which has received the execution signal (GO), the relative compensation amount Drv, and the focusing direction information MDR=1 sets the focus motor $M_F$ rotating at the next step "DO FOCUS DRIVING" to drive the focusing lens group 3 toward the nearest side, namely in the direction of the arrow 43 in FIG. 5. This direction corresponds to the direction from the cam curve 24 toward the cam curve 24a in the diagram of FIG. 2. At the next conditional branch "IS FOCUS COMPENSATION POSITION?" the focus control section 415 continuously compares the output Dfc of the focus counter 6 with the relative compensation amount Drv and continues to drive the focusing lens group 3 by causing the processing to be branched toward NO and returned to the step "DO FOCUS DRIVING" until the output Dfc and the relative compensation amount Drv conform to each other. Thereafter, when the focusing lens group 3 moves in the direction of the arrow indicated in FIG. 5 and reaches the focus curve 37 for 3.0 m to satisfy Dfc=Drv, the processing is branched at the aforementioned conditional branch toward YES. At the next step "STOP FOCUS DRIVING", the focus motor $M_F$ is stopped. The operations so far described constitute the first cycle of the variable power control operation and the shift operation. The processing of the flow chart of FIG. 24 returns to the conditional branch "IS VARIABLE POWER CONTROL CONTINUED?" and switches to the control of the second cycle. Here, the operations which follow the "SHIFT AMOUNT MONITORING LOOP" and include the step "STOP VARIABLE POWER DRIVING" and the step "STOP FOCUS DRIVING" will be referred to as "FOCUS COMPENSATION OPERATION".

The operations of the second cycle are such that the focus compensation operation mentioned above starts after the variable power lens group 2 has been driven in the direction of the arrow 44 by the operation of the "SHIFT AMOUNT MONITORING LOOP" and the shift amount has reached the prescribed value at $Zp=Zp_3$ When the up switch 16 is turned OFF while the focus compensation operation is in process, the focus compensation operation is continued and the focusing lens group 3 is driven in the direction of the arrow 45. Thereafter, the processing returns to the conditional branch "IS VARIABLE POWER CONTROL CONTINUED?" after the focusing lens group 3 reaches the focus curve 37 (the position of the point 46) and the relevant sections complete the focus compensation operation. At this point, the driving direction judging section 18 detects the fact that the up switch 16 has been turned OFF and the processing is branched toward NO and advanced to the next sub-routine "FOCUS COMPENSATION OPERATION". The contents of this sub-routine are the same as those of the focus compensation operation described above. In the present case, practically nothing is effected in the sub-routine "FOCUS COMPENSATION OPERATION" because the variable power motor Mz has been stopped and the shift amount has reached Drv=0 in consequence of the complete execution of the step "STOP VARIABLE POWER DRIVING". This sub-routine is prepared for the possible situation in which the up/-down switch 16/17 is turned OFF while the operation of the shift amount monitoring is in process. The flow chart of FIG. 24 reaches 2 then transfers to 2 in the flow chart of FIG. 23 and enters the "CONDITION CHECK LOOP" mentioned above. Since neither the up switch 16 nor the down switch 17 is depressed at this point, the operation of the "CONDITION CHECK LOOP" will be repeated thereafter. All the magnification up operations have now been completed.

At this point, the variable power lens group 2 and the focusing lens group 3 are located at the point 46 of FIG. 5. The magnification down operations will be described now. Since they can be inferred from the magnification up operations described above, only the essential points thereof will be described briefly below.

As the down switch 17 is depressed, the processing of the flow chart of FIG. 23 at the conditional branch "IS VARIABLE POWER CONTROL START?" within the "CONDITION CHECK LOOP" is branched toward YES. It is then branched at the conditional branch "IS THERE INHIBIT SIGNAL?" toward NO to induce execution of the initializing operation. Then, in the processing of FIG. 24, the variable power operation is started. At the conditional branch "TOWARD NEAREST SIDE?" within the "SHIFT AMOUNT MONITORING LOOP", the processing is branched toward NO to bring about the decision at the step "MDR=−1"that the focusing direction is toward the infinity side. In FIG. 5, the focus compensation operation is started after the variable power lens group 2 moves from the point 46 in the direction of the arrow until the shift amount surpasses the prescribed value. Then, the focusing lens group 3 is moved in the direction of the arrow 48 to complete the first cycle. The present operation stops after the focusing lens group 3 similarly moves in the directions of the arrow 49 and the arrow 50 and the down switch 17 is turned OFF.

Now, the variable power operation and the shift compensation operation involved in the first modification of the present embodiment will be described along the flow charts of FIG. 23 and FIG. 25. The following description ignores the presence of the operation judging section 413a of FIG. 20. Since the magnification down operations can be inferred from the magnification up operation as mentioned above, only the magnification up operations will be described below. The operations similar to those shown in FIG. 23 and FIG. 24 will be denoted by the same designations and omitted from the following description.

In FIG. 21, it is assumed that the focusing lens group 3 is located at the start point 451 on the focus curve 437 and the variable power lens group 2 at the same start point 451. As the up switch 16 of FIG. 20 is depressed, the processing of the flow chart is initiated at "START" of FIG. 23, passed through the "CONDITION CHECK LOOP" mentioned above, engaged in the execution of the "INITIALIZING OPERATION", and terminated at 1 of FIG. 25. At the conditional branch "IS VARIABLE POWER CONTROL CONTINUED?" in FIG. 25, the processing is branched toward YES. At the next conditional branch "IS VARIABLE POWER CONTROL INHIBITED?" the variable power control inhibiting section 420 checks the comprehensive judging section 413 to decide whether it has issued an inhibition signal (NG) or not. At this point, the inhibition signal (NG) is not yet issued by the compensation amount monitoring section 413b of the comprehensive judging section 413 because the condition of Drv≧80 has not yet been satisfied. As the result, the processing at the aforementioned conditional branch is branched toward NO. At the step "DRIVE VARIABLE POWER LENS GROUP", the variable power control operation is started. The subsequent sub-routines "COMPENSATION AMOUNT CALCULATING OPERATION" and "FOCUSING DIRECTION DECIDING OPERATION" have the same contents as the compensation amount calculating operation and the focusing direction deciding operation already described with respect to the flow chart of FIG. 24. When these operations are executed and the next step "CALCULATE RELATIVE COMPENSATION AMOUNT" is executed, the compensation amount monitoring section 413b checks and decides whether Drv≧80 is satisfied or not at the next conditional branch "IS OVER ALLOWABLE VALUE?" In the absence of the fulfillment of this condition, the processing is branched toward NO and passed through the next step "CANCEL INHIBITION" (substantially no operation is performed because no inhibition has yet been effected). At the next step "DO FOCUS DRIVING", the compensation amount monitoring section 413b issues the execution signal (GO), the relative compensation amount Drv, and the information on the focal direction MDR=1 because the condition Drv ≧80 has not yet been fulfilled. The focus control section 415, on receiving these outputs, drives the focus driving section 5 so as to advance the focusing lens group 3 toward the nearest side. At the next conditional branch "IS FOCUS COMPENSATION POSITION?" the focus control section 415 checks Dfc and decides whether the focusing lens group 3 has reached the compensated focal position or not. When this decision is in the negative, the processing is branched toward NO and returned to the conditional branch "IS VARIBLE POWER CONTROL CONTINUED?" This operation is repeated until the condition Dfc=Drv is satisfied. This operational loop will be referred to as "PARALLEL DRIVING LOOP". In FIG. 21, the variable power lens group 2 and the focusing lens group 3 are jointly moved in the direction of the arrow 55. Since the time intervening between the step "DRIVE VARIABLE POWER LENS GROUP" and the step "DO FOCUS DRIVING" is actually an instant, the arrow 455 is depicted with one straight line on the assumption that the variable power control operation and the shift compensation operation are simultaneously started. Thereafter, when the condition Drv≧80 is satisfied at $Zp=Zp_2$, namely when the relative compensation amount Drv reaches an amount corresponding to the length from the point 452 to the point 453 in FIG. 21, the compensation amount monitoring section 413b draws a judgment that if the variable power control operation is continued as it is in conjunction with the shift compensation operation, the shift amount generated in consequence of the variable power control operation increases excessively and the shift compensation operation eventually fails to follow the increase in the shift amount. Thus, the processing at the aforementioned conditional branch "IS OVER ALLOWABLE VALUE?" is branched toward YES. At the next step "OUTPUT VARIABLE POWER INHIBITING SIGNAL", the comprehensive judging section 413 produces the inhibition signal (NG). The processing of the flow chart is returned to the conditional branch "IS VARIABLE POWER CONTROL CONTINUED?" and is branched toward YES at the next conditional branch "IS VARIABLE POWER CONTROL INHIBITED?" At the next step "STOP VARIABLE POWER DRIVING", the variable power inhibiting section 420 which has received the inhibition signal (NG) switches this output from the start signal (STR) to the inhibition signal(NG). The variable power control section 419, on receiving this inhibition signal (NG), immediately stops the variable power control operation. The processing then passes the next sub-routine "COMPENSATION AMOUNT CALCULATING OPERATION" and reaches the conditional branch "IS OVER ALLOWABLE VALUE?" So long as the condition Drv≧80 is satisfied, the processing continues to be branched toward YES to repeat the operations described above. Here, this operational loop will be referred to as "VARIABLE POWER CONTROL INHIBITING LOOP". In FIG. 21, the variable power control operation is immediately stopped and only the shift compensation operation is allowed to continue when the condition $Zp=Zp_2$ is satisfied. Thus, the focusing lens group 3 alone is moved in the direction of the arrow 458. Since the condition of Drv≦80 arises from the movement, the processing is branched toward NO at the conditional branch "IS OVER ALLOWABLE VALUE?" within the variable power inhibiting loop mentioned above. At the next step "CANCEL INHIBITION", the compensation amount monitoring section 413b stops the output of the inhibition signal (NG). The processing transfers to the "PARALLEL DRIVING LOOP" and at the step "DRIVE VARIABLE POWER LENS GROUP" within this loop starts the variable power control operation and consequently effects simultaneous performance of the shift compensation operation and the variable power control operation and produces the movement in the direction of the arrow 456. Then, in the flow chart, the "VARIABLE POWER CONTROL INHIBITING LOOP" and the "PARALLEL DRIVING LOOP" are alternately repeated. In FIG. 21, the movement is produced in the directions of the arrows 459 and 457. When the up switch 16 is turned OFF at $Zp=Zp_3$, the processing is branched toward NO at the conditional branch "IS VARIABLE POWER CONTROL CONTINUED ?" within the "PARALLEL DRIVING LOOP". By the next sub-routine "FOCUS COMPENSATION OPERATION", the variable power operation is stopped. The focusing lens group 3 is then driven in the direction of the arrow 460. The operation is completed when the focusing lens group 3 reaches the end point 454. In the case described above, the processing is not branched toward YES at the conditional branch "IS FOCUS COMPENSATION POSITION?" while the variable power switches 16, 17 are in their operative state. This sub-routine is intended for the purpose of stopping the driving of the focus lens groups 3 by the step "DO FOCUS DRIVING" when mechanical backlash arises in the focus driving section 5 and the variable power driving section 4 or when the condition Dfc=Drv is accidentally satisfied.

Now, the variable power control operation and the shift compensation operation involved in the second modification of the present embodiment will be described along the flow charts of FIG. 23 and FIG. 26. Since the operations involved in the flow chart of FIG. 23 are identical to those already described and will be omitted from the following description. Further since the operations of the flow chart of FIG. 26 are substantially equal to those of FIG. 25, only the portions of such operations which differ from those of FIG. 25 will be described below. When the processing is branched toward YES at the conditional branch "IS VARIBLE POWER CONTROL INHIBITED?", the interruption whose contents are illustrated in FIG. 27 is inhibited at the next step "INTERRUPT INHIBIT" and the driving of the variable power motor Mz is stopped at the next step"STOP VARIABLE POWER DRIVING". When the processing is branched toward NO at the aforementioned conditional branch, the variable power control operation is started at the next step "DRIVE VARIABLE POWER LENS GROUP" and the interruption of FIG. 27 is allowed at the next step "INTERRUPT ENABLE". When the processing is branched toward YES at the conditional branch "IS OVER ALLOWABLE VALUE?", the step "INTERRUPT INHIBIT" and the step "STOP VARIABLE POWER DRIVING" are executed. When the processing is branched toward NO, the step "DRIVE VARIABLE POWER LENS GROUP" and the step "INTERRUPT ENABLE" are executed. Now, the variable power speed control which constitutes an essential part of the variable power control operation and the shift compensation operation involved in the second modification will be described along the flow charts of FIG. 27 and FIG. 26. The processing of the flow chart of FIG. 27 is started at fixed time intervals as already pointed out. No matter which of the operations of FIG. 26 is being executed, the interruption becomes effective so long as the existing condition allows it. At this point, the processing of the flow chart transfers to the flow sheet of FIG. 27. Since the operations of the varying sections illustrated in FIG. 20 have been already described, the operations of the flow chart of FIG. 22 will be chiefly described below. When the interruption is started while the variable power control inhibiting section 420 is issuing the start signal (STR), the variable power control section 464 checks the output of the variable power control inhibiting section 420 and causes the processing to be branched toward NO at the conditional branch "IS VARIABLE POWER CONTROL INHIBITED?" of FIG. 27. At the next step "READ COUNTER VOLTAGE", the variable power control section 464 reads in the counter electromotive force signal (DR) which has been produced when the analog counter electromotive force (AR) produced from the counter electromotive force detecting resistor 461 is converted by the use of the A/D converter 462. At the next conditional branch "IS WITHIN DEFINED RANGE?", the counter electromotive force signal (DR) is checked to determine whether it is within the defined range or not. When the signal is found to be within the range, the processing is branched toward YES and returned by the RTI to the flow chart of FIG. 27 with the judgment that the variable power motor Mz is moving at a fixed speed. As clearly noted from the changes of the cam curves 20 to 24 of FIG. 2 and the cam grooves 27 to 31 of FIG. 3 between the wide position 26 and the tele side position 25, the torque required for the driving of the variable power lens group 2 is varied by the position of this variable power lens group 2. The revolution number (speed) of the variable power motor Mz decreases as the mechanical load exerted on the variable power motor increases. As the result, the control signal (CTL) is issued which instructs the processing to be branched toward NO at the conditional branch "IS WITHIN DEFINED RANGE?" and toward NO at the present conditional branch "IS OVER DEFINED RANGE?" and the DRV 465 now engaged in pulse control to increase the individual ON times of the pulse. The DRV 465, on receiving the control signal, adjusts (by increasing ON time) the duty ratio of the driving power source (PW) and controls the variable power motor Mz so as to increase the speed thereof. This controlling operation is repeated until the counter electromotive force signal (DR) falls within the defined range mentioned above. When the mechanical load upon the variable power motor Mz is lightened, the principle of the ensuing operation is the same excepting the processing is branched toward YES at the conditional branch "IS OVER DEFINED RANGE?" and the step "DECREASE ON TIME" is executed.

Since the present embodiment effects inhibition of the variable power control operation during the course of the shift compensation (focus compensation) as an operation peculiar to the basic aspect of the embodiment, it has an advantage that the power source voltages of the variable power motor Mz and the focus motor $M_F$ can be prevented from heavily falling and, as the result, the shift compensation operation and the variable power control operation as a whole can be prevented from loss of speed and loss of accuracy of control.

The first modification of the present embodiment effects simultaneous performance of the variable power control operation and the shift compensation operation and inhibition of the variable power control operation when the shift amounts surpasses the allowable value as operations peculiar thereto. Thus, it has an advantage that even when abnormal change occurs in the rotational speed of the variable power motor Mz, the variable power control operation and the shift compensation operation can be performed quickly and safely without preventing the shift compensation operation from following the variable power control operation or jeopardizing effective continuation of the control.

The second modification of the embodiment effects retention of the rotational speed of the variable power motor Mz within the defined range during the course of the variable power control operation as an operation peculiar thereto. This modification, therefore, has an advantage that even when abnormal change occurs in the mechanical load exerted upon the variable power motor Mz, the variable power control operation can be continued at a fixed speed and, as the result, the shift compensation operation can be retained at a fixed speed and with fixed time intervals and the control can be attained smoothly with high accuracy.

Further, the present device is constructed so that the shift compensation is accomplished by causing the comprehensive judging section 413 to transform the compensation amount Dfp into the relative compensation amount Drv which is the same relative amount (digital amount) as the defocus amount Dfx to be issued by the distance measuring section 14 of the automatic focusing device incorporated in the camera. This device, therefore, is allowed to utilize for the shift compensation of the varifocal lens part of the automatic focusing device incorporated in the camera such as the focus counter 6, the focus motor $M_F$, and the focus control section 415. As the result, the device is allowed to simplify the construction of its own and lower the production cost thereof.

The criterion for the judgment concerning the conditional branch "IS LARGELY OUT OF FOCUS?" in the flow chart of FIG. 24 need not be limited to Drv≧20 but may be increased or decreased from this particular reference value of "20" so as to optimize the speed of control, the stability of control, and the appearance of image in the finder. It is also permissible to effect the shift compensation each time the variable power amount reaches a fixed amount or with fixed time intervals.

By the same token, the criterion for the judgment regarding the conditional branch "IS OVER ALLOWABLE VALUE?" in the flow diagram of FIG. 25 and FIG. 26 need not be limited to Drv≧80 but may be increased or decreased from the particular value of 80 in due consideration of the stability of the variable power control operation and the control speed of the shift compensation operation.

It is also permissible for the judgment on the criterion Drv≧20 and that on the criterion Drv≧80 to depend on the compensation amount Dfp instead of the relative compensation amount Drv.

The operation of FIG. 27 need not be limited to the interruption. It may be adapted instead in the form of a sub-routine capable of being branched (initiated) by software. What matters most is the effectiveness with which the variable power speed can be controlled. The manner of starting the control does not matter at all.

The embodiment described above is so constructed that automatic focusing is attained by virtue of the defocus amount signal to be received from the distance measuring section 14 of the automatic focusing device incorporated in the camera. Of course, the present invention can be applied effectively to a camera not provided with any automatic focusing device.

The embodiments described are intended to be purely illustrative, not limitative, of the invention and persons of ordinary skill in the art, therefore, are enabled to make variations and modifications thereof without departing from the spirit and scope of the invention. All modifications are embraced in the scope of the claims appended hereto.

What is claimed is:

1. A varifocal lens device provided with a variable power optical system composed of a variable power lens group and a focusing lens group which is a part of said variable power lens group disposed on an optical axis for compensating a deviation produced in the image forming position for an object when said focusing lens group is set at a focusing position between the nearest possible position and the infinitely far position on the optical axis corresponding to an object distance falling between the shortest possible distance and the infinitely long distance and then an overall focal length of said variable power optical system is subsequently renewed from a first to a second focal length selected freely between the shortest possible focal length and the longest possible focal length by means of said variable power lens group, said device comprising:

a first driving means for driving said variable power lens group;

a second driving means for driving said focusing lens group;

a first detecting means for detecting the absolute positions of said variable power lens group on the optical axis;

a calculating means for receiving the information on the focal length and the position of said focusing lens group from said first detecting means and, based on the received information, for calculating an absolute amount of compensation of focal length necessary for the elimination of the deviation in the image forming position;

a transforming means for transforming a compensated focal position as an obsolete amount into the amount of movement as a relative amount;

a second detecting means for detecting the amount of movement of said focusing lens group on the optical axis as a relative amount;

a first controlling means for controlling said first driving means; and a second controlling means for receiving the data on distance measurement issued as an absolute amount from measuring means separately installed for measuring the distance to an object or for receiving the output of said transforming means and, based on the data or the output so received and in accordance with the output of second detecting means, for controlling said second driving means so as to drive said focusing lens group to an estimated focal position for the object or to the compensated focal position.

2. A varifocal lens device provided with a variable power optical system composed of a variable power lens group and a focusing lens group which is a part of said variable power lens group disposed on an optical axis, for compensating a deviation produced in the image forming position for an object when said focusing lens group is set at a focusing position between the nearest possible position and the infinitely far position on the optical axis corresponding to an object distance falling between the shortest possible distance and the infinitely long distance and then an overall focal length of said variable power optical system is subsequently renewed from a first to a second focal length selected freely between the shortest possible focal length and the longest possible focal length by means of said variable power lens group, said device comprising:

a first driving means for driving said variable power lens group;

a second driving means for driving said focusing lens group;

a first detecting means for detecting absolute positions of said variable power lens group on the optical axis and feeding out information on focal length and information on the position of said focusing lens group;

a first calculating means for receiving the aforementioned information on focal length and, based on the information, for calculating a maximum amount of delivery of said focusing lens group from the infinite far position to the nearest position correspondingly to the pertinent focal length;

a second calculating means for receiving the output of said first calculating means and the information on the position of said focusing lens group from said first detecting means and, based on the ratio of the two outputs, for calculating a proportional constant;

a third calculating means for receiving the proportional constant, the maximum amount of delivery, and the information on the position of said focusing lens group and, based on the information so received, for calculating the amount of the deviation of the image forming position from a focal position to be produced in consequence of a renewal of the overall focal length as an amount of compensation;

a transforming means for transforming the amount of compensation as an absolute amount to the amount of movement as a relative amount;

a second detecting means for detecting the amount of movement of said focusing lens group on the optical axis as a relative amount;

a first controlling means for controlling said first driving means; and a second controlling means for continuing the control of said second driving means so as to move said focusing lens group until the output of the transforming means conforms with the output of said second detecting means, whereby the arithmetic operation of said second calculating means is carried out immediately before the first renewal is made in the overall focal length and immediately before the overall focal length is renewed after said focusing lens group is newly set at an estimated focal position.

3. A varifocal lens device provided with a variable power optical system composed of a variable power lens group and a focusing lens group which is a part of said variable power lens group disposed on an optical axis, for compensating a deviation produced in the image forming position for an object when said focusing lens group is set at a focusing position between the nearest possible position and the infinitely far position on the optical axis corresponding to an object distance falling between the shortest possible distance and the infinitely long distance and then an overall focal length of said variable power optical system is subsequently renewed from a first to a second focal length selected freely between the shortest possible focal length and the longest possible focal length by means of said variable power lens group, said device comprising:

a first driving means for driving said variable power lens group;

a second driving means for driving said focusing lens group;

a detecting means for detecting the absolute position of said variable power lens group on the optical axis;

a calculating means for receiving the information on focal length issued from said detecting means and the information on the position of the focusing lens group and, based on the received information, for calculating as an amount of composition the amount of movement of the focusing lens group to a compensated focal position necessary for compensation of the deviation in the image forming position;

a judging means for comparing the amount of compensation with a reference amount as a threshold amount and for issuing an execution signal when the amount of compensation exceeds the reference amount;

a first controlling means for controlling said first driving means; and a second controlling means for controlling said second driving means thereby driving the focusing lens group to the compensated focal position based on the amount of compensation at the time that the execution signal is received.

4. A varifocal lens device as claimed in claim 3, wherein said reference amount designated as Dst is fixed at Dst=20 on condition that the information on the position of said focusing lens group designated as Sx is such that the minimum value of Sx is 0 and the maximum value of Sx is 255.

5. A varifocal lens device as claimed in claim 3, wherein when the distance from the nearest position to the infinitely far position is divided into a prescribed number of regions, and wherein said reference amount is fixed at values being different from each other corresponding to said regions.

6. A varifocal lens device as claimed in claim 3, wherein said reference amount varies corresponding to the ratio of change of the compensation amount at said first focal length to the compensation amount at said second focal length of the same object, which ratio varies in accordance with the object distance 7. A varifocal lens device provided with a variable power optical system composed of a variable power lens group and a focusing lens group which is a part of said variable power lens group disposed on an optical axis, for compensating a deviation produced in the image forming position for an object when said focusing lens group is set at a focusing position between the nearest possible position and the infinitely far position on the optical axis corresponding to an object distance falling between the shortest possible distance and the infinitely long distance and then an overall focal length of said variable power optical system is subsequently renewed from a first to a second focal length selected freely between the shortest possible focal length and the longest possible focal length by means of said variable power lens group, said device comprising:

a first driving means for driving said variable power lens group;

a second driving means for driving said focusing lens group;

a first detecting means for detecting the position of said variable power lens group on the optical axis correspondingly to the overall focal length;

a second detecting means for detecting the position of said focusing lens group;

an externally operable indicating means for issuing to said first driving means a power ratio increment indicating signal instructing said variable power lens group to be driven from the shortest focal length side to the longest focal length side or a power ratio decrement indicating signal instructing said variable power lens group to be driven in the opposite direction from that for power ratio increment; and a controlling means for calculating the amount of compensation necessary for the elimination of the deviation in the image forming position relative to the latest overall focal length of said variable power optical system while said variable power lens group is being driven by said first means, for deciding the driving direction of said focusing lens group based on the output of said indicating means, and for controlling said second driving means so as to drive said focusing lens group to the focal position correspondingly to the amount of compensation.

8. A varifocal lens device as claimed in claim 7, wherein said controlling means comprises a maximum delivery amount calculating means for carrying out an arithmetic operation of the formula: t,1230
wherein Fpm stands for an output corresponding to a delivery amount from said definitely far position to said nearest position, Zp for an output of said first detecting means, and $C_1$, $C_2$ and $C_3$ for constants proper to the lens of said variable power optical system.

9. A varifocal lens device as claimed in claim 8, wherein said controlling means comprises a proportional constant calculating means for carrying out an arithmetic operation of the formula:

$$Cfp = \frac{S(i)}{Fp(i)}$$

wherein Cfp stands for an output of said proportional constant calculating means, S(i) for an output of said second detecting means immediately before start of the operation of said first driving means, and Fp(i) for an output of said maximum delivery amount calculating means due to the output of said first detecting means immediately before start of the operation of said first driving means.

10. A varifocal lens device as claimed in claim 8, wherein said controlling means comprises a focus compensation calculating means which, at fixed time intervals after start of the operation of said first driving means or at the time that the change in the output from said first detecting means reaches a prescribed amount, carries out an arithmetic operation of the formula:

$$Dfp = Cfp\left(\frac{C_2}{Zp(e) + C_1} + C_3\right) - S(i)$$

wherein Dfp stands for an output of said focus compensation calculating means, Cfp for an output of said proportional constant calculating means, Zp(e) for an output of said first detecting means at the time said compensation must be made, S(i) for an output of said second detecting means at the time immediately before start of said operation, and $C_1$, $C_2$ and $C_3$ for constants proper to the lens of said variable power optical system.

11. A varifocal lens device provided with a variable power optical system composed of a variable power lens group and a focusing lens group which is a part of said variable power lens group disposed on an optical axis, for compensating a deviation produced in the image forming position for an object when said focusing lens group is set at a focusing position between the nearest possible position and the infinitely far position on the optical axis corresponding to an object distance falling between the shortest possible distance and the infinitely long distance and then as overall focal length of said variable power optical system is subsequently renewed from a first to a second focal length selected freely between the shortest possible focal length and the longest focal length by means of said variable power lens group, said device comprising:

a first driving means for driving said variable power lens group;

a second driving means for driving said focusing lens group;

a detecting means for detecting the positions of said variable power lens group on the optical axis;

a calculating means for receiving the information on focal length and the information of the position of said focusing lens group issued from said detecting means and, based on the information so received, for calculating an amount of movement and a driving direction necessary for the movement of said focusing lens group to a compensated focal position for compensation of the deviation in the image forming position respectively as an amount of compensation and as a direction of focus compensation;

a first controlling means for controlling said first driving means;

an externally operable indicating means for indicating the direction of work of power variation necessary for renewal of the overall focal length;

a judging means for transforming the direction of the work of power variation indicated by said indicating means, based on the specific relation arising from the characteristics of the varifocal lens device, into the driving direction of said focusing lens group, for comparing the driving direction resulting from the transformation with the direction of focus compensation, and for issuing an execution signal only when the two directions mentioned above confirm with each other; and a second controlling means for controlling said second driving means so as to enable said focusing lens group to be driven to the compensated focal position based on the amount of compensation on condition that the execution direction signal has been received.

12. A varifocal lens device provided with a variable power optical system composed of a variable power lens group and a focusing lens group which is a part of said variable power lens group disposed on an optical axis, for compensating a deviation produced in the image forming position for an object when said focusing lens group is set at a focusing position between the nearest possible position and the infinitely far position on the optical axis corresponding to an object distance falling between the shortest possible distance and the infinitely long distance and then an overall focal length of said variable power optical system is subsequently renewed from a first to a second focal length selected freely between the shortest possible focal length and the longest possible focal length by means of said variable power lens group, said device comprising:

a first driving means for driving said variable power lens group;

a second driving means for driving said focusing lens group;

a detecting means for detecting the absolute positions of said variable power lens group on the optical axis;

a calculating means for receiving the information on focal length and the information on the position of said focusing lens group to be issued from said detecting means and, based on the information thus received, for calculating the amount of movement of said focusing lens group to a compensated focal position necessary for the compensation of the deviation in the image forming position as an amount of compensation;

a first controlling means for controlling the work of power variation for renewal of the overall focal length through said first driving means;

a judging means for issuing an execution signal and an inhibiting signal to indicate the time at which the amount of compensation or the information on focal length exceeds a reference amount as a threshold amount;

an inhibiting means for instructing said first controlling means to stop the work of power variation at the time that the inhibiting signal is received; and a second controlling means for controlling said second driving means so as to start driving said focusing lens group to the compensated focal position based on the amount of compensation at the time that the execution signal is received, whereby during compensation of the deviation produced in the image forming position in consequence of a renewal of the overall focal length of said variable power optical system the work of power variation is inhibited.

13. A varifocal lens device provided with a variable power optical system composed of a variable power lens group and a focusing lens group which is a part of said variable power lens group disposed on an optical axis, for compensating a deviation produced in the image forming position for an object when said focusing lens group is set at a focusing position between the nearest possible position and the infinitely far position on the optical axis corresponding to an object distance falling between the shortest possible distance and the infinitely long distance and then an overall focal length of said variable power optical system is subsequently renewed from a first to a second focal length selected freely between the shortest possible focal length and the longest possible focal length by means of said variable power lens group, said device comprising:

a first driving means for driving said variable power lens group;

a second driving means for driving said focusing lens group;

a detecting means for detecting the positions of said variable power lens group on the optical axis and for producing in response thereto the information on focal length and the information on the position of said focusing lens group;

a calculating means for receiving the information on the focal length and the information on the position of said focusing lens group and, based on the information thus received, for calculating as an amount of compensation the amount of movement for said focusing lens group to reach a compensated focal position necessary for the compensation of the deviation in the image forming position;

a first controlling means for controlling the work of power variation for the renewal of the overall focal length through the medium of said first driving means;

means for monitoring the amount of compensation and for continuing to issue an inhibiting signal over the period in which the amount of compensation exceeds the prescribed allowable amount;

an inhibiting means for instructing said first controlling means to keep the work of power variation inhibited while the inhibiting signal is being received; and a second controlling means for controlling said second driving means so as to drive said focusing lens group to the compensated focal position based on the amount of compensation, whereby the work of power variation is inhibiting while the amount of compensation exceeds the allowable amount during the execution of the work of focus compensation for automatic compensation of the work of power variation and of the deviation produced in the image forming position in consequence of the work of power variation.

14. A varifocal lens device provided with a variable power optical system composed of a variable power lens group and a focusing lens group which is a part of said variable power lens group disposed on an optical axis, for compensating a deviation produced in the image forming position for an object when said focusing lens group is set at a focusing position between the nearest possible position and the infinitely far position on the optical axis corresponding to an object distance falling between the shortest possible distance and the infinitely long distance and then an overall focal length of said variable power optical system is subsequently renewed from a first to a second focal length selected freely between the shortest possible focal length and the longest possible focal length by means of said variable power lens group, said device comprising:

a first driving means for driving said variable power lens group;

a second driving means for driving said focusing lens group;

a first detecting means for detecting the positions of said variable power lens group on the optical axis and for producing in response thereto the information on the focal length and the information on the position of said focusing lens group;

a calculating means for receiving the information on the focal length and the information on the position of said focusing lens group and, based on the information so received, for calculating as an amount of compensation the amount of movement of said focusing lens group to a compensated focal position necessary for the compensation of the deviation in the image forming position;

a second detecting means for detecting the speed of the work of power variation for driving said variable power lens group and renewing the overall focal length;

a first controlling means for receiving the output of said first detecting means and, based on the output, for controlling said first driving means to perform the work of power variation at a prescribed speed, so as to retain the speed of the work of power variation at a prescribed level in spite of a change in the load of said first controlling means; and a second controlling means for controlling said second driving means so as to move said focusing lens group to the compensated focal positioned based on the amount of compensation.

* * * * *